US012592037B2

(12) United States Patent
Lee et al.

(10) Patent No.: US 12,592,037 B2
(45) Date of Patent: Mar. 31, 2026

(54) ROUTE GUIDANCE DEVICE AND ROUTE GUIDANCE SYSTEM BASED ON AUGMENTED REALITY AND MIXED REALITY

(71) Applicant: LG ELECTRONICS INC., Seoul (KR)

(72) Inventors: Kihyung Lee, Seoul (KR); Yujung Jang, Seoul (KR); Sunghwan Choi, Seoul (KR); Seungman Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 53 days.

(21) Appl. No.: 18/579,000

(22) PCT Filed: Jul. 12, 2022

(86) PCT No.: PCT/KR2022/010147
§ 371 (c)(1),
(2) Date: Jan. 12, 2024

(87) PCT Pub. No.: WO2023/287175
PCT Pub. Date: Jan. 19, 2023

(65) Prior Publication Data
US 2024/0312153 A1 Sep. 19, 2024

Related U.S. Application Data

(60) Provisional application No. 63/221,467, filed on Jul. 13, 2021.

(51) Int. Cl.
*G06T 17/05* (2011.01)
*B60K 35/23* (2024.01)
(Continued)

(52) U.S. Cl.
CPC .............. *G06T 17/05* (2013.01); *B60K 35/23* (2024.01); *B60K 35/28* (2024.01); *G01C 21/30* (2013.01);
(Continued)

(58) Field of Classification Search
CPC ........ B60K 2360/166; B60K 2360/177; B60K 2360/21; B60K 35/23; B60K 35/28;
(Continued)

(56) References Cited

U.S. PATENT DOCUMENTS 5,802,492 A 9/1998 DeLorme et al.
7,860,301 B2 12/2010 Se et al.
(Continued)

FOREIGN PATENT DOCUMENTS

CN 109974733 A 7/2019
JP 2003-294457 A 10/2003
(Continued)

OTHER PUBLICATIONS

Fernandez et al., "Associated Reality: A Cognitive Human-Machine Layer for Autonomous Driving." Robotics and Autonomous Systems, Elsevier, vol. 133, Aug. 17, 2020, XP086272130, pp. 1-15.
(Continued)

*Primary Examiner* — Xiao M Wu
(74) *Attorney, Agent, or Firm* — Birch, Stewart, Kolasch & Birch, LLP

(57) ABSTRACT

The present invention relates to a route guidance device comprising: a communication unit for communicating with a cloud server; an interface unit which receives, from at least one sensor, an image of a vehicle-adjacent environment, including a road image, and sensing information obtained by sensing the driving state of a vehicle; an AR module for rendering AR information by using the sensing information and POI information received from the cloud server; an MR (Continued)

module for rendering, on the basis of the sensing information and map information received from the cloud server, MR information including a virtual object; and a processor for controlling the interface unit so that an AR view image including the AR information and an MR view image including the MR information are displayed on a display unit of the vehicle, and controlling, on the basis of whether the vehicle enters a specific situation, the interface unit so that a second view image is displayed on a part of the display unit area on which a first view image among the AR view image and the MR view image is displayed.

17 Claims, 31 Drawing Sheets

(51) Int. Cl.

| | | |
|---|---|---|
| *B60K 35/28* | (2024.01) | |
| *G01C 21/30* | (2006.01) | |
| *G01C 21/36* | (2006.01) | |
| *G06F 9/54* | (2006.01) | |
| *G06T 7/73* | (2017.01) | |
| *G06T 7/80* | (2017.01) | |
| *G06T 15/04* | (2011.01) | |
| *G06T 19/00* | (2011.01) | |
| *G06V 20/56* | (2022.01) | |

(52) U.S. Cl.
CPC ..... *G01C 21/3602* (2013.01); *G01C 21/3635* (2013.01); *G01C 21/3638* (2013.01); *G01C 21/3641* (2013.01); *G01C 21/3644* (2013.01); *G01C 21/3647* (2013.01); *G01C 21/365* (2013.01); *G01C 21/367* (2013.01); *G01C 21/3682* (2013.01); *G06F 9/543* (2013.01); *G06T 7/73* (2017.01); *G06T 7/80* (2017.01); *G06T 15/04* (2013.01); *G06T 19/00* (2013.01); *G06T 19/006* (2013.01); *G06V 20/56* (2022.01); *B60K 2360/166* (2024.01); *B60K 2360/177* (2024.01); *B60K 2360/21* (2024.01); *G06T 2200/24* (2013.01); *G06T 2207/10028* (2013.01); *G06T 2207/30252* (2013.01)

(58) Field of Classification Search
CPC .... G01C 21/30; G01C 21/36; G01C 21/3602; G01C 21/3635; G01C 21/3638; G01C 21/3641; G01C 21/3644; G01C 21/3647; G01C 21/365; G01C 21/367; G01C 21/3682; G06F 9/543; G06N 3/045; G06N 3/0475; G06N 3/094; G06Q 50/40; G06T 15/04; G06T 17/00; G06T 17/05; G06T 19/00; G06T 19/006; G06T 2200/24; G06T 2207/10028; G06T 2207/30252; G06T 2210/04; G06T 2210/61; G06T 7/73; G06T 7/80; G06V 10/82; G06V 20/56; G06V 20/647
See application file for complete search history.

(56) References Cited

U.S. PATENT DOCUMENTS

| | | | |
|---|---|---|---|
| 8,564,607 B2 | 10/2013 | Lee et al. | |
| 9,195,390 B2 | 11/2015 | Wu | |
| 9,945,676 B2 | 4/2018 | Wong et al. | |
| 10,268,195 B2 | 4/2019 | Majumdar et al. | |
| 10,366,290 B2 | 7/2019 | Wang et al. | |
| 11,276,234 B2 | 3/2022 | Choi et al. | |
| 11,610,342 B2 | 3/2023 | Wan et al. | |
| 11,651,565 B2 | 5/2023 | McCall | |
| 12,229,874 B1 | 2/2025 | Mousseau | |
| 2007/0260628 A1 | 11/2007 | Fuchs et al. | |
| 2009/0289937 A1 | 11/2009 | Flake et al. | |
| 2010/0235080 A1 | 9/2010 | Faenger et al. | |
| 2012/0221241 A1 | 8/2012 | Nurmi | |
| 2012/0254263 A1 | 10/2012 | Hiestermann et al. | |
| 2013/0147837 A1 | 6/2013 | Stroila | |
| 2014/0277939 A1 | 9/2014 | Ren et al. | |
| 2014/0301645 A1 | 10/2014 | Mattila | |
| 2017/0330034 A1 | 11/2017 | Wang et al. | |
| 2018/0058879 A1 | 3/2018 | Tayama et al. | |
| 2018/0066956 A1 | 3/2018 | Kim et al. | |
| 2018/0079427 A1 | 3/2018 | Herz et al. | |
| 2018/0196427 A1 | 7/2018 | Majumdar et al. | |
| 2018/0213359 A1 | 7/2018 | Reinhardt et al. | |
| 2018/0227974 A1 | 8/2018 | Pullagunta et al. | |
| 2019/0017839 A1* | 1/2019 | Eyler ................. | G01C 21/3647 |
| 2019/0043235 A1 | 2/2019 | Tsushima et al. | |
| 2019/0050905 A1 | 2/2019 | Nomura et al. | |
| 2019/0066382 A1 | 2/2019 | Kubo et al. | |
| 2019/0166352 A1 | 5/2019 | Alaniz et al. | |
| 2019/0182613 A1 | 6/2019 | Mate et al. | |
| 2019/0304202 A1 | 10/2019 | Zhou et al. | |
| 2020/0004332 A1 | 1/2020 | Jeon et al. | |
| 2020/0042083 A1 | 2/2020 | Min | |
| 2020/0062179 A1 | 2/2020 | Kim | |
| 2020/0074061 A1 | 3/2020 | Kim | |
| 2020/0153885 A1 | 5/2020 | Lee et al. | |
| 2020/0255026 A1 | 8/2020 | Katardjiev et al. | |
| 2020/0273235 A1 | 8/2020 | Emami et al. | |
| 2020/0304375 A1 | 9/2020 | Chennai et al. | |
| 2020/0309557 A1 | 10/2020 | Efland | |
| 2020/0309558 A1 | 10/2020 | Cowburn et al. | |
| 2020/0312005 A1 | 10/2020 | Desai et al. | |
| 2021/0036834 A1 | 2/2021 | Lee et al. | |
| 2021/0056762 A1 | 2/2021 | Robbe et al. | |
| 2021/0117214 A1 | 4/2021 | Presant et al. | |
| 2021/0125411 A1 | 4/2021 | Choi et al. | |
| 2021/0134248 A1 | 5/2021 | Wan et al. | |
| 2021/0142526 A1* | 5/2021 | Mantyjarvi ......... | B60W 60/001 |
| 2021/0148713 A1 | 5/2021 | Yu et al. | |
| 2021/0150236 A1 | 5/2021 | Yu et al. | |
| 2021/0158779 A1* | 5/2021 | Singh ..................... | G06T 11/00 |
| 2021/0190530 A1 | 6/2021 | Jung et al. | |
| 2021/0201584 A1 | 7/2021 | Ha et al. | |
| 2021/0207971 A1 | 7/2021 | Kim et al. | |
| 2022/0163337 A1 | 5/2022 | Ju et al. | |
| 2022/0254119 A1 | 8/2022 | Berliner et al. | |
| 2023/0058169 A1 | 2/2023 | Cella et al. | |
| 2023/0245391 A1 | 8/2023 | Adkinson et al. | |
| 2024/0096037 A1 | 3/2024 | Warren et al. | |
| 2024/0290143 A1 | 8/2024 | Famiglietti et al. | |
| 2024/0318974 A1 | 9/2024 | Jang et al. | |
| 2024/0344841 A1 | 10/2024 | Jang et al. | |
| 2025/0076079 A1 | 3/2025 | Wannerberg | |
| 2025/0076080 A1 | 3/2025 | Phillips | |
| 2025/0153735 A1 | 5/2025 | Li et al. | |
| 2025/0171051 A1 | 5/2025 | Li et al. | |

FOREIGN PATENT DOCUMENTS

| | | | |
|---|---|---|---|
| KR | 10-2004-0025150 A | 3/2004 | |
| KR | 10-2016-0059376 A | 5/2016 | |
| KR | 10-2017-0005602 A | 1/2017 | |
| KR | 10-2017-0056752 A | 5/2017 | |
| KR | 10-2017-0127342 A | 11/2017 | |
| KR | 10-2019-0085894 A | 7/2019 | |
| KR | 10-2019-0109336 A | 9/2019 | |
| KR | 10-2020-0060651 A | 6/2020 | |
| KR | 10-2020-0063889 A | 6/2020 | |
| KR | 10-2135256 B1 | 7/2020 | |
| KR | 10-2173286 B1 | 11/2020 | |
| KR | 10-2174524 B1 | 11/2020 | |
| KR | 10-2235474 B1 | 4/2021 | |
| KR | 10-2021-0048739 A | 5/2021 | |
| KR | 10-2021-0059980 A | 5/2021 | |
| KR | 10-2021-0080936 A | 7/2021 | |
| KR | 10-2021-0085789 A | 7/2021 | |

(56)                    References Cited

FOREIGN PATENT DOCUMENTS

KR      10-2021-0087271  A      7/2021
WO      WO 2012/113972  A1      8/2012
WO      WO 2021/133053  A1      7/2021

OTHER PUBLICATIONS

Matsumoto et al., "Dracena: Real-Time Digital Twin Platform: Fujitsu Global." May 15, 2020, XP093026753, pp. 1-18.
Aheleroff et al., "Digital Twin as a Service (DTaaS) in Industry 4.0: An Architecture Reference Model," Dec. 16, 2020, 1 page, abstract provided only.
Wang et al., "A Digital Twin Paradigm: Vehicle-to-Cloud Based Advanced Driver Assistance Systems," IEEE 2020, Jun. 30, 2020, 6 pages total.

* cited by examiner

HEIGHT
DIRECTION(H)

WIDTH
DIRECTION(W)

OVERALL-LENGTH
DIRECTION(L)

DTaaS

MR AMS

1100

911

DATA INTEGRATION MANAGER

3D ASSETS FOR MR NAVI

CONTEXT HANDLER

CONTEXT RECOMMENDER

CONTEXT INTERPRETER SESSION MANAGER

GRAPH DB

INTERFACE APLs

SERVICE AGGREGATION MANAGER

CONTEXT CONTROLLER

CONTEXT MANAGER

INTERFACE APLs

INTERFACE APLs

INTERFACE APLs

POI DATA

IMAGERY DATA

SERVICE DATA (RATINGS,PRICE)

SERVICE PROVIDERS

HERE

SERVICE DATA

INTERFACE APLs

MAPILLARY

SERVICE DATA

INTERFACE APLs

YELP

SERVICE DATA

INTERFACE APLs

CID

RSE

WINDOW MANAGER

MR NAVI ENGINE

MR RENDERER

MR AMS CLIENT

NAVIGATION APP

NAVIGATION

AR NAVI ENGINE

VEHICLE SENSORS

USER INPUT

FRONT CAMERA

OFFBOARD

ONBOARD (a)

(b)

(c)

(a)                                                        (b)

(c)

FIG. 13
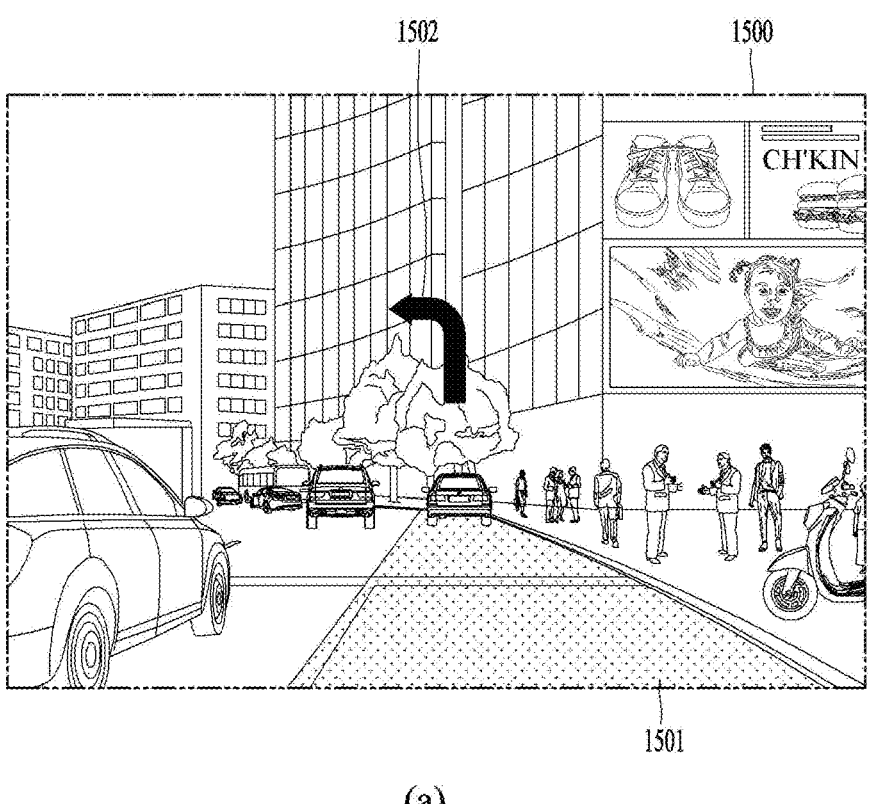
(a)
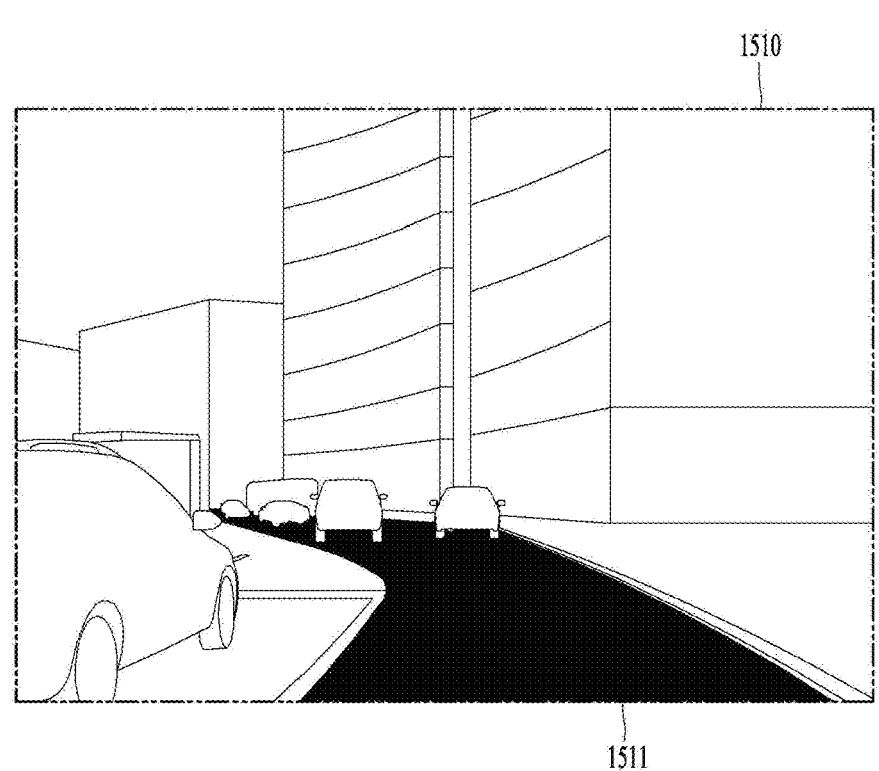
(b)

FIG. 15A

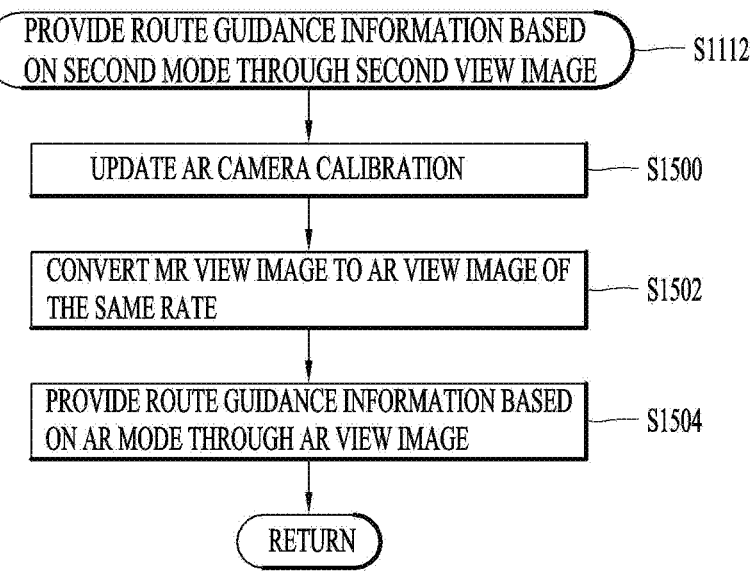

PROVIDE ROUTE GUIDANCE INFORMATION BASED ON SECOND MODE THROUGH SECOND VIEW IMAGE — S1112

UPDATE AR CAMERA CALIBRATION — S1500

CONVERT MR VIEW IMAGE TO AR VIEW IMAGE OF THE SAME RATE — S1502

PROVIDE ROUTE GUIDANCE INFORMATION BASED ON AR MODE THROUGH AR VIEW IMAGE — S1504

RETURN

FIG. 15B

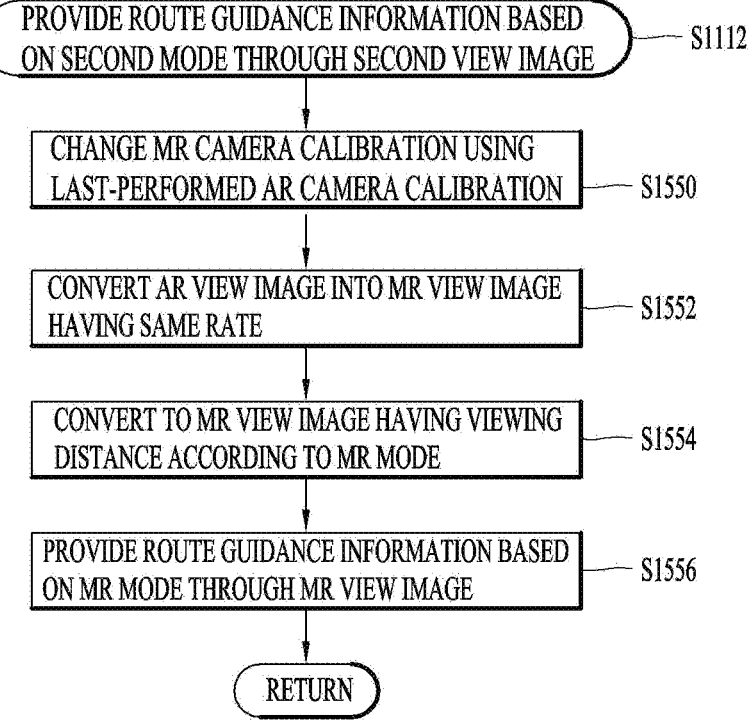

PROVIDE ROUTE GUIDANCE INFORMATION BASED ON SECOND MODE THROUGH SECOND VIEW IMAGE — S1112

CHANGE MR CAMERA CALIBRATION USING LAST-PERFORMED AR CAMERA CALIBRATION — S1550

CONVERT AR VIEW IMAGE INTO MR VIEW IMAGE HAVING SAME RATE — S1552

CONVERT TO MR VIEW IMAGE HAVING VIEWING DISTANCE ACCORDING TO MR MODE — S1554

PROVIDE ROUTE GUIDANCE INFORMATION BASED ON MR MODE THROUGH MR VIEW IMAGE — S1556

RETURN

*FIG. 18*

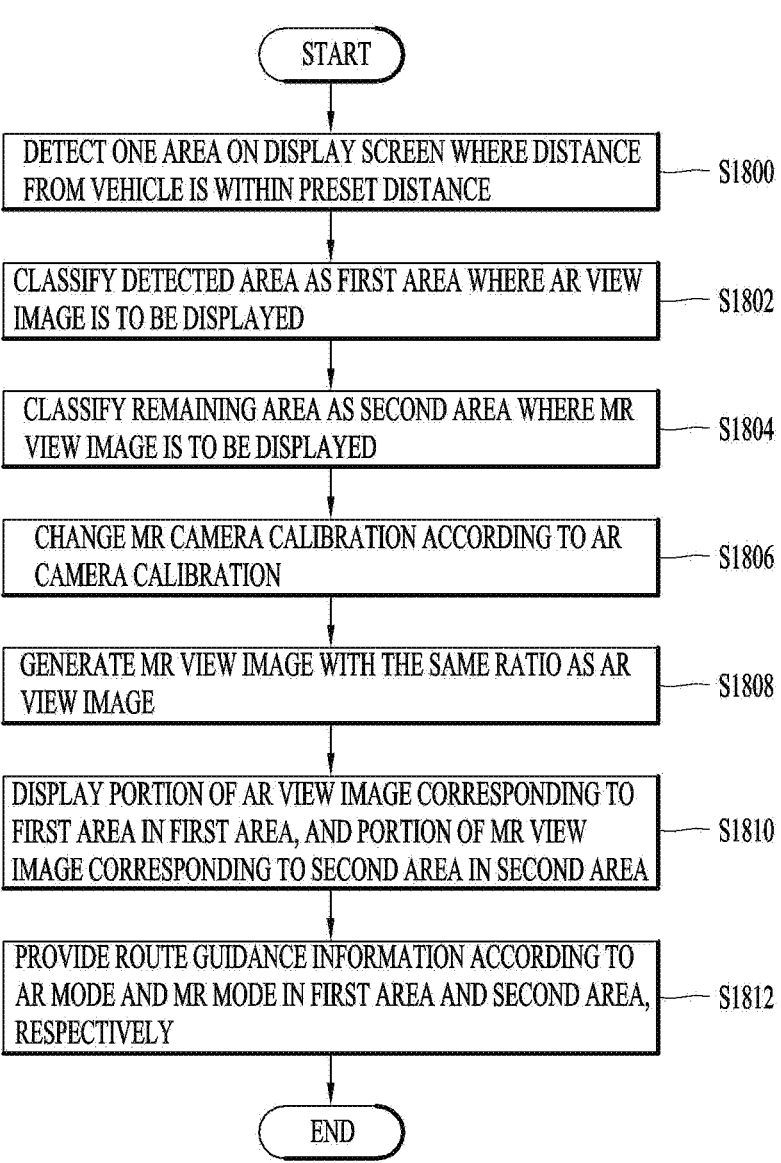

START

DETECT ONE AREA ON DISPLAY SCREEN WHERE DISTANCE FROM VEHICLE IS WITHIN PRESET DISTANCE —— S1800

CLASSIFY DETECTED AREA AS FIRST AREA WHERE AR VIEW IMAGE IS TO BE DISPLAYED —— S1802

CLASSIFY REMAINING AREA AS SECOND AREA WHERE MR VIEW IMAGE IS TO BE DISPLAYED —— S1804

CHANGE MR CAMERA CALIBRATION ACCORDING TO AR CAMERA CALIBRATION —— S1806

GENERATE MR VIEW IMAGE WITH THE SAME RATIO AS AR VIEW IMAGE —— S1808

DISPLAY PORTION OF AR VIEW IMAGE CORRESPONDING TO FIRST AREA IN FIRST AREA, AND PORTION OF MR VIEW IMAGE CORRESPONDING TO SECOND AREA IN SECOND AREA —— S1810

PROVIDE ROUTE GUIDANCE INFORMATION ACCORDING TO AR MODE AND MR MODE IN FIRST AREA AND SECOND AREA, RESPECTIVELY —— S1812

END

FIG. 19
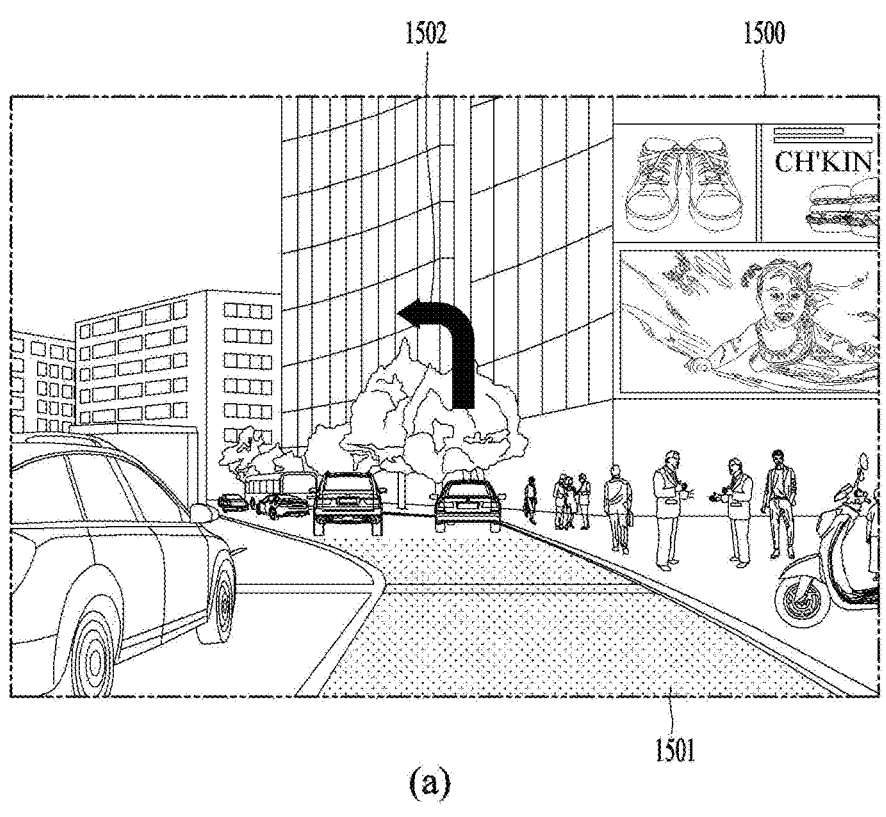
(a)
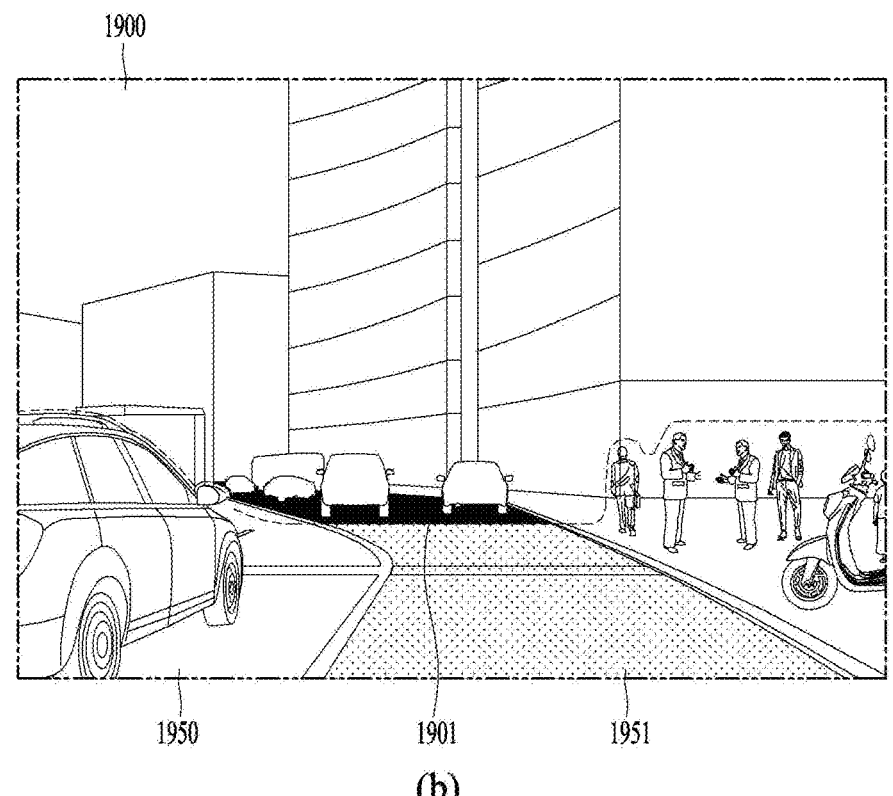
(b)

START

GENERATE SECOND VIEW IMAGE WITH SIZE CORRESPONDING TO AT LEAST PORTION OF FIRST VIEW IMAGE ⎯ S2000

OVERLAY SECOND VIEW IMAGE ON AT LEAST PORTION OF FIRST VIEW IMAGE DISPLAYED ON DISPLAY SCREEN ⎯ S2002

PROVIDE ROUTE GUIDANCE INFORMATION THROUGH FIRST VIEW IMAGE WITH SECOND VIEW IMAGE OVERLAID ⎯ S2004

END

FIG. 24
2410                          2420
2412
2411
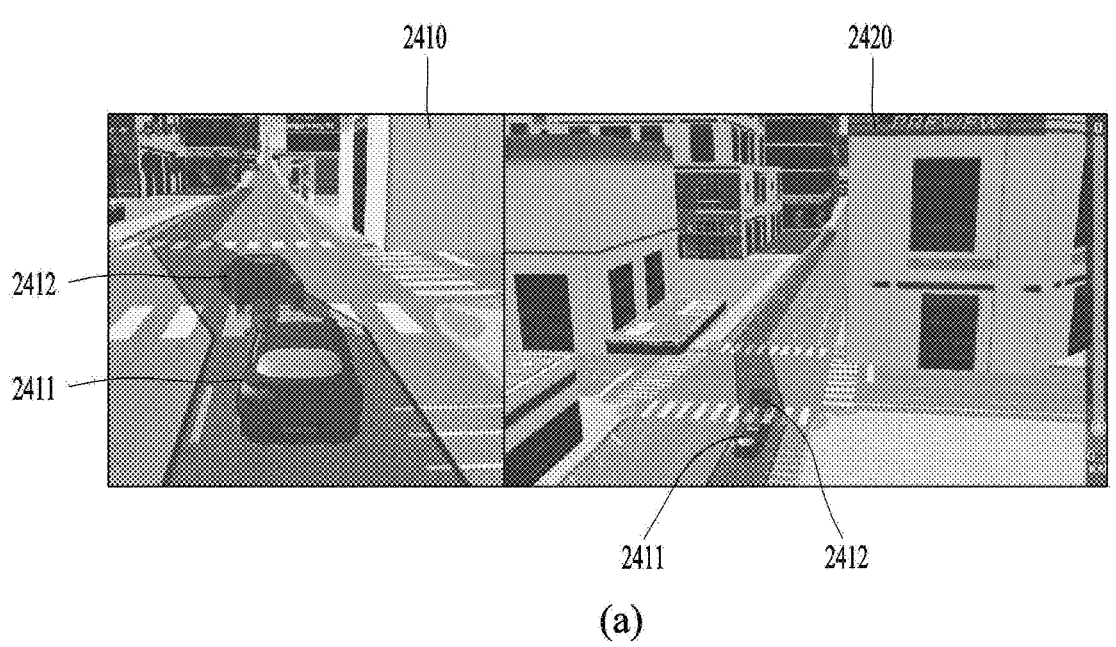
2411        2412
(a)
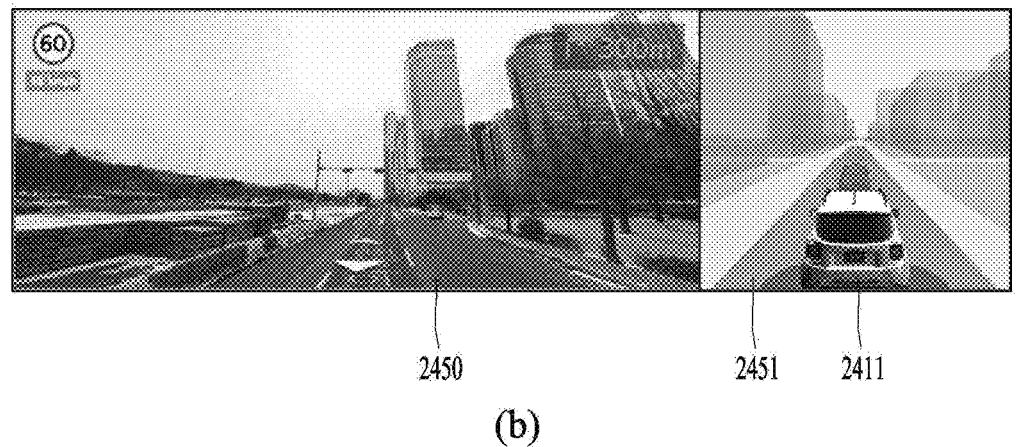
2450        2451   2411
(b)
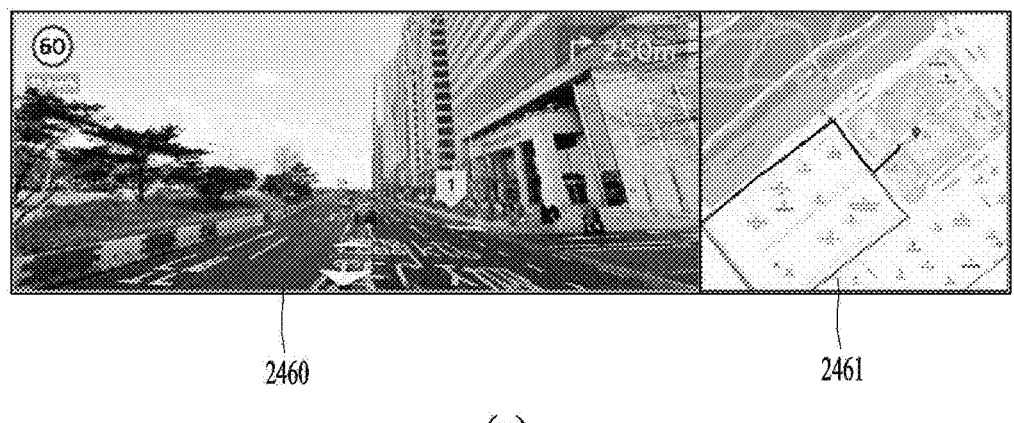
2460                          2461
(c)

ROUTE GUIDANCE DEVICE AND ROUTE GUIDANCE SYSTEM BASED ON AUGMENTED REALITY AND MIXED REALITY

CROSS REFERENCE TO RELATED APPLICATIONS

This application is the National Phase of PCT International Application No. PCT/KR2022/010147, filed on Jul. 12, 2022, which claims priority under 35 U.S.C. 119 (e) to U.S. Provisional Application No. 63/221,467, filed on Jul. 13, 2021, all of which are hereby expressly incorporated by reference into the present application.

TECHNICAL FIELD

The present disclosure relates to a route guidance device and a route guidance system for guiding a route for a vehicle to travel.

BACKGROUND ART

Recently, Augmented Reality (AR) that outputs a graphic object through a windshield or a Head Up Display (HUD) of a vehicle or additionally outputs a virtual object to the real world by using a graphic object that is overlaid on an image captured by a camera has appeared. A vehicle is currently providing a driver with additional information related to an environment around the vehicle, a vehicle status, and a driving route (travel route) of the vehicle through the AR technology, and thus the driver can intuitively recognize the vehicle and the traveling environment of the vehicle. Therefore, traveling efficiency and convenience can be further improved.

Meanwhile, when using such AR technology, various types of information necessary for driving a vehicle may be provided based on the real world. In other words, the AR technology uses images of the real world acquired through a camera, and requires acquisition of clear images of the real world. However, since a sensor, namely, a camera that acquires images of the real world senses a real-time environment around the vehicle, there is a problem that route guidance information cannot be accurately identified from the images acquired from the sensor, due to obstacles, such as rain, snow, shadows of street trees, or vehicles ahead in case of bad weather such as the rain or snow or in a complex traffic situation such as traffic jams.

As one example, the camera may not be able to recognize a lane in which the vehicle is currently traveling due to snow, rain, shadows, or a vehicle ahead. Additionally, in the case of a road with different heights, such as a ramp, on which a vehicle travels, or a road with complex curves, the slope or curves of the road may not be recognized. In this case, there is a problem that AR objects related to lanes may not be displayed or incorrect AR objects may be displayed. In other words, there is a problem that discrepancy may occur between the AR object and the real environment depending on the complexity of the real world acquired through the camera or the state of an image obtained.

Meanwhile, following this AR technology, a technology related to Mixed Reality (MR), which can provide various simulation information related to a vehicle by applying Digital Twin (DT) technology, is actively being developed.

As an effort of developing such MR-related technologies, a method of providing information related to route guidance to a driver using the MR is being actively researched. The route guidance using the MR has an advantage of providing a driver with various types of information that the driver in a cockpit cannot check, such as displaying a graphic object corresponding to a vehicle on a 3D map digitized through the digital twinning technology and providing information related to a driving route on which the driver has not driven the vehicle yet through the map and a graphic object, or providing a field of view (viewing angle) such as a bird's-eye view.

This MR provides vehicle-related information through virtual objects displayed through a digitized 3D map, and may provide information regardless of images of the real world obtained through a camera. Therefore, a problem that discrepancy may occur between provided information and an actual environment depending on the complexity of the real world acquired through the camera or the state of an image obtained.

However, the MR provides information through images of a digitized 3D map. Therefore, depending on the degree of correspondence between the 3D map image and the real world around the vehicle, discrepancy may occur between a graphic object provided through the MR, that is, an MR object, and the real environment.

However, it is very difficult to provide a 3D map that is completely identical to the real world, and thereby information related to stationary objects such as buildings or objects with a specific size or greater such as vehicles can be merely provided, but it is difficult to display objects, such as people or animals around the vehicles, which are small or difficult to be sensed, through the MR using the 3D map images.

Due to this problem, it is difficult to completely replace AR, which directly uses images of the real world, with MR. Accordingly, technology development for effective ways to use both AR and MR is being actively researched.

DISCLOSURE OF INVENTION

Technical Problem

The present disclosure is directed to solving the aforementioned problems and other drawbacks.

One aspect of the present disclosure is to make up for shortcomings of augmented reality (AR) by using mixed reality (MR), namely, to provide a route guidance device and a route guidance system capable of providing route guidance information using MR when it is difficult to provide the route guidance information through AR.

Another aspect of the present disclosure is to make up for shortcomings of augmented reality (AR) by using mixed reality (MR), namely, to provide a route guidance device and a route guidance system capable of further improving visibility of information provided through AR.

Still another aspect of the present disclosure is to make up for shortcomings of augmented reality using mixed reality, namely, to provide a route guidance device and a route guidance system that can simultaneously provide information regarding objects located in an area within a viewing angle (field of view) displayed through AR and information regarding objects located in an area outside the viewing angle.

Solution to Problem

A route guidance device according to one embodiment of the present disclosure includes a route guidance device that includes a communication unit that communicates with a cloud server, an interface unit that receives, from at least one sensor disposed in a vehicle, an environment image around a vehicle including an image of a road on which the vehicle is traveling, and sensing information obtained by sensing a traveling state of the vehicle, an Augmented Reality (AR) module that renders AR information including at least one of the sensing information, and Point Of Interest (POI) information received from the cloud server, a Mixed Reality (MR) module that renders MR information including at least one virtual object, based on the sensing information and map information received from the cloud server, and a processor that controls the interface unit so that an AR view image including the AR information or an MR view image including the MR information is displayed on a display of the vehicle, and controls the interface unit so that a second view image of the AR view image and the MR view image is displayed on a portion of an area of the display where a first view image of the AR view image and the MR view image is displayed based on whether the vehicle enters a specific situation.

In one embodiment, the processor determines whether the vehicle has entered the specific situation according to at least one of the traveling state of the vehicle, a state of the road on which the vehicle travels, a weather condition around the vehicle, and time at which the vehicle travels.

In one embodiment, the traveling state of the vehicle includes whether the vehicle is in a stopped state or is traveling, and the state of the road on which the vehicle travels includes a curvature variation of the road and a slope variation of the road.

In one embodiment, the processor calculates the curvature variation of the road according to a sensing value of a gyro sensor, which senses an inclination of the vehicle, and a detection result of a lane detector, which detects a lane of the road on which the vehicle travels, calculates the slope variation of the road according to a road shape detected through a vertical profile and a high-definition map (HD MAP) detected based on map information related to the road on which the vehicle is currently traveling, and determines whether the vehicle has entered the specific situation based on an AR fitting rate between a real image ahead of the vehicle acquired through a camera of the vehicle and an AR object displayed on the real image according to the calculated curvature variation and slope variation.

In one embodiment, the processor determines a location of the vehicle on a travel route based on the sensing information, and determines whether the vehicle has entered the specific situation by determining whether the vehicle has departed from a route on which the vehicle is capable of traveling or whether the vehicle is located at a junction on the route or adjacent to an exit or destination within a predetermined distance.

In one embodiment, wherein the processor controls the interface unit to display warning information for warning a dangerous area located around the vehicle or a possibility of a collision detected from around the vehicle, based on the sensing information, and determines whether the vehicle has entered the specific situation depending on whether the displayed warning information is exposed ahead of the vehicle.

In one embodiment, the processor determines objects detected from around the vehicle based on the sensing information, and determines whether the vehicle has entered the specific situation based on at least one of a number of the determined objects and sizes of the objects.

In one embodiment, the processor controls the interface unit to split the display into a first display area and a second display area when the vehicle enters the specific situation, and controls the interface unit to display a first view image and a second view image on the first display area and the second display area, respectively.

In one embodiment, the first display area is a display area where an image of an area, in which a distance from the vehicle is within a preset distance, is displayed, and the second display area is a display area where an image of an area, in which the distance from the vehicle exceeds the preset distance, is displayed.

In one embodiment, the processor controls the interface unit to display the AR view image and the MR view image on the first display area and the second display area, respectively.

In one embodiment, the processor, when the vehicle enters the specific situation, generates a second view image having the same point of attention as that of the first view image by changing a camera calibration of the second view image according to a camera calibration of the first view image.

In one embodiment, the second view image is an image with the same size and ratio as the first view image, based on a Field of View (FOV) of the first view image.

In one embodiment, the first view image and the second view image are connected to each other through a boundary surface of a view image to enable movement of an object between one view image and another view image.

In one embodiment, the processor controls the interface unit so that the second view image is overlaid on at least a portion of a display area where the first view image is displayed, and controls the interface unit such that objects included in the first view image are displayed in the display area on which the second view image is overlaid.

In one embodiment, the first display area is an area where a first view image providing route information related to a travel route on which the vehicle is currently traveling is displayed, and the second display area is an area where a second view image providing route information related to a route on which the vehicle has not traveled yet or has already traveled is displayed.

A route guidance system according to one embodiment of the present disclosure includes a route guidance device that is mounted on a vehicle and displays on a display of the vehicle an Augmented Reality (AR) view image including AR information rendered based on Point Of Interest (POI) information received or a Mixed Reality (MR) view image including MR information rendered based on Three-Dimensional (3D) map information, and a cloud server that provides the route guidance device with POI information or 3D map information corresponding to a current, past, or predicted future location of the vehicle, in response to a request of the route guidance device, wherein the route guidance device includes a processor that controls the display to display a second view image on a portion of an area of the display where the first view image of the AR view image and the MR view image is displayed, based on whether the vehicle enters the specific situation.

In one embodiment, the cloud server includes a Digital Twin as a Service (DTaaS) server that provides digital-twin 3D map information including virtual objects corresponding to each building within a map area, an MR server that performs communication connection to the route guidance device, provides location information related to the vehicle collected from the route guidance device to the DTaaS server, and provides the digital-twin 3D map information provided from the DTaaS to the route guidance device, and an AR server that receives vehicle location information provided from the route guidance device and the sensing information, and provides POI information corresponding to the received information to the route guidance device.

In one embodiment, the route guidance device controls the display to display both first route guidance information included in the first view image and second route guidance information included in the second view image, through the second view image displayed on a portion of the first view image.

Advantageous Effects of Invention

Hereinafter, effects of a route guidance device and a route guidance system according to an embodiment of the present disclosure will be described.

First, the present disclosure can provide a view image according to mixed reality (MR) that matches a view image according to augmented reality (AR) when the AR view image is difficult to display accurate route guidance information, such that a driver can be provided with such accurate route guidance information regardless of a situation or complexity around a vehicle in the real world or an acquired image state of the real world.

Second, the present disclosure can display a portion of a view image according to MR, which matches a view image according to AR, on a portion of the AR view image, or display at least a portion of the MR view image to be overlaid on at least a portion of the AR view image, thereby improving visibility of information displayed through objects around a vehicle.

Third, the present disclosure may display an MR view image according to MR together with an AR view image provided according to AR, thereby simultaneously displaying on one screen both information related to objects, which are located in an area within a viewing angle displayed through the AR, and information related to objects, which are located in an area out of the viewing angle.

BRIEF DESCRIPTION OF DRAWINGS

FIG. 8B is a conceptual view illustrating an MR service platform for providing an MR service according to the present disclosure.

FIG. 8D is a conceptual view illustrating an MR AMS server according to the present disclosure.

FIG. 13 illustrates an example of an AR view image and an MR view image corresponding to the AR view image, displayed on a route guidance device according to an embodiment of the present disclosure.

FIG. 15A is a flowchart illustrating an operation process of providing route guidance information through an MR view image according to an MR mode when switched from an AR mode to the MR mode.

FIG. 15B is a flowchart illustrating an operation process of providing route guidance information through an AR view image according to an AR mode when switched from an MR mode to the AR mode.

FIG. 18 is a flowchart illustrating an operation process of creating a display screen on which AR view image and MR view image are mixedly displayed through splitting of the display area.

FIG. 19 illustrates an example of a display screen on which the AR view image and the MR view image are respectively displayed on split areas through the operation process of FIG. 18.

FIG. 24 is an exemplary view illustrating that a composite screen of an AR view image and an MR view image are displayed through a route guidance device according to an embodiment of the present disclosure.

FIG. 26 is an exemplary view illustrating an example in which route guidance information for providing preview information is provided through a drone view or preview camera in FIG. 25.

MODE FOR THE INVENTION

Description will now be given in detail according to one or more embodiments disclosed herein, with reference to the accompanying drawings. For the sake of brief description with reference to the drawings, the same or equivalent components may be provided with the same or similar reference numbers, and description thereof will not be repeated. A suffix "module" or "unit" used for elements disclosed in the following description is merely intended for easy description of the specification, and the suffix itself is not intended to give any special meaning or function. In describing the embodiments disclosed herein, moreover, the detailed description will be omitted when specific description for publicly known technologies to which the invention pertains is judged to obscure the gist of the present disclosure. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present disclosure may be understood as a conception including automobiles, motorcycles, and the like. Hereinafter, the vehicle will be described based on a car.

The vehicle according to the embodiment of the present disclosure may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
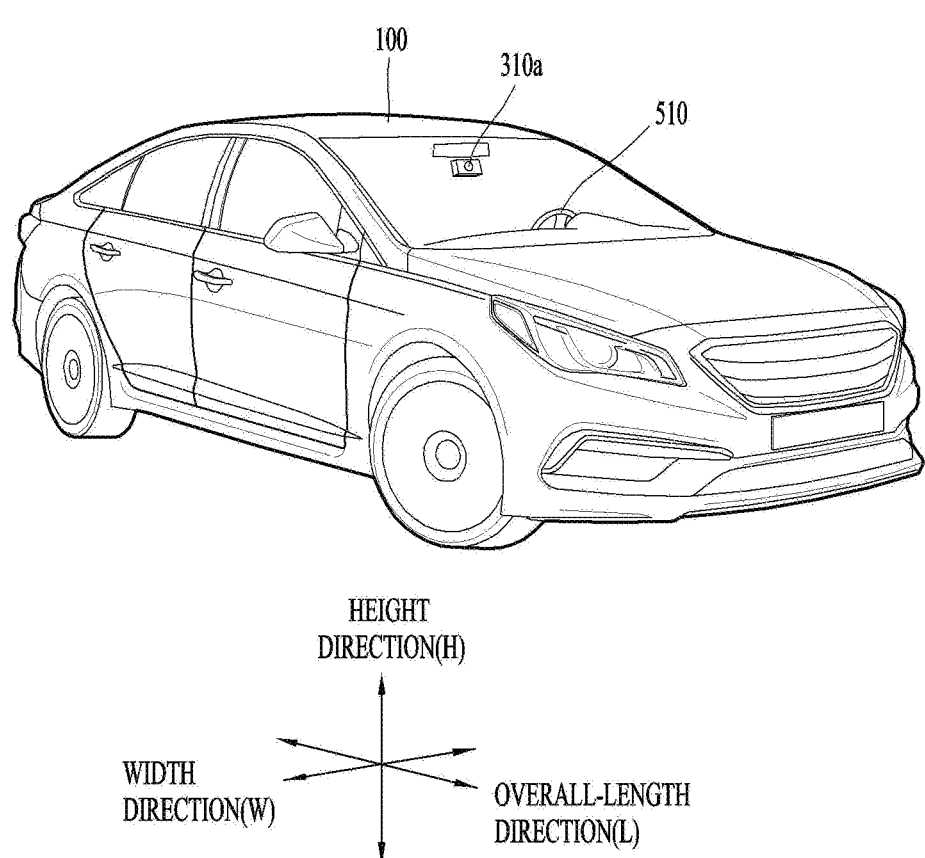
FIG. 1 is a view illustrating appearance of a vehicle in accordance with an embodiment of the present disclosure.

FIG. 1 is a view illustrating appearance of a vehicle in accordance with an embodiment of the present disclosure.

Figure 2:
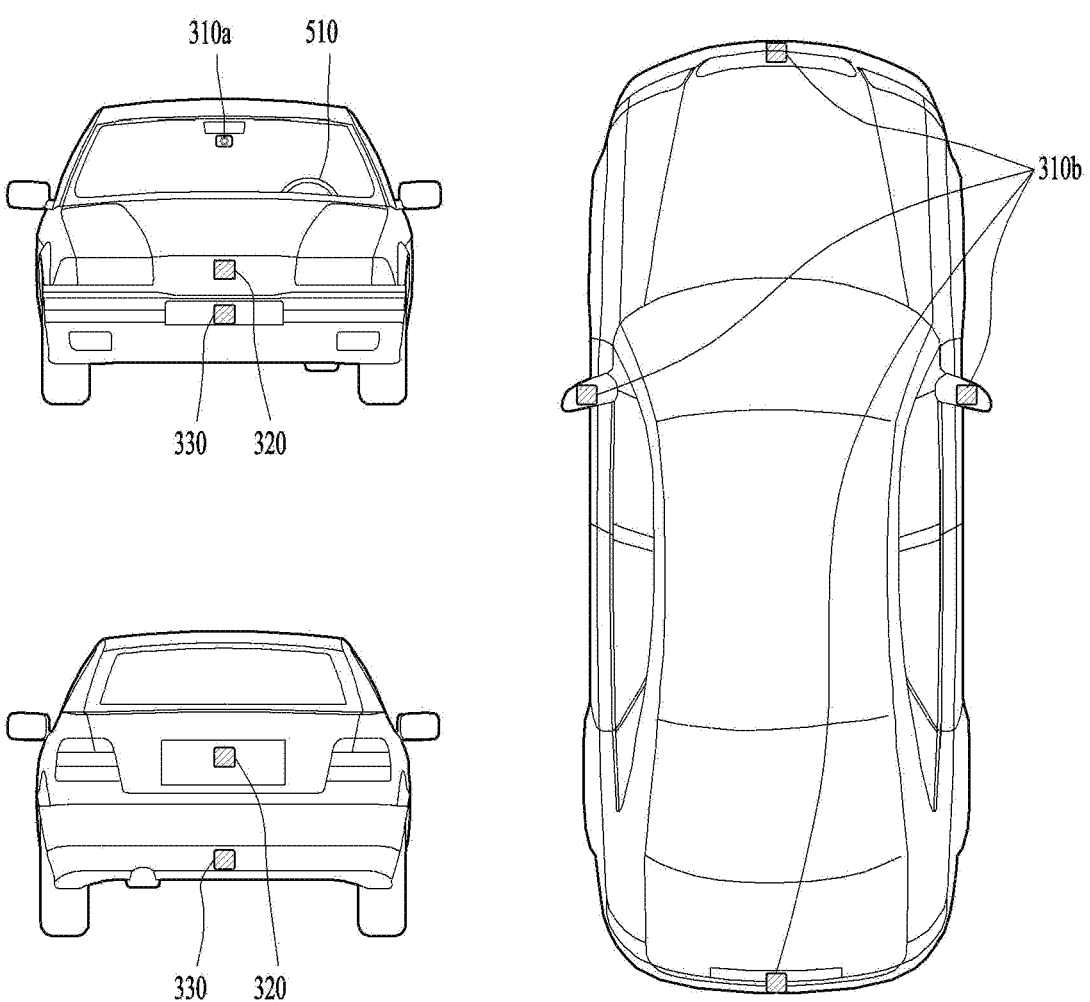
FIG. 2 is a diagram illustrating appearance of a vehicle at various angles in accordance with an embodiment of the present disclosure.

FIG. 2 is a diagram illustrating appearance of a vehicle at various angles in accordance with an embodiment of the present disclosure.

Figure 3:
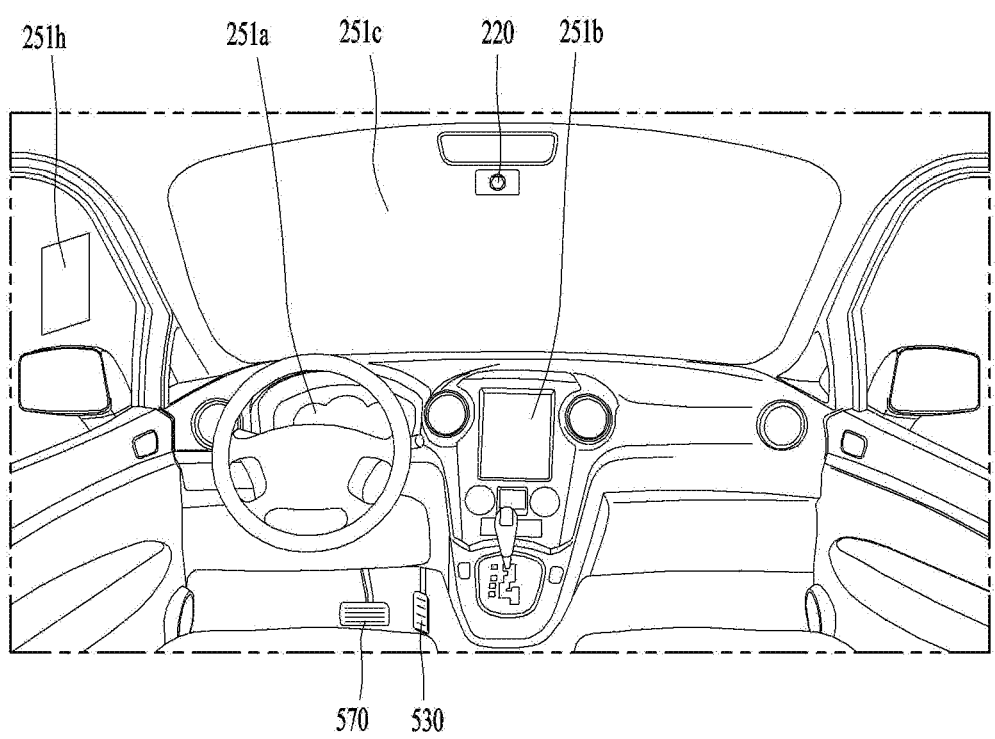
FIGS. 3 and 4 are diagrams illustrating an inside of a vehicle in accordance with an embodiment of the present disclosure.
Figure 4:
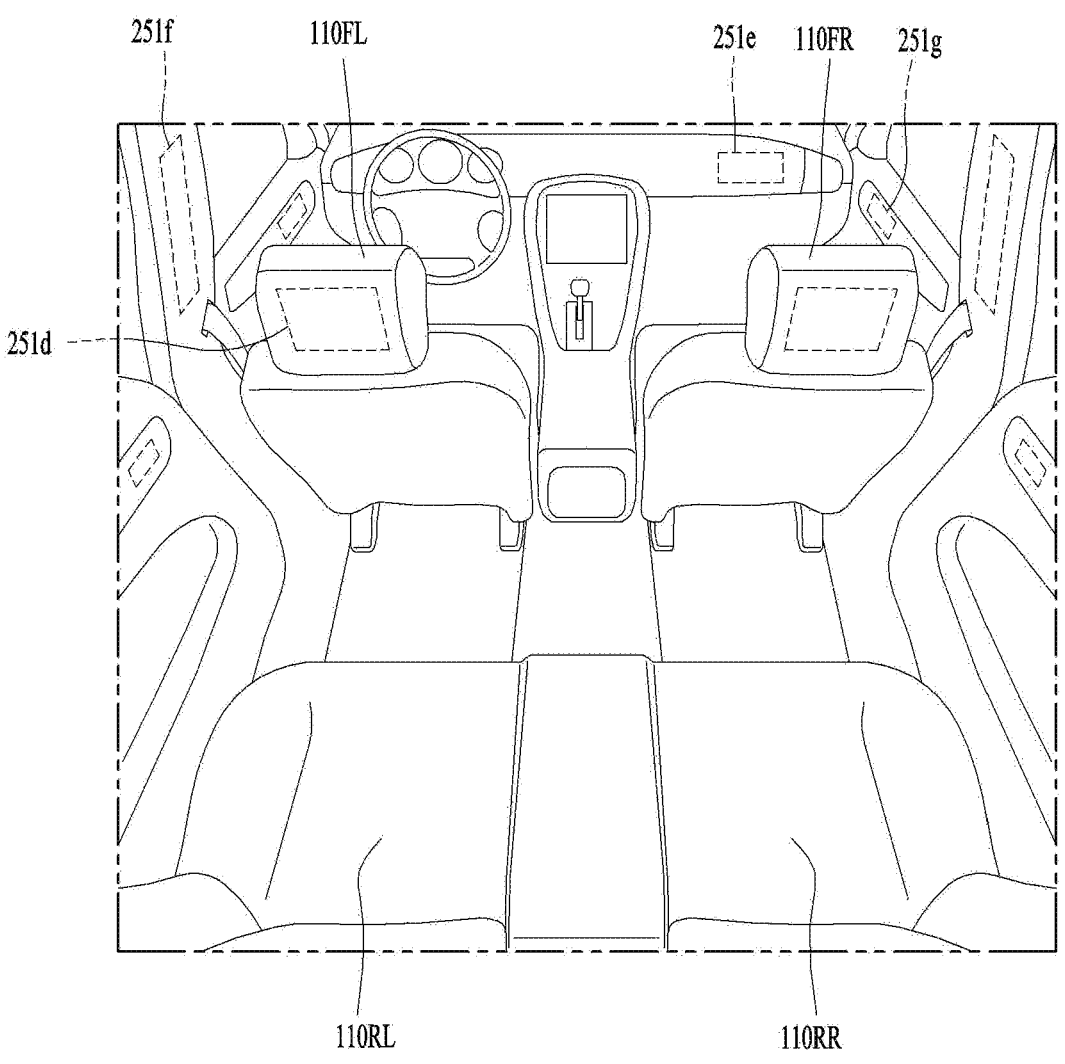

FIGS. 3 and 4 are diagrams illustrating an inside of a vehicle in accordance with an embodiment of the present disclosure.

Figure 5:
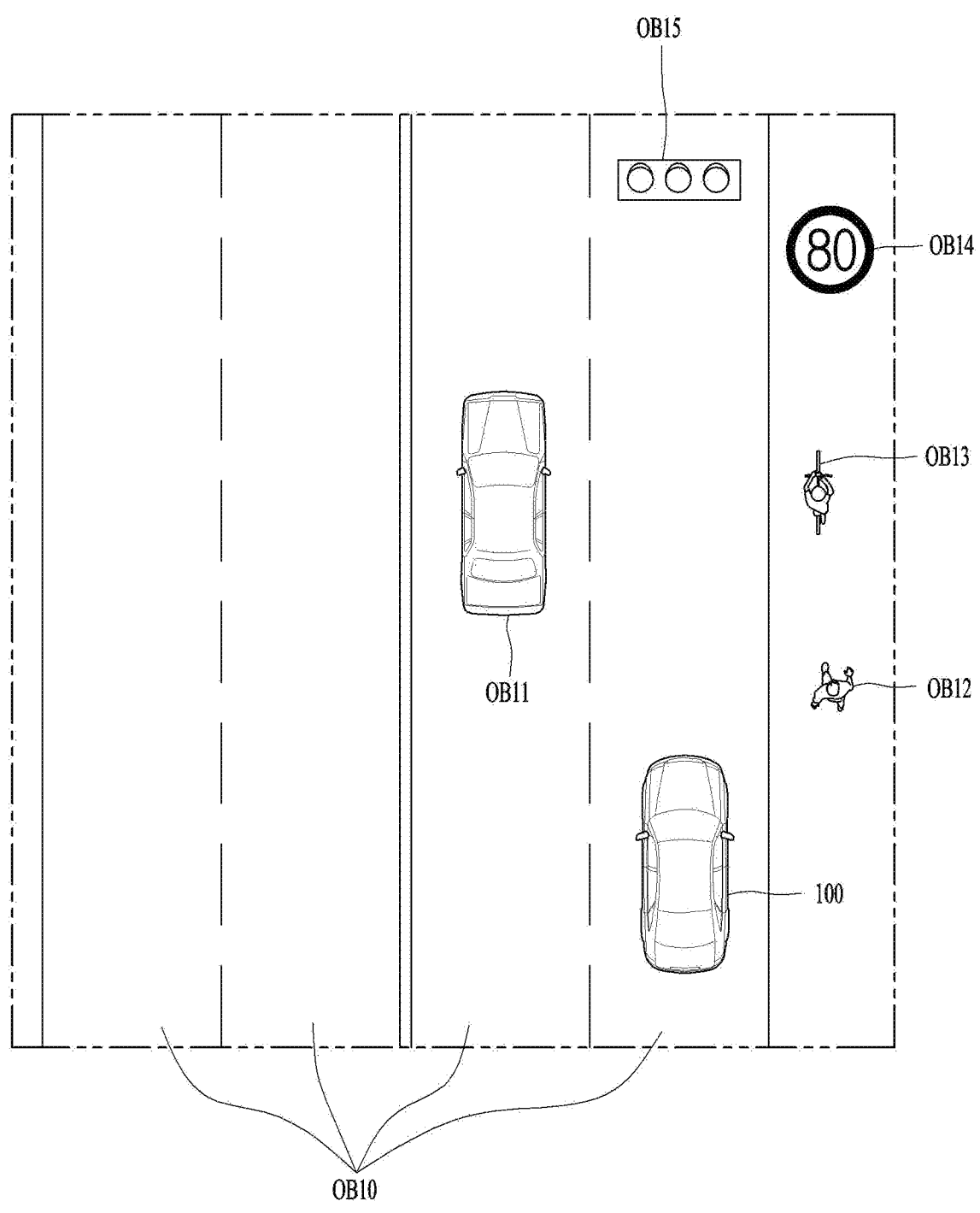
FIGS. 5 and 6 are diagrams illustrating objects in accordance with an embodiment of the present disclosure.
Figure 6:
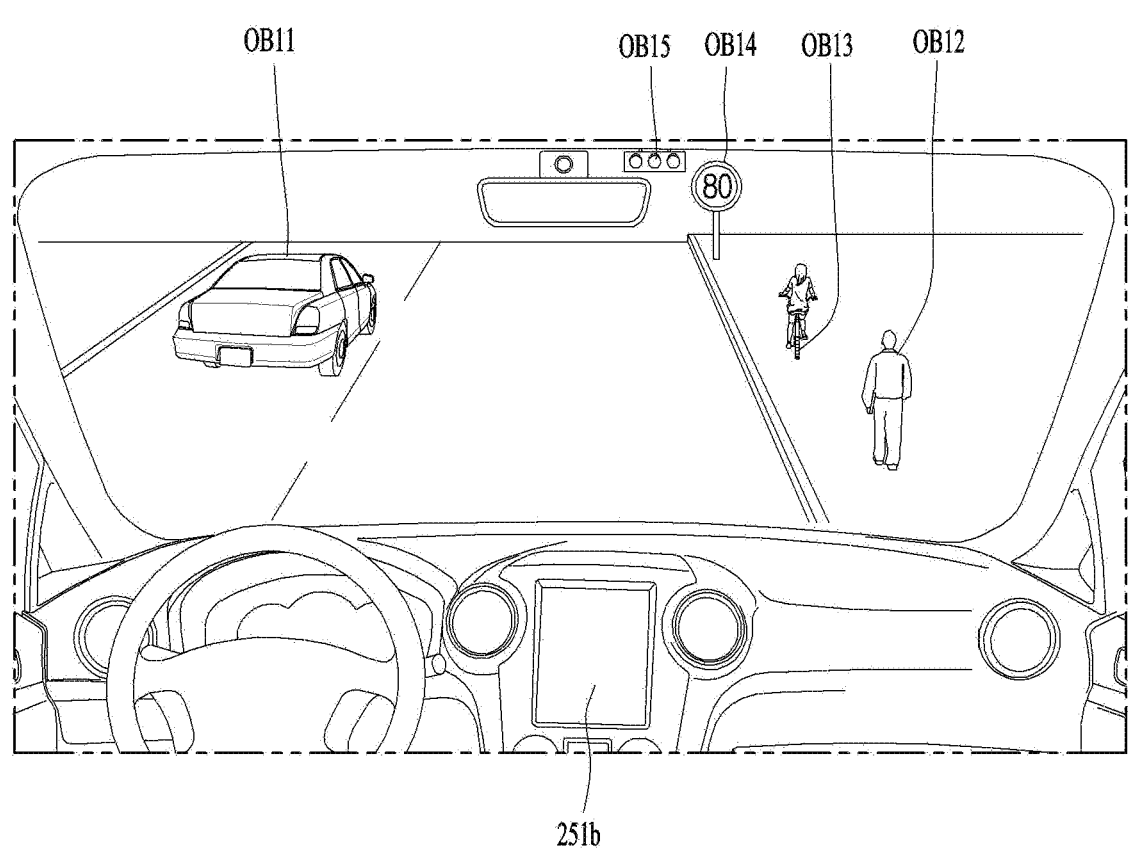

FIGS. 5 and 6 are diagrams illustrating objects in accordance with an embodiment of the present disclosure.

Figure 7:
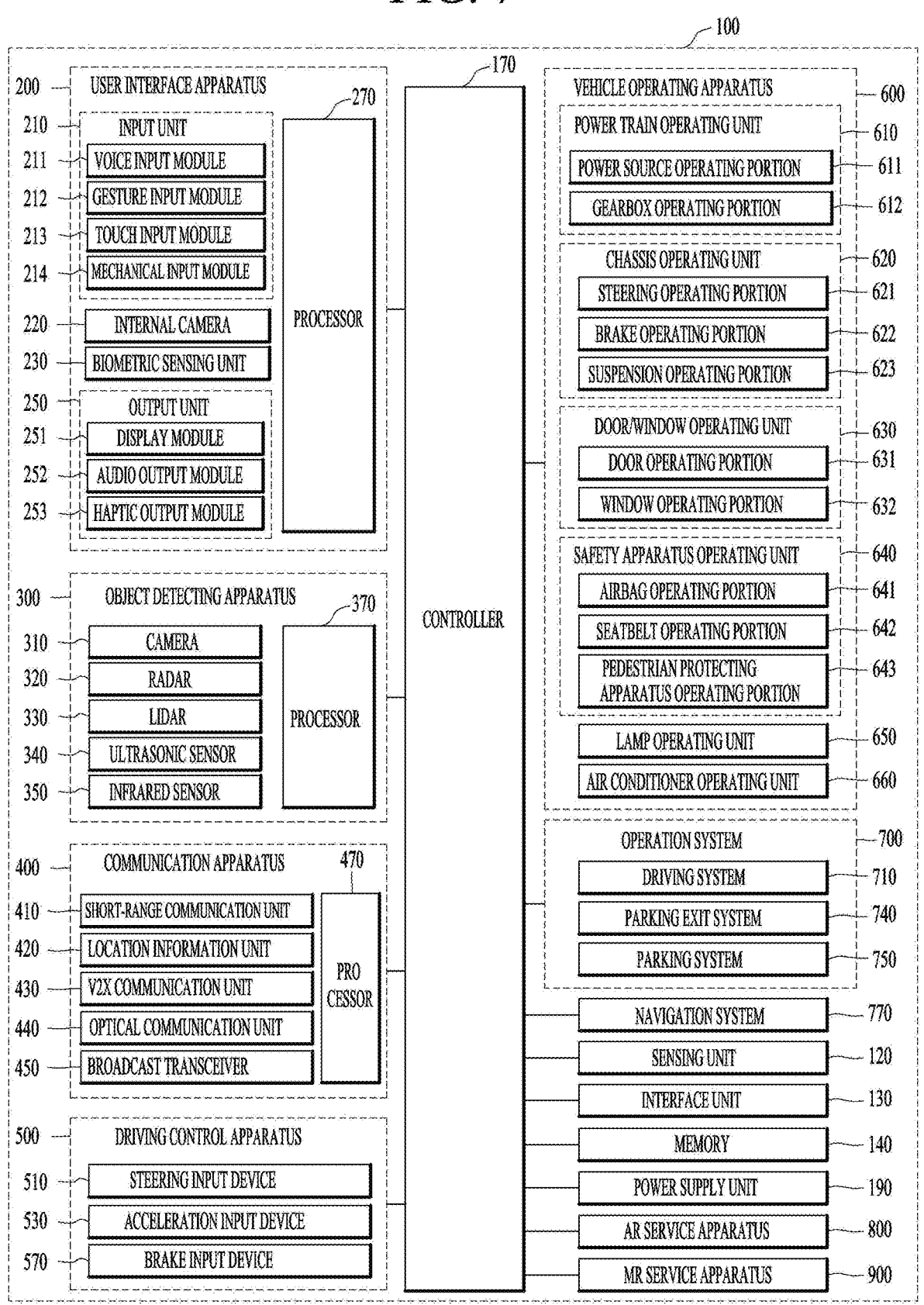
FIG. 7 is a block diagram illustrating a vehicle in accordance with an embodiment of the present disclosure.

FIG. 7 is a block diagram illustrating a vehicle in accordance with an embodiment of the present disclosure.

Referring to FIGS. 1 through 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle 100 may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous mode into the manual mode based on driving environment information generated in the object detecting apparatus 300.

In an example, the vehicle 100 may be switched from the manual mode into the autonomous mode or from the autonomous mode into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface device 200, an object detection device 300, a communication device 400, a driving control device 500, a vehicle operation device 600, an operation system 700, a navigation system 770, a sensing unit 120, an interface unit 130, a memory 140, a controller 170 and a power supply unit 190.

In some implementations, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 100 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 200 may be disposed inside the vehicle. The input unit 200 may be disposed inside the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 200 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170

The touch input module 213 may include a touch sensor for detecting the user's touch input.

According to an embodiment, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel, and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing unit 230 may include a sensor for detecting the user's biometric information and acquire fingerprint information and heart rate information regarding the user using the sensor. The biometric information may be used for user authentication.

The output unit 250 may generate an output related to a visual, auditory or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251*c* of a windshield or one area 251*h* of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a terrain, an animal, and the like.

The lane OB10 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB12 may refer to a vehicle (transportation facility) that is located near the vehicle 100 and moves using two wheels. The two-wheeled vehicle OB12 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge, and the like.

The geographical feature may include a mountain, a hill, and the like.

Meanwhile, objects may be classified into a moving object and a fixed object. For example, the moving object may be a concept including another vehicle and a pedestrian. The fixed object may be a concept including a traffic signal, a road, and a structure, for example.

The object detecting apparatus 300 may include a camera 310, a radar 320, a LIDAR 330, an ultrasonic sensor 340, an infrared sensor 350, and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310*a*, an AVM (Around View Monitoring) camera 310*b*, or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Alternatively, the camera 310 may be disposed adjacent to a rear bumper, a trunk, or a tail gate.

For example, the camera 310 may be disposed adjacent to at least one of side windows within the vehicle to acquire a side image of the vehicle. Alternatively, the camera 310 may be disposed adjacent to a side mirror, a fender, or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented by a Frequency Modulated Continuous Wave (FMCW) scheme or a Frequency Shift Keying (FSK) scheme according to a signal waveform in a continuous wave radar scheme.

The radar 320 may detect an object in a time of flight (TOF) manner or a phase-shift manner through the medium of electromagnetic waves, and detect a location of the detected object, a distance from the detected object and a relative speed with the detected object.

The radar 320 may be disposed on an appropriate location outside the vehicle for detecting an object which is located at a front, rear, or side of the vehicle.

The LIDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a time of flight (TOF) manner or a phase-shift manner through the medium of laser light, and detect a location of the detected object, a distance from the detected object and a relative speed with the detected object.

The LiDAR 330 may be disposed on an appropriate position outside the vehicle for detecting an object located at the front, rear, or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear, or side of the vehicle.

The infrared sensor 350 may include infrared light transmitting and receiving portions. The infrared sensor 340 may detect an object based on infrared light, and detect a location of the detected object, a distance from the detected object and a relative speed with the detected object.

The infrared sensor 350 may be disposed on an appropriate location outside the vehicle for detecting an object located at the front, rear, or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor 370 may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the lidar 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 400 may operate according to the control of the controller 170.

The communication apparatus 400 is an apparatus for performing communication with an external device. Here, the external device may be another vehicle, a mobile terminal, or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications may include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring location information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit capable of implementing a communication protocol with an infrastructure (V2I), a communication protocol between vehicles (V2V) and a communication protocol with a pedestrian (V2P).

The optical communication unit 440 is a unit for performing communication with an external device through the medium of light. The optical communication unit 440 may include an optical transmission part for converting an electric signal into an optical signal and transmitting the optical signal to the outside, and an optical reception part for converting the received optical signal into the electric signal.

According to an embodiment, the optical transmission part may be formed integrally with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal, and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input apparatus 510 may receive an input regarding a driving (ongoing) direction of the vehicle 100 from the user. The steering input apparatus 510 is preferably configured in the form of a wheel allowing a steering input in a rotating manner. According to some embodiments, the steering input apparatus may also be configured in a shape of a touch screen, a touchpad, or a button.

The acceleration input apparatus 530 may receive an input for accelerating the vehicle 100 from the user. The brake input apparatus 570 may receive an input for braking the vehicle 100 from the user. Each of the acceleration input apparatus 530 and the brake input apparatus 570 is preferably configured in the form of a pedal. According to some embodiments, the acceleration input apparatus or the brake input apparatus may also be configured in the form of a touch screen, a touch pad, or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to an embodiment, the vehicle operating apparatus 600 may further include other components in addition to the components described, or may not include some of the components described.

In some examples, the vehicle operating apparatus 600 may include a processor. Each unit of the vehicle operating apparatus 600 may individually include a processor.

The power train operating unit 610 may control an operation of a power train apparatus.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque, and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis apparatus.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protection apparatus operating portion 643 may perform an electronic control for a hood lift and a pedestrian airbag. For example, the pedestrian protection apparatus operating portion 643 may control the hood lift and the pedestrian airbag to be open upon detecting pedestrian collision.

The lamp operating portion 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operation device 600 may operate according to the control of the controller 170.

The operation system 700 is a system that controls various driving modes of the vehicle 100. The operation system 700 may be operated in the autonomous driving mode.

The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include at least one processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600, and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path guidance information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a location (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In some examples, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be various storage apparatuses such as a ROM, a RAM, an EPROM, a flash drive, a hard drive, and the like in terms of hardware. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each element according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Figure 8A:
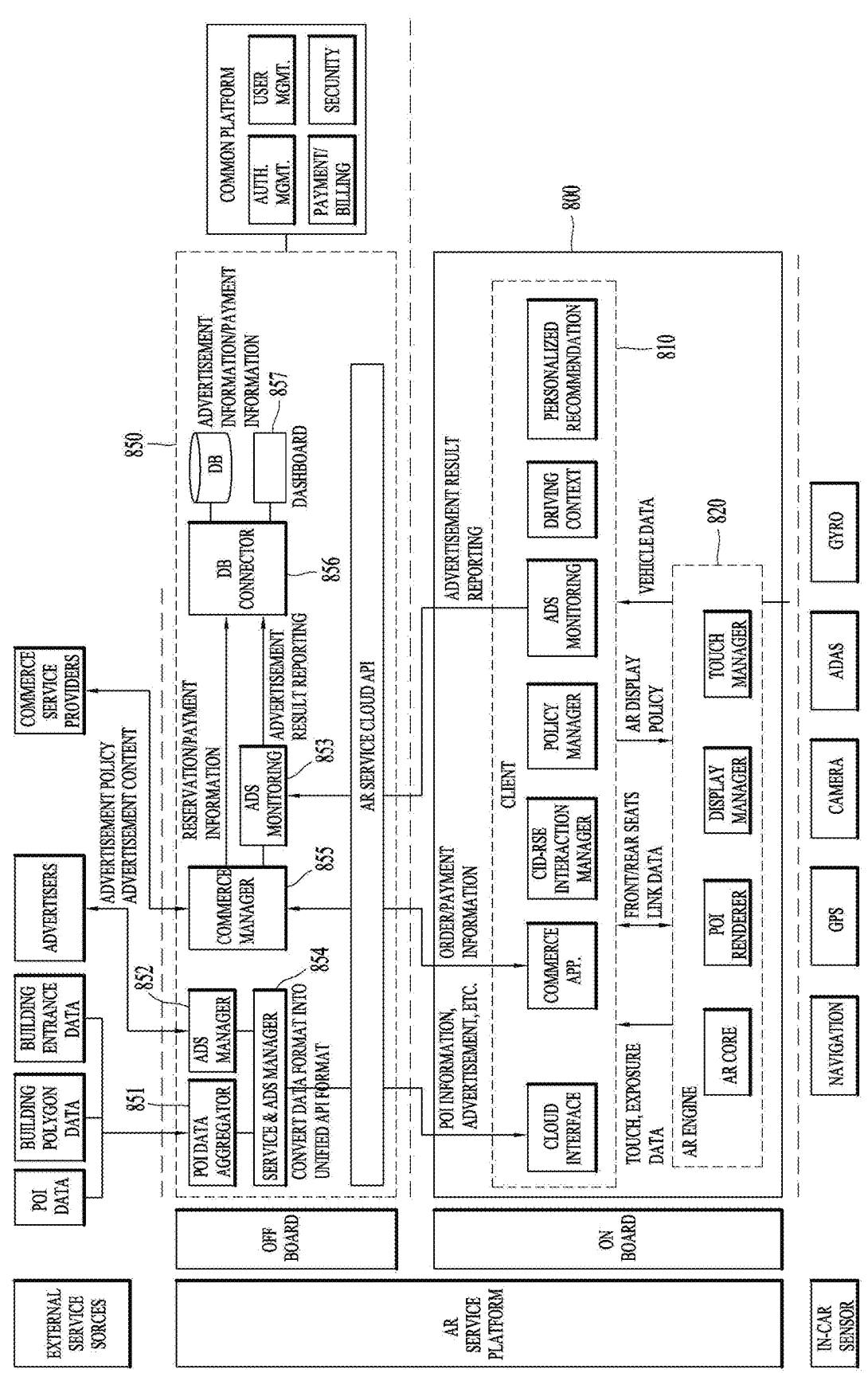
FIG. 8A is a conceptual view illustrating an AR service platform according to the present disclosure.

FIG. 8A is a conceptual view illustrating an AR service platform according to the present disclosure.

An AR service platform providing an AR service according to the present disclosure may be referred to as an AR service system.

The AR service platform may include a server 850 that is disposed outside a vehicle, collects and processes information necessary for an AR service, and transmits the information to the vehicle, and an AR service device 800 that is disposed inside the vehicle and provides an AR service using the information transmitted from the server 850.

The configuration that the server 850 collects and processes information necessary for the AR service and transmits the information to the vehicle may include the meaning that the server 850 collects and processes information necessary for the AR service and transmits the information to the AR service device 800 disposed in the vehicle.

The AR service device 800 may vary information provided through the AR service, based on a situation of the vehicle.

That is, the AR service device 800 according to the present disclosure may dynamically adjust (vary) information and an amount of information to be displayed in AR according to a situation of the vehicle, and select information to be emphasized.

In addition, the AR service platform according to the present disclosure may control an AR service provided in the vehicle to be varied depending on specific conditions such as a situation of the vehicle, an advertisement exposure condition, and the like.

In the case of the related art AR navigation, when displaying a destination or a major POI (Point of Interest) in AR navigation, it is difficult to reflect the latest information because of using information stored in map data, and there is a limitation that POI, such as fueling/parking, including real-time properties is not provided.

On the other hand, the AR service platform according to the present disclosure may converge location information of a vehicle, map information, a plurality of sensor data, real-time POI information, advertisement/event information, and the like, and display the converged information on an AR navigation.

For example, in order to display AR information, the AR service device 800 according to the present disclosure may receive AR service information from the server based on a current location of the vehicle and navigation route/guide information, and process the AR service information into a form to be displayed on an AR navigation screen.

For example, the AR service device 800 according to the present disclosure may reconstruct real-time AR display information. The AR service device 800 may reconfigure service data received from the server to be displayed on an AR navigation screen by determining a display format, size, location, exposure method, etc. of an AR content in consideration of a driving situation (e.g., varying an exposure position and size of POI according to driving speed, changing an exposure position of service information according to traffic conditions, adjusting a display position and exposure time of an AR wall, etc.)

In addition, the AR service device 800 according to the present disclosure may analyze exposure frequency of AR display information through user feedback.

The server 850 may perform a content exposure frequency analysis by collecting user input information (input information such as touch, order, etc.) for an AR service content, and adjust a service content exposure policy based on the information.

Through this configuration, the present disclosure can converge various external service contents to be expressed in the AR navigation, and can provide various services through POI information including real-time properties.

In addition, various types of AR contents such as advertisements, events, and major landmark information as well as POI information can be displayed.

In addition, a new user experience of AR navigation can be presented through a UX scenario-based embodiment proposed in the present disclosure.

The present disclosure provides a service platform structure and AR information display method (UX) that dynamically adjusts an amount of information (POI data, advertisements) to be displayed in AR according to a vehicle situation and an advertisement exposure condition, a module that collects POI information and commerce service information for AR expression and processes the collected information into a form to be easily rendered in an AR engine, a module that emphasize specific POI information according to an internal/external situation of the vehicle, a module that collects vehicle situation information and applies a UX policy appropriately to the situation, and an AR engine module that renders an AR object (Group Poi, Mini Poi, 3D Object, Event wall, etc.) according to the UX policy.

The present disclosure may provide a client module that performs interaction and data transmission/reception between displays of front and rear seats of a vehicle, a service App module that exposes commerce service information associated with POI, a client module that collects user actions on advertisements, such as exposure results, clicks, and the like for AR advertisement objects, and a client module that collects/analyzes the user actions on the advertisements, such as the exposure results, clicks, and the like for the AR advertisement objects.

Referring to FIG. 8A, the AR service platform of the present disclosure may include a server 850, which is a component (off-board component) existing outside the vehicle, and an AR service device 800, which is a component (on-board component) disposed inside the vehicle.

First, the server 850 may include a POI data aggregator 851, an advertisement (Ads) manager 852, an Ads Monitoring (unit) 853, a service & Ads manager 854, a commerce manager 855, a DB connector 856, and a dashboard 857.

The POI data aggregator 851 may receive information necessary for an AR service from a plurality of external servers and convert/integrate the received information into a message format of the AR service platform.

The Ads manager 852 may perform advertisement information/content management and advertisement campaign (ad exposure condition) management.

The advertisement monitoring unit 853 may collect/store advertisement exposure and click results.

The service and advertisement manager 854 may insert advertisement information suitable for an exposure condition into service information to provide to a client.

The commerce manager 855 may collect commerce service interaction/payment information.

The DB connector 856 may store/query advertisement contents, advertisement exposure result information, and commerce payment information.

The dashboard 857 may display a real-time AR service status by visualizing advertisement exposure results/payment details.

In addition, the server 850 may further include an AR service cloud API (or data conversion unit) that converts information transmitted from the AR service device 800 of the vehicle into a data format to be usable by the server, and converts information processed/generated in the server into a data format to be usable by the AR service device 800.

Meanwhile, the AR service device 800 may include a client 810 that includes a cloud interface, a commerce App, a CID-RSE interaction manager, a policy manager, advertisement monitoring, driving context, and personalized recommendation, etc., and an AR engine 820 that includes a POI renderer, a display manager, a touch manager, etc.

The client 810 may receive POI information, advertisements, and the like from the server.

In addition, the client 810 may transmit/receive order/payment information with the server 850 and transmit an advertisement exposure result to the server 850.

The AR engine 820 may transmit to the client 810 data such as the number of touches and the number of exposures with respect to an AR object which is output in AR.

The AR engine 820 may also transmit/receive interlocking data for front/rear seats (CID-RSE) interaction data with the client 810, and output an AR object according to an AR display policy received from the client 810.

In addition, the AR engine 820 may determine a type of an AR object, an output position of the AR object, a type of POI, an output size of the POI, etc. provided through an AR service on the basis of data collected from a gyro sensor, a camera, a communication unit, a navigation, an Advanced Driver Assistance System (ADAS), a GPS, etc.

The on-board AR service device 800 may perform AR rendering of service contents so that data received from the cloud server is displayed in AR on a front camera image.

In addition, the AR service device 800 may mediate data transmission between the server and the AR engine, such as collecting advertisement posting result data from the AR engine and transmitting the data to the server.

The AR service device 800 may also perform CID-RSE (i.e., front/rear seats) interoperation data generated in AR.

The AR service device 800 may perform data management for AR display policies, and specifically, may provide AR display policy data according to a driving situation to the AR engine.

The AR service device 800 may provide situation awareness and personalized service, and specifically, may provide an AR object to the AR engine according to a driving situation (speed, turn-by-turn (TBT), etc.) using in-vehicle data.

In the present disclosure, an example of providing an AR service by outputting AR information (or AR object, AR content, POI information, etc.) to overlap an image captured (received, processed) through a camera disposed in a vehicle will be described as an example.

However, it is not limited thereto, and may be equally/similarly applied to various methods of implementing augmented reality, such as outputting AR information directly on a windshield of a vehicle to overlap a space of the real world, or outputting AR information through a head-up display (HUD), on a driver or passenger basis.

Input data (input information) used to provide the AR service and output data (output information) provided through the AR service platform are as follows.

First, types of input data may include map information (navigation information), service content information (POI, advertisement, etc.), dynamic information, vehicle sensor information, historical information, and driving-related information.

The map information (navigation information) may include route information (navigation route) to a destination, guidance information (Turn-by-Turn), a shape of road ahead (road/lane), and a plurality of map attribute information (road type/attribute, width, curvature, slope, speed limit, etc. of road and lane, and the like), localization object information (road marking, traffic sign, etc.), and the like The service content information (POI, advertisement, etc.) may include POI information received from a plurality of service providers, advertisement information that can be received at a current location, and real-time information for reservation/payment services of gas stations, charging stations, parking lots, and the like.

The dynamic information may include traffic information (road-unit traffic, lane-unit traffic), event information (accident, hazard warning, etc.), weather information, V2X (V2V, V2I), etc.

The vehicle sensor information may include current location information (GPS/DR), camera input information (ADAS information, object recognition information), and V2X (real-time surrounding information that can be collected through V2V and V2I).

The historical information may include information related to past driving routes, traffic history (e.g., traffic per time zone), communication speed according to zone and time, and the like.

The driving-related information may include a driving mode (manual, autonomous driving, semi-autonomous driving, whether to operate an ADAS function, etc.), whether a destination or via-point has entered, whether to enter a parking lot, and the like.

Output information that may be provided through the AR service platform may include current location/route-based AR service display data.

The current location/route-based AR service display data may include an AR advertisement display-available point on a route (highlighting AR Wall, POI building), selectable AR building information (selectable main building information such as landmarks), general POI information (icons or POI summary information such as icons or speech bubbles), remote POI information (displaying distance/direction of important POI information that does not exist on the route but is helpful for driving), display information output when multiple POIs exist in the same building, information related to a destination building and a real-time parking lot status, real-time status information of gas stations/charging stations, location-based advertisement/event information, and the like.

The AR service platform according to the present disclosure may filter AR service information according to real-time information and determine a display method.

Specifically, the AR service platform may determine the number of POI to be exposed in real time based on driving speed, POI overlap removal, size adjustment, exposure time, and the like.

In addition, the AR service platform may determine a POI exposure method according to risk information recognition, and specifically, may dynamically change a POI display method depending on an accident, construction, a situation of recognizing a plurality of moving objects, and the like.

The AR service platform may dynamically change a POI display position when a situation in which AR display visibility is deteriorated due to traffic occurs.

The AR service platform may reconstruct front/rear-seat (CID-RSE) AR display data. For example, the AR service platform may reconstruct the CID-RSE AR display data such that AR service information is minimized on the front-seat display and all information to be displayed is displayed on the rear-seat display.

The operation/function/control method of the AR service platform may be implemented by the server included in the AR service platform or the AR service device, or may be implemented by an organic interaction between the server and the AR service device.

Hereinafter, a more detailed description of the configuration of the server 850 of the AR service platform will be given with reference to FIG. 8A.

The service & Ads manager 854 may perform a client request function, aggregation of POI information and advertisement information (data processing & aggregation), and a client respond function.

Specifically, the client request function may include request/reception of POI information (location, category) from a unified API or request/reception of destination entrance location information (one selected from destination coordinates/address/id) from the unified API.

Here, the unified API refers to an API (to minimize client variation) defined in an AR service cloud that is not dependent on a specific data provider.

The POI information and advertisement information aggregation (data processing & aggregation) function may include aggregation of POI information and advertisement information within a radius of 000 m from a location requested by a client (from data manager, Ads manager), or aggregation of destination entrance location and POI advertisement information requested by the client (from data manager, Ads manager).

Specifically, the function of aggregating POI information and advertisement information may include a function of matching POI information with advertisement information including information regarding a building wall and an event wall, or filtering a plurality of POIs in the server according to priorities when the plurality of POIs are present in the same building (e.g., excluding other POI information except for partner companies).

Here, a filtering criterion may include assigning priorities to POIs, respectively, and comparing the priorities of the POIs.

The client response function may include transmitting POI information and advertisement information to a unified API or transmitting destination entrance location and advertisement information to the unified API.

A data manager (not shown) included in the server 850 may perform a POI information collection/forward function, a building shape (polygon) information collection/forward function, and a destination entrance information collection/forward function.

The POI information collection/forward function may include a function of requesting POI information from a third-party API or forwarding (to service & Ads aggregator) the POI information received from the third-party API (by converting the same into a unified API response format).

The building shape (polygon) information collection/forward function may include a function of requesting building contour information from the third-party API/data set, or forwarding (to service & Ads aggregator) POI information received from the third-party API (by converting the same into a unified API response format).

The destination entrance information collection/forward function may include a function of requesting destination entrance information from the third-party API or forwarding (to service & Ads aggregator) the destination entrance information received from the third-party API (by converting the same into a Unified API response format).

The advertisement manager 852 may provide a partner (advertisement) company management interface, an advertisement campaign management interface, and an advertisement content management interface.

The advertisement monitoring unit 853 may perform a function of receiving advertisement effect measurement feedback and a function of transmitting advertisement information.

The partner (advertisement) company management interface may perform a POI advertiser management (advertiser information addition/modification/deletion) and a general advertiser management (advertiser information addition/deletion).

A POI support advertisement format may include a brand POI pin, a building wall, 3D rendering, an event wall, etc. and a support advertisement format (general support advertisement format) of a brand advertisement (e.g., Coca-Colar advertisement, etc.) that is not involved in an actual POI/location may be an event wall.

The advertisement campaign management interface may perform addition/modification/deletion of an advertisement campaign (an advertisement location, type, time, etc.).

The advertisement content management interface may perform addition/modification/inquiry/deletion of content (POI brand icon image, building wall image, event wall image/video, 3D rendering image) for each advertisement format.

The function of receiving advertisement effect measurement feedback may include a function of receiving advertisement exposure feedback transmitted by the client and forwarding it to a DB manager (CPC/CMP/CPT&P).

The advertisement information transmitting function may include a function of searching for and transmitting advertisement campaign information to be exposed within a radius of 000 m from a location requested by the service & Ads aggregator (in case of CPT&P, transmitting only advertisements that meet a time condition).

The commerce manager 855 may perform a client interoperating function, an external commerce service interoperating function, and a payment information management function.

The client interoperating function may include a function of receiving a request by interoperation with the client through the unified API, converting the request received through the unified API into an external commerce API specification, converting data received from an external API into a message format of the unified API, and forwarding the data to the client.

The commerce manager may convert the request received through the unified API into the external commerce API specification and perform an external service interoperating function based on the converted result.

Converting the data received from the external API into the message format of the unified API may mean a task of converting data received through the external service interoperation into the format of the unified API.

The external commerce service interoperating function may be configured to perform request and result reception for a list of stores adjacent to a current location and meta information thereof, request and result reception for detailed information regarding a specific store from the list, request and result reception for reservations/orders, request and result reception for a service usage status, and link (interoperation) and result reception for membership information of a commerce service.

Here, the request and result reception for the service usage status may be used for sequence management and AR message pop-up according to the service use status (completion of reservation/entering a parking lot/parking in progress/leaving a parking lot/cancellation of reservation).

The link and result reception for membership information of the commerce service may be used for linking information between commerce service members↔AR service members (OEM connected service members).

The payment information management function may include a function of collecting payment details (content, amount) for an external commerce service and charging a fee to an external commerce company based on the payment details.

The database (DB) connector 856 may perform an advertisement effect measurement data management function, a commerce data management function, an advertiser data management function, an advertisement content data management function, and an advertisement location data management function.

The advertisement effect measurement data management function may save/delete log data related to CPC/CPM/CPT&P and perform data search (by POI, by brand, by time, by advertisement type).

The commerce data management function may save/delete payment details (contents, amount) made in an external commerce service and perform data search (by POI, by brand, by time, by advertisement type).

The advertiser data management function may perform storage/modification/deletion/inquiry of advertiser information and advertisement campaign settings for each advertiser.

The advertisement content data management function may store/modify/delete/retrieve advertisement contents in association with advertiser information.

The advertisement location data management function may manage event wall section coordinates and building wall coordinates (by brand) for displaying AR advertisements, and may divide such coordinates into coordinates registered by the user and specific coordinates obtained through interoperation with an API of a company/

The dashboard (service dashboard) 857 may perform an advertisement effect measurement data visualization function and a commerce service data visualization function.

The advertisement effect measurement data visualization function may provide CPC: a chart for total clicks on advertisement by company/brand (checkable by period), CPC: an aggregate chart for total clicks on advertisement (checkable by period), CPM: a chart for total advertisement impressions by company/brand (checkable by period), CPM: an aggregate chart for total advertisement impressions (checkable by period), CPT&P: a chart for clicks on advertisement by company/brand (checkable by period), and CPT&P: a chart for advertisement impressions by company/brand (checkable by period).

Such charts may be provided in various ways, such as bar graphs, line graphs, pie charts, word graphs, or geospatial graphs.

CPT&P refers to billing per time other than the number of clicks or impressions, but may be used as data to measure an exposure effect.

The commerce service data visualization function may provide a chart for a cumulative amount of payments by company (checkable by period) and a chart for a total cumulative amount of payments (checkable by period).

Figure 8B:
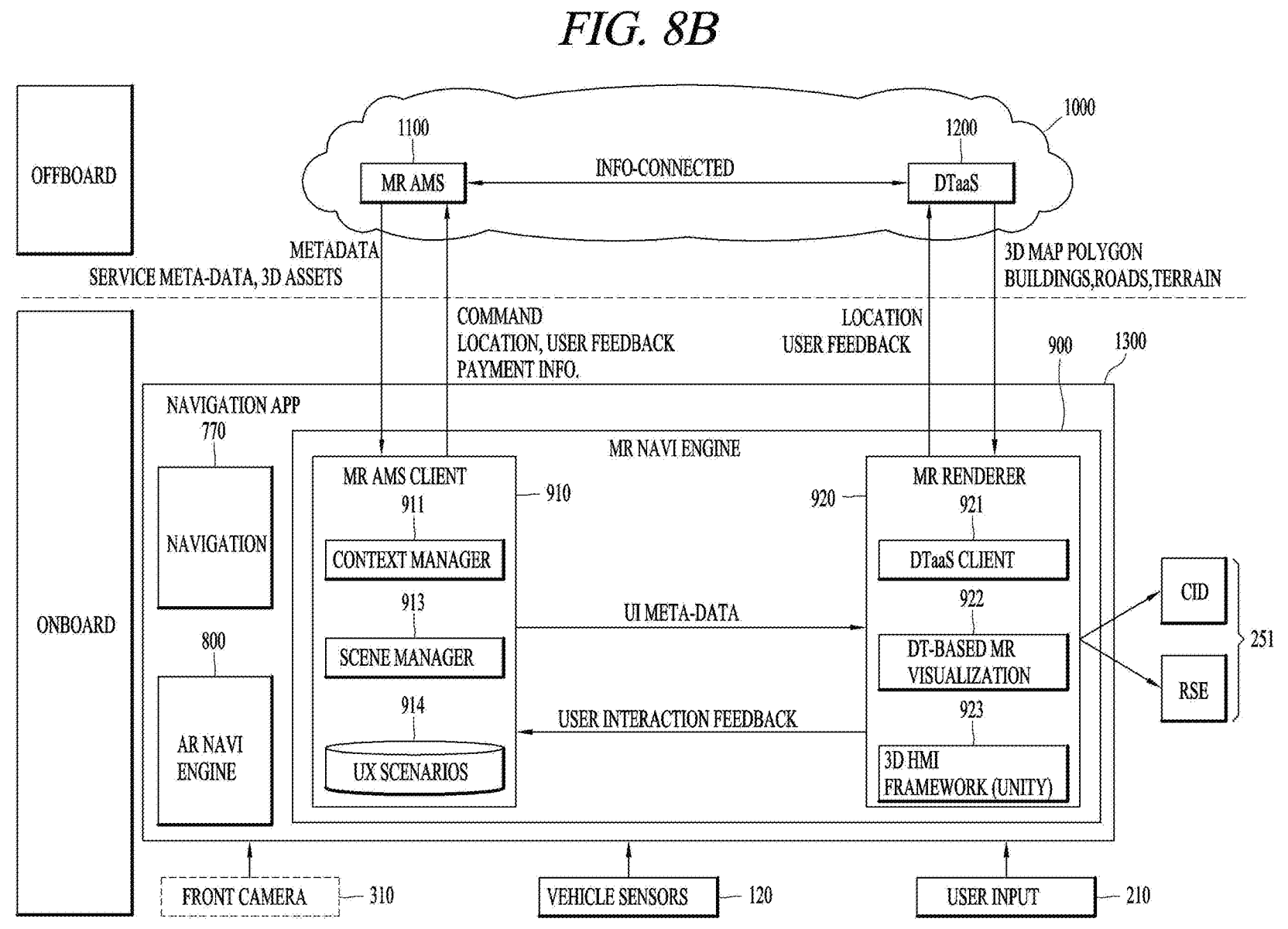

FIG. 8b is a conceptual view illustrating an MR service platform for providing an MR service according to the present disclosure.

The present disclosure may provide a mixed reality (MR) service platform capable of providing an MR automotive metal service (MR AMS) (hereinafter, also referred to as an MR service).

The MR service platform may be referred to as an MR service system, an MR navigation system, an MR platform, an MR system, and the like.

An MR service platform refers to a platform capable of providing services based on mixed reality, and may include several independent components.

For example, the MR service platform may include an MR service device 900 (or referred to as an MR navigation engine) which is on board the vehicle, an MR AMS (hereinafter, referred to as an MR AMS server) server 1100 and a digital twin as a service (DTaaS) server 1200 which are disposed on an external server end (or cloud end) off-board the vehicle.

The MR service device 900 may include an MR AMS client 910 and an MR renderer 920.

The MR service described herein may be understood as an MR navigation service for a vehicle. That is, the MR service platform of the present disclosure may provide a vehicle interface implemented in mixed reality to a user on board the vehicle.

The MR service provided by the MR service platform of the present disclosure may provide an experience of a digital world through a display disposed in the vehicle even though the user is driving the vehicle in the real world.

Specifically, the MR service may interactively provide a driver with a user experience for route guidance, safe driving, POI (Point of Interest), and entertainment in a virtual 3D space in which real world information is converged with a digital world.

Through this, the MR service platform of the present disclosure may provide a variety of user experiences (UXs) deviating from space-time constraints compared to camera-based (or head-up display (HUD)-based) augmented reality (AR) in the related art.

Here, the digital world means a digital twin or a digital twin smart city, and the real world information may include infrastructure data such as Vehicle to Everything (V2X) and Cooperative-Intelligent transport Systems (C-ITS), and/or surrounding data perceived through sensors disposed in an autonomous vehicle.

In addition, the convergence described above may include a conception of converging sensor data of vehicles and infrastructures, in addition to the MR service cloud 1000 (or MR AMS cloud) and the MR service device 900, to implement the MR service platform according to the present disclosure.

In addition, the term "interactive" should be understood as a concept including not only mixed reality navigation, but also high-quality 3D image rendering and user interaction.

On the other hand, mixed reality (MR) described herein may mean an environment in which virtual reality is grafted to the real world and physical objects in the real world and virtual objects can interact with each other.

Mixed reality (MR) may include the meaning of augmented reality (AR) adding virtual information based on reality and augmented virtuality (AV) adding real information to a virtual environment.

In other words, by providing a smart environment where reality and virtuality are naturally connected, users can have rich experiences. For example, a user can interact with a virtual pet sitting in the user's palm or play a game by constructing a virtual game environment in a real room. It may also be possible to virtually rearrange furniture in home, or create an environment where remote people come and work together.

A mixed reality automotive meta service (MR AMS) using mixed reality (MR) according to an embodiment of the present disclosure may express a future driving route as a preview to help a user prepare for road shapes and actions in advance.

Furthermore, the mixed reality automatic meta service (MR AMS) using mixed reality (MR) according to an embodiment of the present disclosure may improve an advertisement effect or induce service usage rate enhancement by allowing the user to watch a specific point of interest (POI).

In addition, the mixed reality automotive meta service (MR AMS) using the mixed reality (MR) according to an embodiment of the present disclosure is not dependent on a specific map provider, and it is also possible to converge data from various map providers.

The present disclosure may provide an MR navigation function as one of the MR AMSs.

Since the MR navigation function is implemented on the virtual world rather than overlaying AR objects on the real world, it is possible to solve a problem of front occlusion or difficulty in achieving matching quality, which occurs in AR navigation.

Accordingly, the present disclosure can improve user experience (UX) by effectively expressing various contexts, which were difficult to be expressed in the existing navigation, through the MR navigation function.

To this end, the MR service platform of the present disclosure may provide an MR context management method, and a method and system for obtaining metadata and 3D assets for providing MR AMS.

The MR service platform of the present disclosure may render related service metadata and 3D assets to MR navigation by defining MR contexts required in a digital world and modeling service metadata to acquire the MR contexts.

Accordingly, the present disclosure may provide an experience of the digital world through the display disposed in the vehicle even during driving in the real world, and recommend to a user various additional human machine interface (HMI) services by utilizing improved visibility and viewability of an MR navigation.

Hereinafter, an MR service platform according to an embodiment of the present disclosure for providing the above-described MR service will be described.

Referring to FIG. 8B, the MR service platform (or MR service system) according to the present disclosure may include an MR service cloud 1000 disposed outside the vehicle and an MR service device 900 disposed inside the vehicle.

The MR service cloud 1100 disposed outside the vehicle (Offboard) may include at least one of a Mixed Reality Automotive Meta Service (MR AMS) server 1100 and a Digital Twin as a Service (DTaaS) server 1200.

The MR service device 900 disposed inside the vehicle (Onboard) may include an MR AMS client 910 and an MR renderer 920.

The MR service device 900 may provide a navigation function (or navigation application) by interoperating with the AR service device 800 and the navigation system 770.

Information required for the navigation function may be received through a user input (or user request) which is input through the camera 310, the sensing unit 120, and the user input unit 210 disposed in the vehicle.

In addition, information necessary for the navigation function may be received through the MR service cloud 1000 disposed outside the vehicle (Offboard), and information that is sensed or processed in the vehicle may also be transmitted to the MR service cloud 1000 in order to receive necessary information in each vehicle.

The MR AMS server 1100, as shown in FIG. 8D, may be connected to various service providers 1300a, 1300b, and 1300c that provide Online map services such as Open Street Map (OSM), Mapbox, HERE, WRLD, BingMAP, etc. The MR MAS server 1100 may also aggregate shape information of each building (e.g., floor footprint information and height information of a building) which is included in a map based on results of aggregating map data provided from the connected service providers 1300a, 1300b, and 1300c, and provide the aggregated information to the DTaaS server 1200. Here, the DTaaS server 1200 may refer to a server or apparatus that provides a service using DTaaS, that is, a digital twin map.

The DTaaS may be abbreviated from Digital Twin as a Service or Digital Transformation as a Service.

Meanwhile, the DTaaS server 1200 may be connected to a POI database in which POI service data for each building or each region included in map information is stored. In addition, the DTaaS server 1200 may be connected to a 3D model database in which data of a 3D polygon model (or a three-dimensional (3D) polygon map) for each building included in the map information is stored. Here, the three-dimensional (3D) polygon model, which is a polygon model capable of providing a building volume, may be a polygon model in which a texture is not defined on a surface thereof. The DTaaS server 1200 may receive service data related to POI from the connected POI database, and may receive data of 3D polygon models of respective buildings included in the map information of a region from the connected 3D model database.

A processor (not shown) of the MR service device 900 may receive various types of information related to vehicle driving from the object detecting apparatus 300, the sensing unit 120, and the navigation system 770. For example, the processor may receive information related to an object detected at the front, rear, or side of the vehicle from the camera 310 of the object detecting apparatus 300.

In addition, the processor may receive information related to vehicle speed, a driving direction of the vehicle, a current location (GPS) of the vehicle, etc. from the sensing unit 120 which includes sensors connected to each component of the vehicle including the driving system 710. The processor may also receive information related to a driving route of the vehicle from the navigation system 770.

Meanwhile, the MR service device 900 and the DTaaS server 1200 may be connected through interface APIs of the MR AMS. Here, the MR service device 900 and the interface APIs of the MR AMS may be connected through a wireless network connection. In this case, the MR AMS server 1100 may be a network server or a cloud server connected to the MR service device 900 in a wireless manner.

In this way, when connected to the MR AMS server 1100, the MR service device 900 may provide at least some of information received from the connected components (e.g., the camera 310, the sensing unit 120, or the user input unit 210 of the vehicle) to the MR AMS server 110 through a network connection. Then, the MR AMS server 1100 may provide 3D map data for providing mixed reality to the MR service device 900, in response to the provided information.

For example, the MR service device 900 may transmit information on objects detected around the vehicle, and information on a speed, a direction of the vehicle, and a current location of the vehicle. Furthermore, information on a driving path may be provided to the MR AMS server 1100. Then, the MR AMS server 1100 may provide the three-dimensional map data of a region according to the current location of the vehicle to the MR service apparatus 900 based on the information provided from the MR service apparatus 900.

In this case, the MR AMS server 1100 may determine POI information based on a current location of the vehicle, a speed of the vehicle, and a driving path of the vehicle, and provide three-dimensional map data further including the determined POI information in the three-dimensional building map. In addition, the MR AMS server 1100 may provide three-dimensional map data further including information on an environment around the vehicle to the MR service apparatus 900 based on the received information on objects around the vehicle.

Meanwhile, the MR service apparatus 900 may render a mixed reality image based on the three-dimensional map data received from the MR AMS server 1100. For an example, the MR service apparatus 900 may control the MR renderer 920 to display a three-dimensional map screen including models of buildings around the vehicle based on the received three-dimensional map data. Furthermore, the MR renderer 920 may display a graphic object corresponding to the vehicle on the three-dimensional map screen, and display graphic objects corresponding to the received POI data and environment information around the vehicle on the three-dimensional map screen.

Therefore, an image of a virtual environment (in other words, an MR image, an MR navigation screen, or an MR navigation interface), which includes a 3D building model similar to the shape of a building adjacent to the vehicle, and a graphic object corresponding to the vehicle may be output to the display 251 disposed in the vehicle, for example, a center information display (CID), a head up display (HUD), rear sheet information (RSI), or rear sheet entertainment (RSE).

In this case, information related to driving of the vehicle and an environment (situation, condition) around the vehicle may be provided to the driver through the virtual environment. Through the three-dimensional map information, that is, a digital twin map (hereinafter referred to as a DT map), the MR service apparatus 900 according to an embodiment of the present disclosure may provide a mixed reality service to the driver.

Meanwhile, the MR AMS server 1100 may determine three-dimensional map data and three-dimensional map data, and POI information that can be provided along with the dimensional map data or environment information around each vehicle based on information collected from the MR service apparatus 900 provided in one vehicle as well as the MR service apparatuses 900 provided in a plurality of vehicles. In this case, the MR AMS server 1100 may collect information from a plurality of vehicles in the form of a cloud server, and generate three-dimensional map data for mixed reality based on the collected information. The MR AMS server 1100 may also be configured to provide the MR service to at least one of MR service devices 900 disposed in different vehicles on the basis of the generated 3D map data.

Therefore, for convenience of description, hereinafter, a cloud or server, including the MR AMS server 1100 and the DTaaS server 1200, which provides metadata for providing a mixed reality service (e.g., service metadata, three-dimensional asset), and three-dimensional map information, that is, a digital twin map (DT map) such as a three-dimensional polygon map and a digital twin map, will be referred to as an MR service cloud 1000.

As shown in FIG. 8B, the MR service device 900 (or MR navigation engine) may include an MR AMS client 910 and an MR renderer 920.

In addition, in order to implement an MR navigation function, which is one of MR services, the MR service device 900 may perform data transmission and reception with the AR service device 800 (or AR engine) and the navigation system 770 disposed in the vehicle.

The MR AMS client 910 may include a context manager 911, a scene manager 913, and a UX scenario database 914.

In addition, the MR renderer 920 may include a DTaaS client 921, an MR visualization unit 922, and a 3D HMI framework 923.

The MR AMS client 910 may collect location information of a vehicle, a user input, user feedback information, payment information, and the like, and transmit them to the MR AMS server 1100 existing outside the vehicle.

The MR AMS server 1100 may transmit at least one of metadata, service metadata, and 3D assets required to provide MR services to the MR AMS client 910, based on the information received from the MR AMS client.

The MR AMS client 910 may transmit the data received from the MR AMS server 910 to the MR renderer 920.

The MR renderer 920 may create a digital twin map using a 3D polygon map received from the DTaaS server 1200 and images received from the MR AMS client 910 or the camera 310 installed in the vehicle.

In addition, the MR renderer 920 may render data received from the MR AMS client 920 as an MR object that can be overlapped on the digital twin map, and overlap the rendered MR object on the digital twin map to generate a mixed reality (MR) image.

Then, the MR renderer 920 may output the generated MR image to the display 251 disposed in the vehicle.

All components described herein may be implemented as separate hardware modules, and may be understood as components implemented in software block units as needed.

Hereinafter, each component constituting the MR service platform will be described in more detail with reference to the accompanying drawings.

Figure 8C:
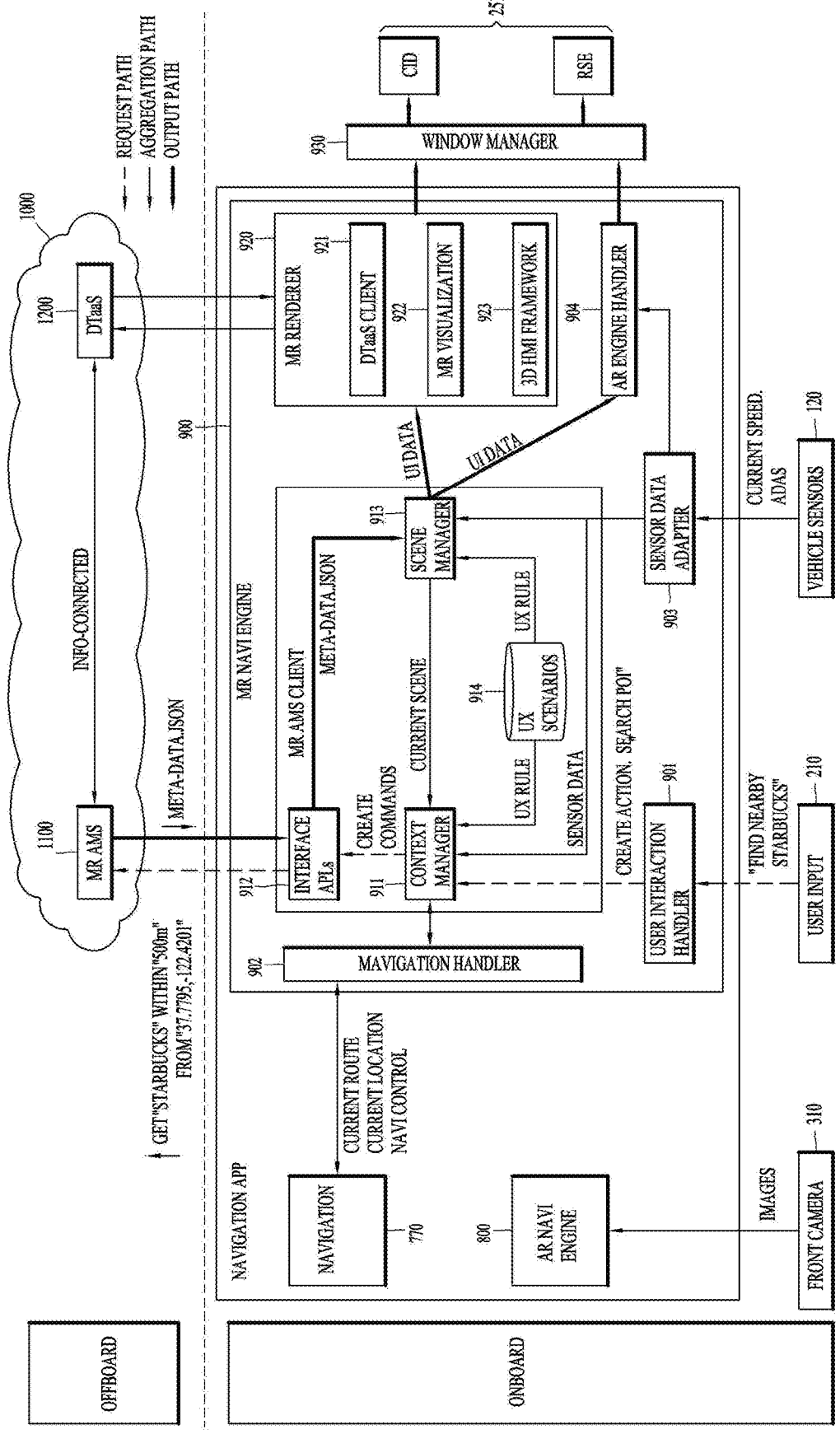
FIG. 8C is a conceptual view illustrating an MR AMS client according to the present disclosure.

FIG. 8C is a conceptual view illustrating an MR AMS client according to the present disclosure.

The MR AMS client 910 may be disposed in a vehicle and may provide a Mixed Reality Automotive Meta Service (MR AMS).

The MR AMS client 910 may include a context manager 911 configured to request a context corresponding to a user request (or user input) from the MR AMS server 1100 disposed outside the vehicle, a scene manager 913 configured to manage MR scene information to be output to the display 251 disposed in the vehicle, and a UX scenario database 914 configured to provide UX rules to at least one of the context managers 911 and the scene manager 913.

Furthermore, the MR AMS client 910 may further include an interface API 912 that calls a function for communicating with the MR AMS server 1100 provided outside the vehicle.

The interface API 912 may include one or more functions configured to perform communication with the MR AMS server 1100. The interface API 912 may convert a data format or message format using these functions to transmit data to the MR AMS server 1100 or convert a format of data received from the MR AMS server 1100.

The interface API 921 may transmit a context request output from the context manager 911 to the MR AMS server 1100, and receive a 3D asset corresponding to the context requested by the MR AMS server 912.

Here, the context may indicate situation information and may mean information corresponding to a situation the vehicle is in. Also, the context may include meaning of contents.

The 3D asset may mean 3D object data corresponding to the requested context. In addition, the 3D asset may indicate a 3D graphic object that is overlaid on a digital twin image (or digital twin map) or is newly updatable.

The MR AMS client 910 may be included in the MR service device 900.

The MR service device 900 may include a user interaction handler 901 that generates an action corresponding to a user input and transmits the action to the context manager 901 when the user input is received through the input unit 210 provided in the vehicle.

The user interaction handler 901 may be included in the MR service apparatus 900 or included in the MR AMS client 910.

For example, when a user input of "Find nearby Starbucks" is received through the input unit 210 of the vehicle, the user interaction handler 901 may generate an action (e.g., "Search POI") corresponding to the user input, and transmit the generated action to the context manager 911 disposed in the MR AMS client 910.

For example, the action may be determined by an operation that matches a term included in the user input. The action may also be named a command or control command.

The context manager 911 may generate a command for requesting a context corresponding to the action received from the user interaction handler 901 and transmit the command to the MR AMS server 1100 through the interface API 912.

The command may be generated based on the action (e.g., "Search POI") received from the user interaction handler 901. For example, the command may be generated to include a current location of the vehicle and type and radius information of POI to be found (e.g., GET "Starbucks" (type of POI) WITHIN "500 m" (radius) FROM "37.7795, −122.4201" (current vehicle location (latitude, longitude)).

The context manager 911 may receive current scene information, which is currently being output in the vehicle, from the scene manager 913 and receive UX rules from the UX scenario database 914.

Also, the context manager 911 may receive navigation information including a current route and a current location from the navigation handler 902 that handles information of the navigation system 770.

The navigation handler 902 may be included either in the MR service device 900 or in the MR AMS client 910.

The context manager 911 may generate a command for requesting the context based on at least one of the current scene information, the UX rules, and the navigation information.

The current scene information may include screen information which is currently being output on the display 251 of the vehicle. For example, the current scene information may include information related to an MR image in which an MR object and an MR interface are overlaid on a digital twin map.

In addition, at least one of the context manager 911 and the scene manager 913 of the present disclosure may receive sensor data processed through a sensor data adapter 903, which processes information sensed by the sensing unit 120 of the vehicle.

The sensor data adapter 903 may be included either in the MR service device 900 or in the MR AMS client 910. The sensor data adapter 903 may transmit the processed sensor data to the AR engine handler 904 that handles data transmitted to the AR engine (or AR service apparatus) 800.

The interface API 912 may receive metadata of a context corresponding to the command and/or a three-dimensional asset corresponding to the context from the MR AMS server 1100.

Then, the interface API 912 may transmit the received metadata and/or three-dimensional asset to the scene manager 913.

The scene manager 913 may generate UI data using the UX rules received from the UX scenario database 914 and the metadata and 3D assets received from the interface API 912.

Then, the scene manager 913 may transmit the generated UI data to the MR renderer 920 that renders the data to be displayed as a mixed reality (MR) or mixed reality image on the display 251 provided in the vehicle.

In addition, the scene manager 913 may further transmit the generated UI data to the AR engine handler 904 that is configured to handle the AR service device 800 disposed in the vehicle.

The UX rules stored in the UX scenario database 914 may refer to information related to rules, shapes, formats, or templates for generating a screen, UX, or user interface to be provided in the MR service device. These UX rules may be previously defined for each type of data.

Also, the UX rules may be updated or modified by a user or administrator.

FIG. 8D is a conceptual view illustrating an MR AMS server according to the present disclosure.

Referring to FIG. 8D, the MR AMS server 1100 which is disposed outside the vehicle and provides the MR AMS may include an interface API 1101 that calls a function for communicating with the MR AMS client disposed in the vehicle, a service aggregation manager 1110 that requests and receives, from a service provider, a context corresponding to a request received from the MR AMS client, and a data integration manager 1120 that loads 3D assets corresponding to the received context from a database (3D assets for MR navigation database 1130.

The interface API 1101 may be named a server interface API 1101 to be distinguished from the interface API 912 of the MR AMS client 910 disposed in the vehicle.

Also, the interface API 912 of the MR AMS client 910 may be named a vehicle interface API or an MR AMS client interface API.

The interface API 1101 disposed in the MR AMS server 1100 may transfer a user request (or context request) received from the MR AMS client to the service aggregation manager 1110.

The interface API may include a first interface API 1101 that calls a function for performing communication with the MR AMS client 910, and second interface APIs 1102a, 1102b, and 1102c through which the service aggregation manager 1110 calls functions for performing communication with service providers 1300a, 1300b, and 1300c.

The second interface API 1102a, 1102b, 1102c may receive service data and/or map data through an interface API provided in the service provider 1300a, 1300b, 1300c.

The second interface API 1102a, 1102b, 1102c and the interface API provided in the service provider 1300a, 1300b, 1300c may perform mutual data transmission and reception, and may include a function defined to convert data format or message format, and may convert data format or message format using such a function to transmit and receive data to and from each other.

The service aggregation manager 1110 may request the requested context from different service providers based on a type of context requested by the MR AMS client 910 provided in the vehicle.

Specifically, the service aggregation manager 1110 may request a first type of context from the first service provider 1300a that provides the first type of context when the requested type of the context is the first type of context, and request a second type of context from the second service provider 1300b that provides the second type of context when the type of the requested context is the second type of context.

For example, when the type of the requested context is related to POI (e.g., "Starbucks"), the service aggregation manager 1110 may request the context related to the POI (or POI data) from the first service provider 1300a, and receive the requested context from the first service provider 1300a.

On the other hand, when the type of the requested context is a view of a certain street, the service aggregation manager 1110 may request context (or imagery data) related to the view of the certain street from the second service provider 1300b that provides information related to the view of the street, and receive the requested context from the second service provider 1300b.

Further, when the type of the requested context is a certain service, the service aggregation manager 1110 may request context (or data for the service for the service (e.g., service ratings or prices) from the third service provider 1300c that provides information related to the service, and receive the requested context from the third service provider 1300c.

In addition, the interface API 1101 may request an expanded service API (expand service API calls) from the service aggregation manager 1110, based on the service requested by the MR AMS client 910 (or context request).

The service aggregation manager 1110 may request and receive information corresponding to the expanded service from the service provider 1300a, 1300b, 1300c based on the expanded service API request, and generate a service API using the information and output the generated service API to the data integration manager 1120.

The data integration manager 1120 may perform data enhancement based on the service API received from the service aggregation manager 1110, and generate a metadata package for the requested context to transmit the generated metadata package to the MR AMS client 910 of the vehicle through the interfaces API 1101.

The metadata package may include the aforementioned 3D assets and service metadata. Here, the service metadata may mean metadata for providing a service corresponding to a requested context.

The interface API 1101 may transmit the 3D assets loaded from the data integration manager 1120 to the MR AMS client 910.

Meanwhile, the MR AMS server 1100 of the present disclosure may further include the context manager 911 described above.

That is, the context manager 911 may be included in the MR AMS client 910 to be provided on the vehicle side, may be included in the MR AMS server 1100 to be provided on the server (cloud) side, or may be provided on both sides.

When included in the MR AMS server 1100, the context manager 911 may be configured to manage context corresponding to a request received from the MR AMS client 910.

The context manager 911 may include a context handler 911a that handles and parses context requests, a context interpreter 911b that manages sessions for interpreting the context requests and generates a context set using data models, and a context graph DB or MR context DB 911c that stores the data models.

Here, the context handler 911a may receive a user request input to the MR AMS client through the interface API 1101, parse the received user request, and transmit the parsed user request to the context interpreter 911b.

The context interpreter 911b may generate a session and then generate a query for a context request corresponding to the user request, and request and receive a context data model corresponding to the query from the context graph database 911c.

The context interpreter 911b may request a context corresponding to the context data model from the service aggregation manager 1110, and the service aggregation manager 1110 may request and receive context data corresponding to the context data model from the service provider 1300a, 1300b, 1300c.

The service aggregation manager 1110 may request and receive a three-dimensional asset (and/or service meta data) corresponding to the requested context from the data integration manager 1120, and transmit context data received from the service provider and the three-dimensional asset (and/or service metadata) received from the data integration manager to the context interpreter 911b.

The context interpreter 911b may transmit the received context data and 3D assets to the MR AMS client 910 disposed in the vehicle through the context handler 911a and the interface API 1101.

Meanwhile, the context manager 911 may further include a context recommender 911d that extracts a recommended context based on the generated context set, and a context controller 911e (or context tracker) that manages a context to be periodically acquired.

When completed context data includes information indicating that a specific service cannot be used, the context recommender 911d may request a generation of query for recommending a service, which can replace the specific service, from the context interpreter 911b.

Figure 9:
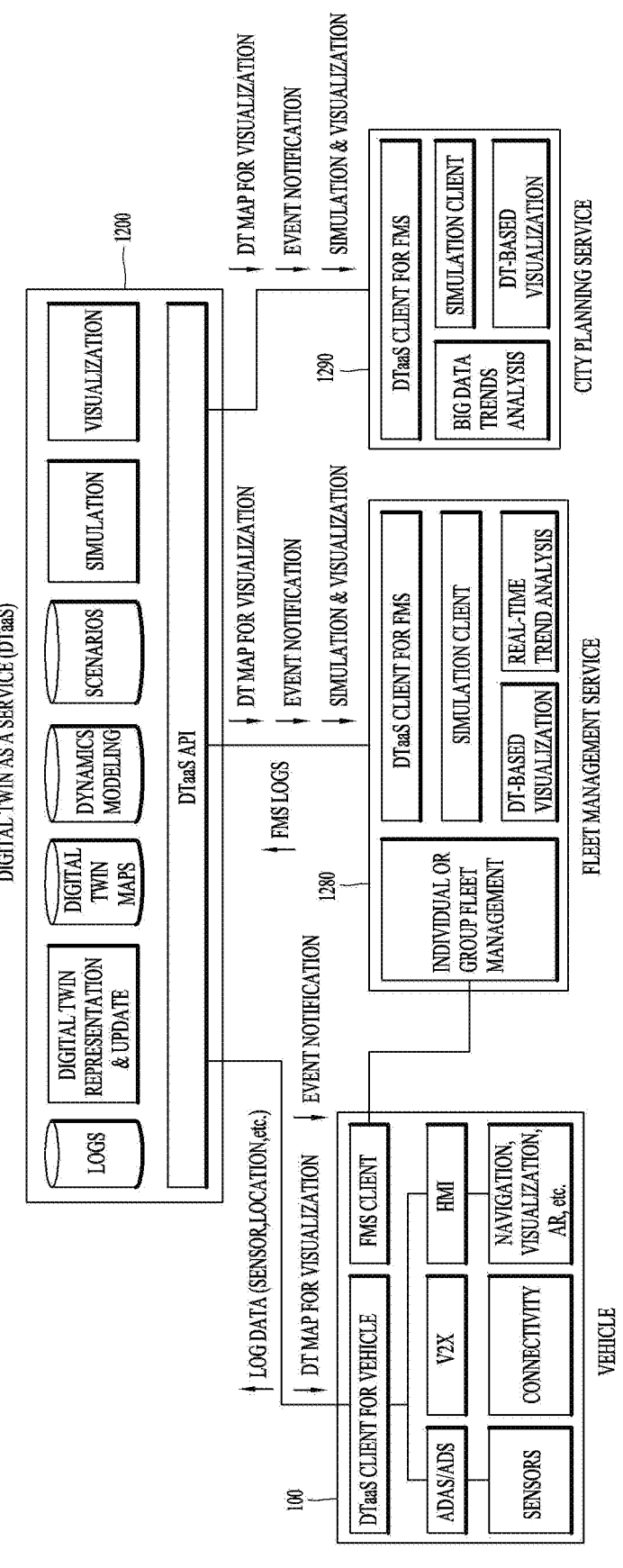
FIG. 9 is a conceptual view illustrating a DTaaS server according to the present disclosure.

FIG. 9 is a conceptual view illustrating a DTaaS server according to the present disclosure.

Referring to FIG. 9, the Digital Twin as a Service or Digital Transformation as a Service (DTaaS) server 1200 of the present disclosure may be disposed outside the vehicle and provide an MR AMS. Specifically, the DTaaS server 1200 may provide a digital twin map or data (e.g., 3D polygon map or all kinds of information regarding objects overlaid on a digital twin), which is necessary to create the digital twin map.

The DTaaS server 1200 may include a DTaaS API 1210 that calls a function for communication with the MR service device 900 disposed in the vehicle, a digital twin maps DB 1220 that stores a digital twin map and a renderable 3D polygon map to be provided to the MR service device, and a processor 1280 that transmits to the MR service device a 3D polygon map corresponding to location information of the vehicle, received from the MR service device, through the DTaaS API.

The DTaaS server 1200 may further include a telecommunication unit (TCU) 1290 that communicates with the MR AMS server 1100 that is disposed outside the vehicle and provides the MR AMS service.

The DTaaS server 1200 may further include a digital twin representation and update unit 1230 that generates a digital twin map by matching an actually-captured image on the 3D polygon map stored in the database 1220.

Furthermore, the DTaaS server 1200 may further include a dynamics modeling DB 1240 that stores dynamic information on a moving object received from at least one of the MR service apparatus 900 and the MR AMS server 1100, and a scenario DB 1250 that stores information related to a scenario that can be implemented in a digital twin.

In addition, the DTaaS server 1200 may further include a simulation unit 1260 that performs a simulation corresponding to a user request on the digital twin, and a visualization unit 1270 that visualizes information to be implemented on the digital twin.

All of the components described above may be implemented as independent hardware (e.g., chips or modules), and may also be implemented as software-blocked components as needed.

The DTaaS server 1200 may perform data transmission and reception through the DTaaS API 1210 not only with the vehicle 100 but also with a fleet management system (FMS) server 1280 that provides a fleet management service (or vehicle group management service), and a server 1290 that provides a city planning service.

For example, the DTaaS server 1200 may collect log information collected from each server from at least one of the vehicle 100, the FMS server 1280, and the city planning service providing server 1290.

Then, the DTaaS server 1200 may store the collected log information in a log database.

The DTaaS server 1200 may provide a digital twin map for visualization from at least one of the vehicle 100, the FMS server 1280, and the city planning service providing server 1290 based on the collected log information.

In addition, the DTaaS server 1200 may transmit at least one of event notification information, simulation information, and visualization information to at least one of the vehicle 100, the FMS server 1280, and the city planning service providing server 1290 based on the received log information.

In some examples, the vehicle 100 may include a route guidance device 1300.

The route guidance device 1300 may include the AR service device 800 and/or the MR service device 900 described above.

The AR service device 800 may be named an AR engine or an AR module, and the MR service device 900 may be named an MR engine or an MR module.

The route guidance device 1300 may perform at least one function/operation/control method of the AR service device 800 and the MR service device 900.

The processor 1330 included in the route guidance device 1300 may be a separate processor 1330 that controls at least one of the AR service device 800 and the MR service device 900, or may refer to the AR service device 800 itself and/or the MR service device 900 itself.

The route guidance device 1300 may control at least one of those components illustrated in FIG. 7. From this perspective, the route guidance device 1300 may be the controller 170.

Without a limit to this, the route guidance device 1300 may be a separate device, independent of the controller 170. When the route guidance device 1300 is implemented as a component independent of the controller 170, the route guidance device 1300 may be provided on a part of the vehicle 100.

Hereinafter, a description will be given of an example in which the route guidance device 1300 is a separate component independent of the controller 170, for the sake of explanation. In this specification, functions (operations) and control methods described in relation to the route guidance device 1300 may be executed by the controller 170 of the vehicle. That is, every detail described in relation to the route guidance device 1300 may be applied to the controller 170 in the same/like manner.

Also, the route guidance device 1300 described herein may include some of the components illustrated in FIG. 7 and various components included in the vehicle. For the sake of explanation, the components illustrated in FIG. 7 and the various components included in the vehicle will be described with separate names and reference numbers.

Figure 10A:
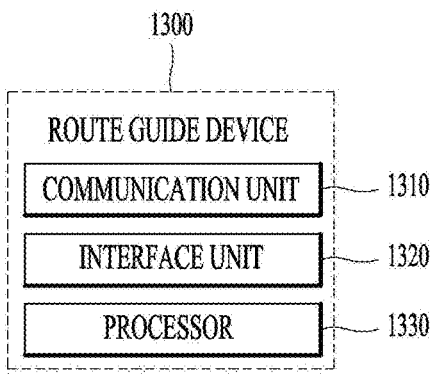
FIG. 10A is a block diagram illustrating a structure of a route guidance device according to an embodiment of the present disclosure.

FIG. 10A is a conceptual view illustrating the route guidance device 1300.

A route guidance device 1300 according to an embodiment of the present disclosure may include a communication unit (or part) 1310, an interface unit (or part) 1320, and a processor 1330.

The communication unit 1310 may be configured to perform wireless communication with at least one of electrical components included in the vehicle (e.g., the electrical components included in the vehicle illustrated in FIG. 7).

In addition, the communication unit 1310 may perform communication with devices, for example, mobile terminals, servers, other vehicles, infrastructures located on roads, and the like, in addition to the vehicle.

The communication unit 1310 may be the communication apparatus 400 described above, and may include at least one of those components included in the communication apparatus 400.

The interface unit 1320 may perform communication with at least one of the components disposed in the vehicle.

Specifically, the interface unit 1320 may perform wired communication with at least one of the electrical components included in the vehicle illustrated in FIG. 7.

Specifically, the interface unit 1320 receives sensing information from one or more sensors disposed in the vehicle 100.

In some cases, the interface unit 1320 may be referred to as a sensor data collector.

The interface unit 1320 collects (receives) information sensed by sensors (V.Sensors) disposed at the vehicle for detecting a manipulation of the vehicle (e.g., heading, throttle, break, wheel, etc.) and sensors (S.Sensors) for detecting surrounding information of the vehicle (e.g., Camera, Radar, LiDAR, Sonar, etc.)

The interface unit 1320 may transmit the information sensed through the sensors disposed at the vehicle to the TCU 1310 (or a processor 1330) so that the information is reflected in the HD map.

The interface unit 1320, for example, may serve as a passage with the electrical components disposed in the vehicle through the interface unit 130 of the vehicle.

The interface unit 1320 may exchange data with the interface unit 130 of the vehicle.

The interface unit 1320 may be connected to the vehicle to serve as a path for receiving electrical energy.

For example, the route guidance device 1300 may be powered on by receiving electrical energy from the power supply unit 190 of the vehicle through the interface unit 1320.

Meanwhile, the present disclosure may include a processor 1330 that controls each component of the connected route guidance device 1300 and controls an overall operation of the route guidance device 1300. The processor 1330 may generate a digital-twin 3D map using at least one of an image captured by the camera disposed on the vehicle, 2D map information, and 3D map information.

The processor 1330 may overlay (overlap or output) a graphic object related to route guidance on the digital twin 3D map.

Here, the graphic object related to the route guidance indicates an object output in augmented reality, and may include various types of objects (e.g., POI objects, carpet-type objects, 3D objects, etc.) that are necessary to perform the route guidance.

In this case, the graphic object related to the route guidance may be named an AR object, and an image, namely, a view image on a display screen displaying the AR object may be named an AR view image.

Also, the graphic object related to the route guidance indicates an object output in mixed reality (MR), and may include various types of objects (e.g., objects on a digital-twin 3D map, etc.) that are necessary to perform the route guidance. In this case, the graphic object related to the route guidance may be named an MR object, and an image, namely, a view image on a display screen displaying the MR object may be named an MR view image.

The route guidance device 1300 may render an MR image based on 3D map data provided from the MR AMS server 1100. For example, the route guidance device 1300 may control the MR renderer to display a 3D map screen including models for buildings around the vehicle based on the provided 3D map data. In addition, the route guidance device 1300 may display a graphic object corresponding to the vehicle on the 3D map screen, and display graphic objects corresponding to provided POI data and situation information around the vehicle on the 3D map screen.

Therefore, an image of a virtual environment including 3D building models similar to shapes of buildings around the vehicle and a graphic object corresponding to the vehicle may be output to the display 251 such as a Center Information Display (CID), a Head Up Display (HUD), Rear Sheet Information (RSI), or Rear Sheet Entertainment (RSE).

In this case, information related to driving of the vehicle and an environment (situation, condition) around the vehicle may be provided to the driver through the virtual environment. The route guidance device 1300 according to an embodiment of the present disclosure may provide an MR service to the driver through the 3D map information, that is, a digital-twin map.

Meanwhile, the MR AMS server 1100 may determine 3D map data and POI information or situation information around each vehicle to be provided together with the 3D map data, on the basis of information collected not only from a route guidance device 1300 disposed in one vehicle but also from route guidance devices 1300 disposed in a plurality of vehicles.

In this case, the MR AMS server 1100 may be a type of a cloud server to collect information from a plurality of vehicles and generate 3D map data for mixed reality based on the collected information. The MR AMS server 1100 may also be configured to transmit MR information for providing an MR service to at least one of route guidance devices 1300 disposed in different vehicles on the basis of the generated 3D map data.

Hereinafter, for convenience of description, the DTaaS server 1200 and the MR AMS server 1100, which is connected to the DTaaS 1200 to provide 3D map information, that is, a digital-twin 3D map for providing MR services will be collectively referred to as a cloud server 1350.

Hereinafter, a description will be given in detail of a method of performing route guidance using an AR view image provided through an image captured from a camera and an MR view image provided through a digital-twin 3D map, with reference to the accompanying drawings.

Figure 10B:
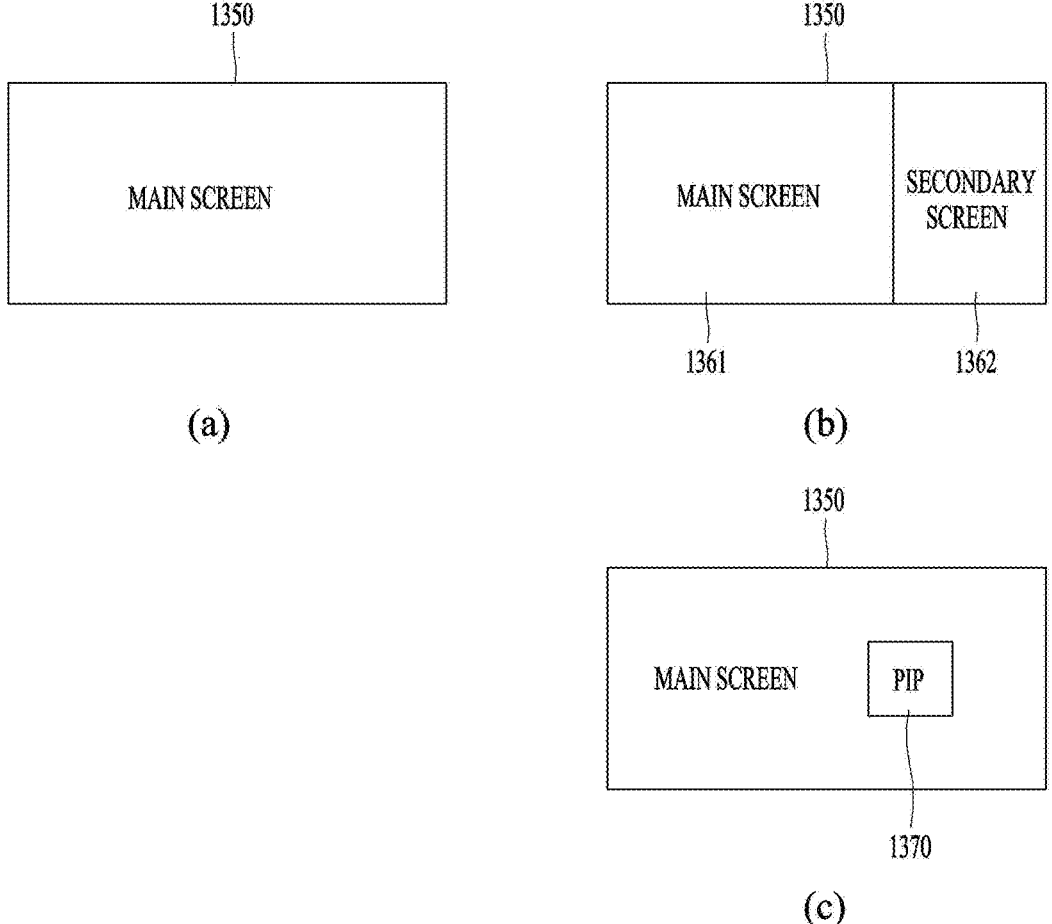
FIG. 10B is an exemplary diagram illustrating an example of a display that displays route guidance information through a route guidance device according to an embodiment of the present disclosure.

FIG. 10B illustrates an example of a display screen 1350 that displays a view image by the route guidance device 1300 according to an embodiment of the present disclosure. The display screen 1350 may be a screen of the display 251 provided in a vehicle equipped with the route guidance device 1300. As an example, the display 251 may be at least one of a Center Information Display (CID), a Head Up Display (HUD), Rear Sheet Information (RSI), or Rear Sheet Entertainment (RSE) provided in the vehicle.

The route guidance device 1300 may provide view images (e.g., AR view image and MR view image) including various objects (e.g., AR objects and MR objects) for displaying route guidance information on the display 251 through the interface unit 1320, such that the display 251 can display at least one of the AR view image including the AR objects and the MR view image including the MR objects. In this case, the display 251 may display at least one of the AR view image and the MR view image under the control of the route guidance device 1300 through the interface unit 1320.

Referring to FIG. 10B, the route guidance device 1300 may output one view image to the entire area of the display screen 1350, as illustrated in (a) of FIG. 10B. In this case, the view image may be an AR view image or an MR view image. Here, when the AR view image is displayed, the route guidance device 1300 may display an image in which at least one AR object is displayed on an actual image acquired from the camera disposed in the vehicle. In this case, the actual image acquired from the camera may be an image taken from the front, a side (left or right), or the rear of the vehicle. The AR object displayed on the image may be a graphic object corresponding to an object located at the front, side or rear of the vehicle or a surrounding environment, depending on a captured image.

On the other hand, when the MR view image is displayed on the display screen 1350, the route guidance device 1300 may display a view image in which an MR object corresponding to the vehicle is displayed at a specific capturing angle corresponding to a passenger's selection or the status of the vehicle. As an example, the route guidance device may display an MR view image, such as a view image according to a bird's-eye view image viewing the vehicle from a top, a side view image viewing the right or left side of the vehicle at a predetermined angle, or a rear side view viewing the rear of the vehicle, by using a digital-twin 3D map.

Meanwhile, in a state where one type of view image is displayed on the display screen 1350, the route guidance device 1300 may switch the view image displayed on the display screen 1350 into a different type of view image depending on whether a preset condition is met. As an example, the route guidance device 1300 may switch a view image displayed on the display screen 1350 into an MR view image when it is difficult to provide a clear AR view image due to a difficulty in acquisition of an image, in which included objects are accurately identified, for example, due to a weather, traffic conditions, illumination around the vehicle, and the like, in a state where the AR view image is displayed on the display 251. In this case, a state where route guidance information is provided through AR may be switched into a state where it is provided through MR. The route guidance information may then be provided through the MR view image.

Alternatively, in a state where the display 251 outputs an MR view image, the route guidance device 1300 may switch the view image displayed on the display screen 1350 into an AR view image and provide route guidance information through the AR view image according to whether it is possible to provide the AR view image. In this case, route guidance information provided through MR may be switched into a state provided through AR.

Hereinafter, a description will be given in detail, with reference to FIGS. 11 to 15, of an operation process, in which the route guidance device 1300 switches an operation mode from an AR operation mode that displays an AR view image into an MR operation mode that displays an MR view image based on preset conditions related to a vehicle, or controls the display 251 to provide route guidance information using a view image, which is more appropriate for current status and surrounding environment of the vehicle, of an AR view image and an MR view image, and embodiments thereof.

Meanwhile, while one type of view image is displayed on the display screen 1350, the route guidance device 1300 may split the display area to display different types of view images. For example, the route guidance device 1300, as illustrated in (b) of FIG. 10B, may split the display screen 1350 into a main screen area (main screen) 1361 and a secondary screen area (secondary screen) 1362.

In this case, the route guidance device 1300 may control the display 251 to display different types of view images on the main screen 1061 and the secondary screen 1362. That is, the route guidance device 1300 may control the display 251 to display an AR view image on the main screen 1361 and an MR view image on the secondary screen 1362. Or, conversely, the route guidance device 1300 may control the display 251 to display an MR view image on the main screen 1361 and an AR view image on the secondary screen 1362.

Alternatively, the route guidance device 1300 may generate a Picture In Picture (PIP) area 1370 that overlaps at least a portion of the display screen 1350 while one type of view image is displayed on the display screen 1350. In this case, the PIP area may be displayed in a pop-up form and may be an area that overlaps at least a portion of the display screen 1350. In this case, the PIP area 1370 may overlap the display screen 1350 in a multi-layered manner. In this case, the route guidance device 1300 may control the display 251 to display different types of view images on the display screen 1350 and the PIP area 1370. That is, the route guidance device 1300 may control the display 251 to display an AR view image on the display screen 1350 and an MR view image on the PIP area 1370. Or, conversely, the route guidance device 1300 may control the display 251 to display an MR view image on the display screen 1350 and an AR view image on the PIP area 1370.

Hereinafter, a description will be given in more detail, with reference to FIGS. 16 to 20, of an operation process, in which the route guidance device 1300 splits the display screen 1350 and controls the display 251 to display both an AR view image and an MR view image on one screen, and embodiments thereof. Also, a description will be given in more detail, with reference to FIGS. 20 to 22, of an operation process, in which the route guidance device 1300 controls the display 251 to display both an AR view image and an MR view image on one screen by overlaying one type of view image on at least a portion of the display screen 1350 outputting another type of view image, and embodiments thereof.

First, a description will be given of an operation process of the route guidance device 1300 that switches an operation mode from an AR operation mode into an MR operation mode or from the MR operation mode into the AR operation mode and control the display 251 to provide a view image according to the switched operation mode.

Figure 11:
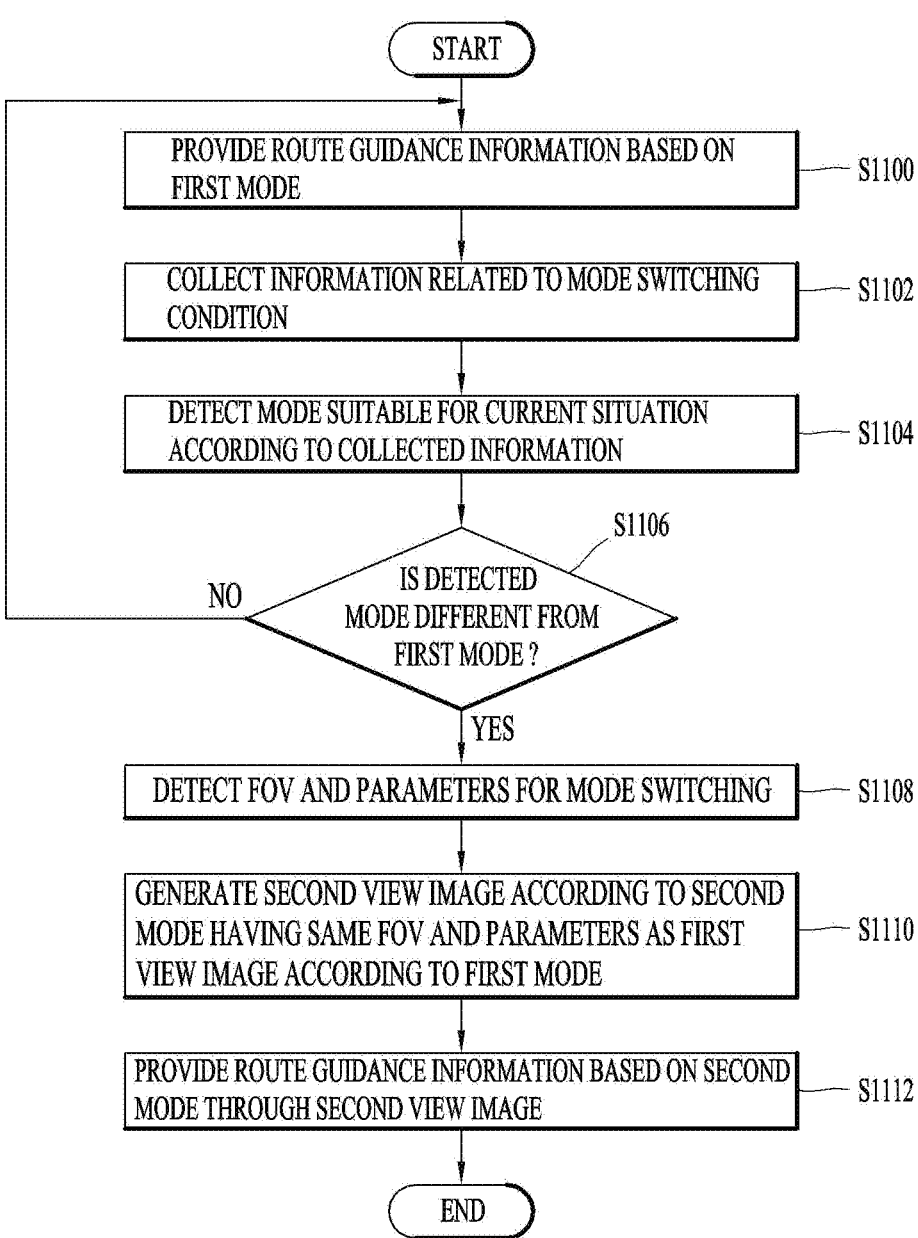
FIG. 11 is a flowchart illustrating an operation process in which a route guidance device according to an embodiment of the present disclosure provides route guidance information through either AR or MR by switching an operation mode.
Figure 12:
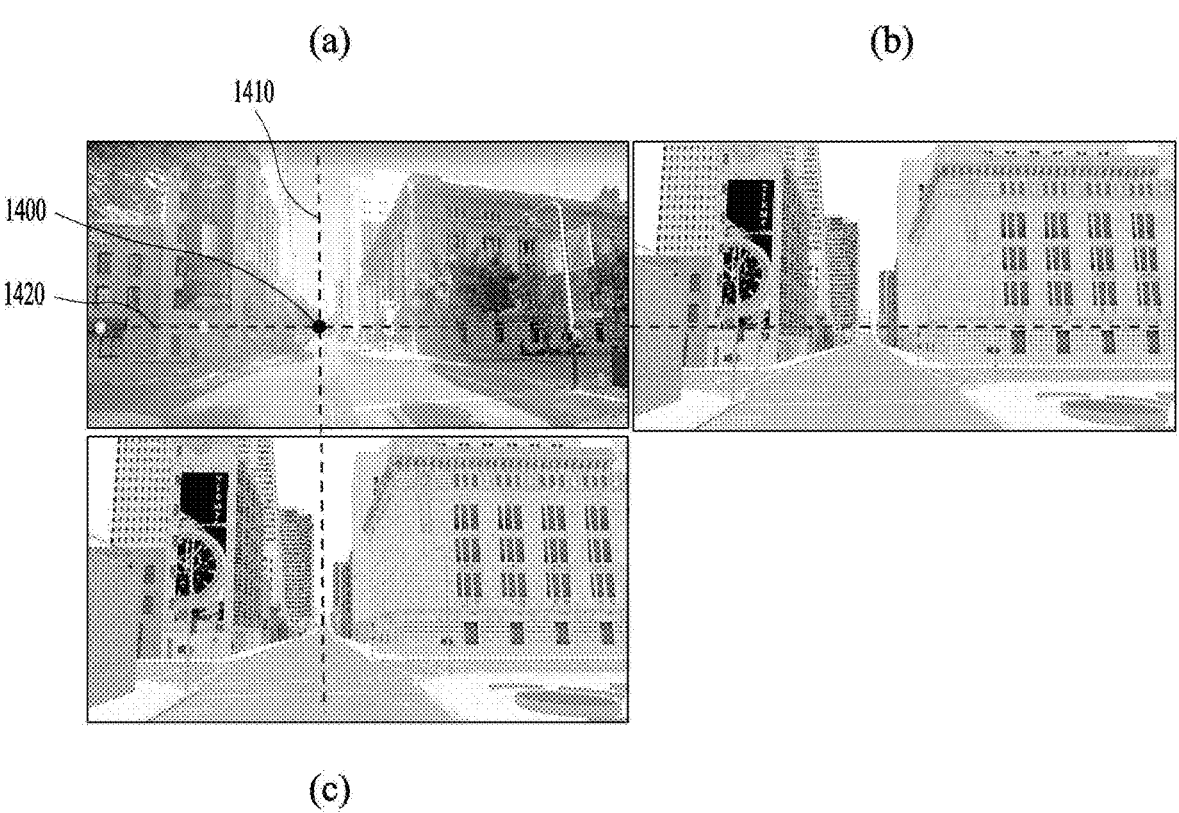
FIG. 12 is an exemplary view illustrating an example in which a route guidance device according to an embodiment of the present disclosure generates an MR view image corresponding to an AR view image.

FIG. 11 is a flowchart illustrating an operation process in which a route guidance device 1300 according to an embodiment of the present disclosure provides route guidance information through either AR or MR by switching of an operation mode. And FIG. 12 illustrates an example in which the route guidance device 1300 according to an embodiment of the present disclosure generates a second view image according to parameters detected from a first view image. FIG. 13 illustrates an example of an AR view image and an MR view image corresponding to the AR view image, displayed on the route guidance device 1300 according to an embodiment of the present disclosure.

First, referring to FIG. 11, the route guidance device 1300 according to an embodiment of the present disclosure may first provide route guidance information through a view image based on a first mode (S1100).

Here, the first mode may be an AR operation mode in which an AR object is displayed on an actual image acquired through a camera according to an AR technology. In this case, the view image displayed in the first mode may be an AR view image including the AR object. Alternatively, the first mode may be an MR operation mode in which a virtual object (MR object) is displayed on a digital-twin 3D map according to an MR technology. In this case, the view image displayed in the first mode may be an MR view image including the MR object.

Additionally, the route guidance information may include not only route information related to a route to a currently set destination but also a lot of information related to the vehicle or an environment around the route. As an example, route guidance information may include information on objects corresponding to a surrounding environment, such as at least one object or building currently located around the vehicle. The route guidance information may also include information related to at least one object located around the route up to the destination or various objects associated with a surrounding of the destination. Information regarding these objects may be included in the form of POI (Point Of Interest) information. In addition, the route guidance information may be information including information related to a current speed or fuel amount of the vehicle, a status of a road on which the vehicle is traveling, whether there is traffic congestion, the weather around the vehicle, a status of the vehicle, or an environment around the vehicle.

In step S1100 of providing the route guidance information based on the first mode, the route guidance device 1300 may collect information related to mode switching conditions based on at least one sensor disposed in the vehicle (S1102). Here, the at least one sensor may include a communication unit 1310 of the route guidance device 1300.

The information related to the mode switching conditions may be information related to a type of route information requested by a passenger, an area or road where the vehicle travels, a driving (traveling) mode of the vehicle, time for which the vehicle travels, the weather, traffic conditions around the vehicle, a driving (traveling) status and environment of the vehicle, whether or not there is a preferred route. Additionally, the information related to the mode switching conditions may be information related to accuracy of a currently displayed view image or a location of a warning generated around the vehicle.

The route guidance device 1300 may detect a mode suitable for a current situation based on the information collected in step S1102 (S1104).

As an example, the route guidance device 1300 may determine a suitable mode based on route information requested by a passenger. When the passenger requests for route information corresponding to a current time point, the route guidance device 1300 may determine that an AR mode, which provides an AR view image displaying an actual image acquired through a camera, is a mode suitable for the current situation.

On the other hand, when the route information requested by the passenger is not route information corresponding to the current time point, that is, when the passenger requests for route information related to a travel route to a junction or destination, to which the vehicle has not traveled yet, or route information related to a travel route that the vehicle has already traveled or POI information related to a route that the vehicle has already passed, the route guidance device 1300 may determine that an MR mode including a digital-twin 3D map and a virtual object is a suitable mode for the current situation.

Alternatively, the route guidance device 1300 may determine an appropriate mode based on an area in which the vehicle is traveling. For example, when a road on which the vehicle is traveling is a highway with low traffic complexity, the route guidance device 1300 may determine that the AR mode providing an AR view image is a mode appropriate for the current situation. On the other hand, when a road on which the vehicle is traveling is an ordinary road in a city with high traffic complexity, the route guidance device 1300 may determine that the MR mode providing an MR view image is a mode suitable for the current situation.

Additionally, the route guidance device 1300 may determine an operation mode of displaying a suitable view image according to a road on which the vehicle is traveling. For example, in the case of a paved road or a road whose curvature is less than a preset threshold value, the route guidance device 1300 may determine that the AR mode is an appropriate mode for the current situation.

Meanwhile, when the road on which the vehicle is traveling is an unpaved road, a road with a curvature exceeding the threshold value, or a road without a lane, it may be difficult to accurately recognize the road based on the image acquired through the camera. For example, it may be difficult to recognize lanes. Therefore, when the road on which the vehicle is traveling is an unpaved road or a road with a curvature exceeding the threshold value, the route guidance device 1300 may determine that the MR mode, which does not use actually captured images, is a more suitable mode for the current situation. Additionally, when the vehicle travels on a ramp for which a height profile is not provided, the route guidance device 1300 may determine that the MR mode is more appropriate mode for the current situation.

Meanwhile, the information related to the status of the road may be collected from a server that provides traffic information or from an image acquired through the camera. Alternatively, the information related to the status of the road may be obtained from a digital-twin 3D map.

Alternatively, the route guidance device 1300 may determine a suitable mode based on a traveling mode of the vehicle. For example, when the vehicle travels in a manual driving mode in which a passenger (driver) directly drives the vehicle, the route guidance device 1300 may determine that an AR mode providing an AR view image is more appropriate for the current situation. On the other hand, when the vehicle travels in an autonomous driving mode in which the vehicle autonomously travels, the route guidance device 1300 may determine that an MR mode providing an MR view image is more appropriate for the current situation.

Alternatively, the route guidance device 1300 may determine a mode suitable for a current situation depending on whether it is possible to acquire an image with brightness contrast greater than a threshold value. For example, when the vehicle is traveling during the daytime, during which an image with clear brightness contrast can be obtained owing to high illuminance, the route guidance device 1300 may determine that an AR mode providing an AR view image using actually acquired images is more appropriate for the current situation.

On the other hand, when the vehicle is traveling at night during which it is impossible to obtain images with brightness contrast higher than the threshold value due to low illuminance, the route guidance device 1300 may determine that an MR mode providing an MR view image using a digital-twin 3D map is an appropriate mode for the current situation. In this way, when the vehicle is traveling at night, the route guidance device 1300 may also display an MR view image including objects with higher visibility with respect to objects around the vehicle (night MR mode).

Meanwhile, the route guidance device 1300, as aforementioned, may determine a mode suitable for a current situation depending on whether it is possible to acquire an image with brightness contrast equal to or greater than a threshold. Therefore, in the case where the illuminance is sufficient (equal to higher than a threshold value) according to a result of detection of ambient illuminance of the vehicle, the route guidance device 1300 may determine that images around the vehicle with brightness contrast more than the threshold value can be obtained even when the vehicle is traveling at night. Therefore, the route guidance device 1300 may determine, of course, that the AR mode is more appropriate even when the vehicle is traveling at night.

Meanwhile, the route guidance device 1300 may also determine a mode suitable for a current situation based on the weather around the vehicle. For example, as a result of sensing the weather around the vehicle, when it is snowy or rainy, or when it is heavily foggy, the route guidance device 1300 may determine that an MR mode using a digital-twin map is more appropriate than an AR mode using actual images. In this case, the route guidance device 1300 may display an MR view image including an MR object in which the weather around the vehicle is reflected. For example, in the case of the snowy or rainy weather, the route guidance device 1300 may display an MR object including an ice-shaped road carpet on an MR view image.

On the other hand, when it is clean without rain, snow, fog, etc., the route guidance device 1300 may determine that an AR mode using actual images is more appropriate for the current situation.

Here, the route guidance device 1300 may collect information related to the weather around the vehicle through a sensor disposed in the vehicle. Alternatively, the route guidance device 1300 may wirelessly connect a weather server that provides weather information related to an area in which the vehicle is currently traveling through the communication unit 1310, and determine the weather around the vehicle based on the weather information provided from the weather server.

Meanwhile, the route guidance device 1300 may also determine a mode suitable for a current situation based on a traffic congestion (traffic flow state, traffic jam) around the vehicle. For example, the route guidance device 1300 may determine that an AR mode displaying an AR view image is appropriate when the traffic congestion around the vehicle is below a predetermined level. However, when the traffic congestion around the vehicle is above the predetermined level, the route guidance device 1300 may determine that an MR mode displaying an MR view image is appropriate.

In this case, the route guidance device 1300 may display an MR view image including MR objects that can be distinguished from each other according to the traffic congestion level on each road around the vehicle.

Here, the traffic congestion levels for respective roads may be provided through a traffic control server that provides traffic information for the area in which the vehicle is currently traveling. In this case, the route guidance device 1300 may determine the traffic congestion levels for the respective road around the vehicle based on the traffic information provided from the traffic control server. The route guidance device 300 may provide the MR view image by displaying MR objects of different colors on the digital-twin 3D map according to the determined traffic congestion levels.

Alternatively, the route guidance device 1300 itself may determine a traffic congestion level. In this case, the traffic congestion level on a specific route may be determined according to a difference between a typically estimated arrival time (first estimated arrival time) that it takes for the vehicle to arrive at its destination when the vehicle travels on that specific route, and an estimated arrival time (second estimated arrival time) at which the vehicle is expected to arrive at the destination.

Meanwhile, the route guidance device 1300 may also determine a mode suitable for a current situation based on a traveling state of the vehicle. For example, the route guidance device 1300 may determine that an MR mode displaying an MR view image is appropriate when the vehicle is in a stopped state. On the other hand, when the vehicle is in a traveling state that the vehicle moves, the route guidance device 300 may determine that an AR mode providing an AR view image is appropriate.

In this case, when the vehicle stops to wait for a signal, the route guidance device 1300 may determine that the MR mode is appropriate, and when the vehicle starts traveling after waiting for the signal, the route guidance device 1300 may determine that the AR mode is appropriate. Therefore, when the vehicle is stopped to wait for a signal while traveling, a view image displayed on the display 251 may be switched from the AR view image to the MR view image. And when the vehicle starts traveling after waiting for the signal, the MR view image may be switched back to the AR view image.

Meanwhile, the route guidance device 1300 may also determine a mode suitable for a current situation based on a traveling speed of the vehicle. For example, when the vehicle is traveling at speed lower than a reference speed, the route guidance device 300 may determine that an AR mode providing an AR view image is appropriate. On the other hand, when the vehicle's traveling speed is higher than the reference speed, that is, when the vehicle is traveling at higher speed than the reference speed, the route guidance device 1300 may determine that an MR mode providing an MR view image is appropriate.

In this case, the route guidance device 1300 may provide an MR view image displaying different MR objects depending on the traveling speed of the vehicle. For example, when the traveling speed of the vehicle is higher than a first speed, the route guidance device 1300 may provide an MR view image in the form of a bird's-eye view looking at an object corresponding to the vehicle from a high altitude. However, when the traveling speed of the vehicle is higher than a second speed which is higher than the first speed, the route guidance device 1300 may provide an MR view image in the form of a drone view that shows a route to be driven by the vehicle in advance, going beyond looking at the object corresponding to the vehicle at the high altitude.

Meanwhile, the route guidance device 1300 may determine a mode suitable for a current situation based on a traveling situation of the vehicle. In this case, the route guidance device 1300 may determine a mode suitable for a current situation based on objects detected from around the vehicle.

As an example, when there is a large vehicle around the vehicle or when there is a structure such as a building or billboard of a preset size or larger within a preset distance from the vehicle, the route guidance device 1300 may determine that an area obscured by the large vehicle or large structure, namely, a blind spot is likely to be generated. Therefore, the route guidance device 1300 may determine that an MR mode providing an MR view image is appropriate when there is the vehicle or structure of the preset size or larger within the preset distance from the vehicle.

Alternatively, the route guidance device 1300 may determine that an MR mode providing an MR view image is appropriate when a dangerous area is detected around the vehicle. Here, the dangerous area may be a pre-designated area, such as an area under construction or a frequent accident area, which requires attention while driving. Alternatively, the dangerous area may be an area designated according to dangerous area information that a preset server providing traffic information or road information provides to adjacent vehicles. When the dangerous area is detected around the vehicle while the vehicle is traveling, the route guidance device 1300 may display warning information regarding the dangerous area through an AR object or an MR object.

On the other hand, when the dangerous area is detected, the route guidance device 1300 may determine that the MR mode providing an MR view image is appropriate. In this way, when the MR view image is provided through the MR mode, the route guidance device 1300 may also provide information regarding the dangerous area to a passenger in advance through a preview function that provides route information regarding an area in which the vehicle is to travel.

Alternatively, when the dangerous area is detected or a collision warning is generated, the route guidance device 1300 may determine that one of an AR mode providing an AR view image and an MR mode providing an MR view image is more appropriate based on a position where the warning information is displayed.

For example, in the case of an AR view image, since an actual image captured by a camera is used, a range in which an AR object can be displayed may be limited to a range within a capturing angle of the camera, that is, a viewing angle. Therefore, when the warning information is exposed within the area displayed through the AR view image, that is, within the viewing angle range of the camera, for example, at the front, the route guidance device 1300 may determine that the AR view image including the AR object corresponding to the warning information is more appropriate for the current situation. Therefore, the AR mode may be determined to be more suitable for the current situation.

However, when the warning information is exposed in an area outside the viewing angle of the camera, that is, in a blind spot such as the rear of the vehicle, the route guidance device 1300 may determine that the MR view image to display the MR object corresponding to the warning information is more appropriate for the current situation. Therefore, the MR mode may be determined to be more suitable for the current situation.

Meanwhile, the route guidance device 1300 may also determine a mode suitable for a current situation based on a travel route of the vehicle. For example, the route guidance device 1300 may determine that an AR mode displaying an AR view image is appropriate for the current situation when the travel route of the vehicle is in a go-straight zone.

On the other hand, when the travel route includes a curve with a preset curvature or greater or a tunnel with a preset length or longer, or when the vehicle deviates from a route on which the vehicle can travel, the route guidance device 1300 may determine that an MR mode displaying an MR view image is a more appropriate mode. Alternatively, when route guidance information to be provided is a junction, exit, or destination on the route, that is, when the vehicle is within a preset distance from the junction, exit, or destination on the route, the route guidance device 1300 may determine that the MR mode is more suitable.

Additionally, the route guidance device 1300 may determine a mode appropriate for a current situation depending on whether a route along which the vehicle is traveling is a route preferred by a passenger. As an example, when a route on which the vehicle is currently traveling is a route preferred by a passenger, the route guidance device 1300 may determine an AR mode displaying an AR view image or a 2D map mode displaying a 2D map as a mode appropriate for the current situation. On the other hand, when a route on which the vehicle is currently traveling is a route not preferred by a passenger, the route guidance device 1300 may determine an MR mode displaying an MR view image as a mode appropriate for the current situation.

Here, whether the route is preferred by the passenger may be determined as a result of learning about the route on which the vehicle travels. That is, when there is a route that the vehicle has traveled more than a preset number of times among a plurality of routes leading to a currently set destination, the corresponding route may be classified as a route preferred by the passenger. On the other hand, a route that has not been driven more than the preset number of times may be classified as a route not preferred by the passenger.

Meanwhile, in step S1104, when any mode suitable for the current situation is detected according to the collected information, the route guidance device 1300 may determine whether the detected mode is different from a mode in which route guidance information is currently provided (S1106).

As a result of the determination, when the mode detected in step S1104 is the same as the mode in which the route guidance information is currently provided, the route guidance device 1300 may go back to step S1100 and provide the route guidance information according to the current mode, namely, the first mode without mode switching. The route guidance device 1300 may go back to steps S1102 and S1104 to collect information related to the mode switching condition, and detect a mode more suitable for the current situation according to the collected information.

On the other hand, as a result of the determination, when the mode detected in step S1104 is different from the mode in which the route guidance information is currently provided, the route guidance device 1300 may detect parameters for mode switching (S1108).

As one of the parameters, the route guidance device 1300 may detect a Field Of View (FOV) of the first view image according to the first mode. And the route guidance device 1300 may detect a point of attention of the FOV from the detected FOV. Here, the point of attention of the FOV may be a point corresponding to a center of a viewing angle of the first view image.

Additionally, the route guidance device 1300 may detect a vertical reference line and a horizontal reference line based on the point of attention of the FOV detected from the first view image. The route guidance device 1300 may generate a second view image according to a second mode, which has the same FOV as the first view image according to the first mode, based on the FOV, the point of attention of the FOV, the vertical reference line, and the horizontal reference line. The route guidance device 1300 may then switch the first mode into the second mode and generate the second view image from the first view image, as a view image to be displayed on the display 251 (S1110). And the route guidance device 1300 may provide route guidance information through the generated second view image (S1112).

Here, the route guidance device 1300 may provide route guidance information in various ways through the generated second view image. As an example, the route guidance device 1300 may switch the first mode in which the first view image is displayed into the second mode in which the second view image is displayed. Accordingly, the view image displayed on the display screen 1350 may be converted from the first view image to the second view image according to the mode switching.

When the mode switching is set to automatic switching, the route guidance device 1300 may automatically switch the mode. However, when the mode switching is set to manual switching, the route guidance device 1300 may provide the passenger with information regarding the more suitable mode detected in step S1104 and allow the mode to be switched according to a passenger's selection.

In this case, the passenger's input to select the mode switching may be made in various ways. For example, the mode switching may be made through a touch input or voice input applied to the display 251, or a passenger's input to a preset switch button.

Alternatively, the route guidance device 1300 may switch a mode according to a passenger's request regardless of the mode switching condition. For example, when a passenger wants route guidance information corresponding to a wider viewing angle than a viewing angle provided through an AR view image, he or she may request the route guidance device 1300 to switch to an MR view image.

In this case, the route guidance device 1300 may switch a mode in a preset order according to a swipe input applied in up and down or left and right directions of the display 251. That is, depending on the length or number of swipe inputs applied in the up and down or left and right directions, the route guidance device 1300 may switch the MR mode into the AR mode or the AR mode back into the MR mode. Alternatively, depending on the length or number of swipe inputs, the route guidance device 1300 may switch the AR mode may into a 2D map mode that provides 2D map information or switch the 2D map mode into the AR mode.

FIG. 12 illustrates an example in which the route guidance device 1300 according to an embodiment of the present disclosure generates the second view image according to parameters detected from the first view image in step S1110 of FIG. 11, where the first view image is an AR view image and the second view image is an MR view image.

Referring to FIG. 12, the route guidance device 1300 may detect an FOV of an AR view image provided as illustrated in (a) of FIG. 12.

The route guidance device 1300 may detect a point of attention 1400 of the FOV from the FOV of the AR view image provided as illustrated in (a) of FIG. 12. The route guidance device 1300 may acquire an MR view image directed to the point of attention 1400 at the current location of the vehicle on the digital-twin 3D map.

To this end, the route guidance device 1300 may detect a vertical reference line 1410 and a horizontal reference line 1420 based on the detected point of attention 1400 of the FOV. In addition, the acquired point of attention of the MR view image may be aligned (matched) with the detected vertical reference line 1410 and horizontal reference line 1420. That is, the route guidance device 1300, as illustrated in (b) of FIG. 12, may align the point of attention of the MR view image on the horizontal reference line 1420 detected from the point of attention 1400 of the AR view image. And as illustrated in (c) of FIG. 12, the point of attention of the MR view image may be aligned on the vertical reference line 1410 detected from the point of attention 1400 of the AR view image. That is, the point of attention of the MR view image may be aligned with an intersection point between the horizontal reference line 1420 and the vertical reference line 1410 of the AR view image.

The route guidance device 1300 may extract one area of the MR view image corresponding to the FOV of the AR view image. Here, the FOV is a viewing angle of the AR view image, and a size of an image displayed through the view image may be determined. That is, the route guidance device 1300 may generate an MR view image corresponding to the size of the FOV of the AR view image from the MR view image that matches the point of attention of the FOV of the AR view image.

Accordingly, a second view image that has the same FOV as the first view image and the same point of attention of the FOV may be generated. Therefore, when the conversion of a view image displayed on the display 251 is performed, the route guidance device 1300 according to an embodiment of the present disclosure may perform mode switching through a view image having the same FOV and the same position of the point of attention. This may result in seamless conversion of the view image upon the mode switching.

Meanwhile, in FIG. 12, the example of performing seamless mode switching through the MR view image, which has the same FOV and the same point of attention of the FOV as the AR view image, under assumption that the first view image is the AR view image has been explained. However, the present disclosure may be, of course, applied even to a case where the first view image is the MR view image and the second view image is the AR view image. In this case, due to the nature of the MR view image (e.g. bird's eye view, etc.) that can display an area outside a viewing angle displayed through the AR view image, a process of displaying the MR view image according to an image for generating the AR view image may first be performed for the seamless conversion of the view image.

In this case, the route guidance device 1300 may first detect a point of attention of an FOV from the FOV of an image acquired through a camera for changing an MR view image to an AR view image. The route guidance device 1300 may acquire an image of an area directed toward the point of attention at a current location of the vehicle on a digital-twin 3D map.

The route guidance device 1300 may detect vertical and horizontal reference lines based on the point of attention of the FOV of the image acquired through the camera. In addition, an image of an area where the point of attention is aligned on the vertical and horizontal reference lines may be acquired. The route guidance device 1300 may extract one area, which has the same size as the FOV of the image acquired through the camera, from the acquired area image, and display the extracted one area as an MR view image on the display 251. That is, the route guidance device 1300 may display on the display 251 an MR view image, which has the same FOV and the same position of a point of attention of the FOV as the image acquired through the camera. At the same time, the route guidance device 1300 may generate an AR view image by adding AR objects to the image acquired through the camera.

When the AR view image is generated, the route guidance device 1300 may switch an MR mode to an AR mode. Accordingly, the display 251 may be switched from a state of displaying the MR view image to a state of displaying the AR view image. In this case, the MR view image and the AR view image are images that have the same FOV and the same position of the point of attention of the FOV, and when mode switching is made, the conversion of the view image can be seamlessly performed.

Therefore, when the route guidance device 1300 operates in an AR mode in which an AR view image 1500 is displayed as illustrated in (a) of FIG. 13, the route guidance device 1300 may generate an MR view image 1510 corresponding to the AR view image 1500, as illustrated in (b) of FIG. 13, based on whether a preset mode switching condition is satisfied. Here, the MR view image corresponding to the AR view image may be a view image which has the same position of a point of attention of FOV as the AR view image and the same size of an image area according to the FOV.

In this case, the AR view image 1500 may be a view image including an AR object 1501 corresponding to a recognized lane and an AR object 1502 indicating a direction to travel up to a destination. Additionally, the MR view image 1510 may be a view image including route information 1511 related to a travel route of the vehicle, displayed as an MR object on a digital-twin 3D map.

When the mode switching condition is satisfied, the route guidance device 1300 may switch the operation mode from the AR mode to the MR mode to convert a view image displayed on the display 251. Accordingly, the state in which the AR view image 1500 is displayed as illustrated in (a) of FIG. 13 may be switched to a state in which the MR view image 1510 is displayed as illustrated in (b) of FIG. 13.

Or, conversely, when the route guidance device 1300 operates in the MR mode in which the MR view image 1510 is displayed, the route guidance device 1300 may generate the MR view image 1510 corresponding to an actual image acquired through the camera, as illustrated in (b) of FIG. 13, based on whether a preset mode switching condition is satisfied. Here, the MR view image 1510 corresponding to the actual image may be a view image which has the same position of a point of attention of FOV as the actual image and the same size of an image area according to the FOV.

When the mode switching condition is satisfied, the route guidance device 1300 may switch the operation mode from MR mode to AR mode to switch a view image displayed on the display 251. Accordingly, the state in which the MR view image 1510 is displayed as illustrated in (b) of FIG. 13 may be switched to a state in which the AR view image 1500 is displayed as illustrated in (a) of FIG. 13.

Meanwhile, the foregoing description has been mainly given of the switching from the AR mode to the MR mode, but it may also be possible to switch to an operation mode, in which a different view image is displayed, other than the AR mode and the MR mode. For example, when an area in which the vehicle is traveling is a suburban area where accuracy of a digital-twin 3D map is low, the route guidance device 1300 may determine that a mode for displaying a 2D map is a more appropriate mode. In this case, of course, the route guidance device 1300 may provide a view image including the 2D map and may provide route guidance information through the 2D map.

Additionally, the route guidance device 1300 may determine a mode suitable for a current situation based on a combination of pieces of information related to the mode switching condition. For example, when the vehicle is traveling on a highway, the route guidance device 1300 may also provide a different view image by switching an operation mode depending on a traveling speed of the vehicle. That is, in the case where the vehicle is traveling on a highway, the route guidance device 1300 may display an MR view image (MR mode) when the traveling speed of the vehicle is a first speed or lower (low speed), display an AR view image (AR mode) when the traveling speed of the vehicle exceeds the first speed and is less than a second speed (intermediate speed), and switch the operation mode to a 2D map mode for displaying a 2D map image when the traveling speed of the vehicle exceeds the second speed (high speed).

Meanwhile, when the current operation mode is an AR operation mode that displays an AR view image, the route guidance device 1300 may perform mode switching to an MR mode based on accuracy of the AR view image. To this end, the route guidance device 1300 may calculate an error rate between the AR view image and an actual image acquired through the camera, and may switch the operation mode according to the calculated error rate.

Figure 14:
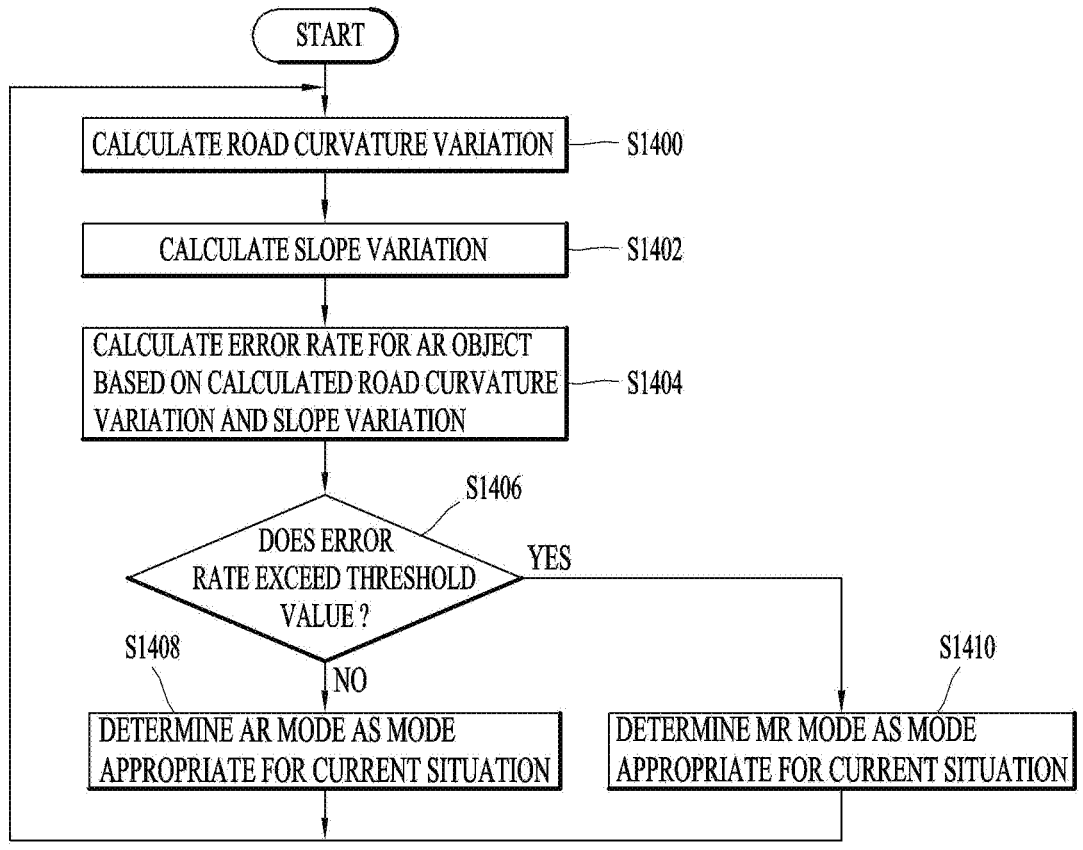
FIG. 14 is a flowchart illustrating an operation process of switching an operation mode according to an error rate of an AR view image in a route guidance device according to an embodiment of the present disclosure.

FIG. 14 is a flowchart illustrating an operation process of switching an operation mode according to an error rate of an AR view image in the route guidance device 1300 according to an embodiment of the present disclosure.

Referring to FIG. 14, the route guidance device 1300 according to an embodiment of the present disclosure may first calculate a curvature variation of a road on which the vehicle travels and a slope variation of the road (S1400, S1402).

Here, the road curvature variation may be calculated based on a detection value of a gyro sensor that is capable of detecting an inclination of the vehicle and a detection result of a lane recognition device that is capable of detecting a lane of the road on which the vehicle is traveling. That is, the curvature variation of the road may be calculated based on the inclination of the vehicle and a degree of curvature of the vehicle detected through the lane recognition device.

The slope variation of the road may be calculated according to a digital twin 3D map for the road on which the vehicle is currently traveling or a vertical profile collected through a preset server providing road information and a high-definition map (HD MAP).

Then, the route guidance device 1300 may determine an AR fitting error rate between an actual image acquired through the camera and an AR object displayed on the actual image, based on the road curvature variation and the slope variation calculated in steps S1400 and S1402 (S1404). That is, the route guidance device 1300 may calculate an error rate between an AR object generated based on the road curvature variation and the road slope variation and the actual image rendered expressed in 2D.

As an example, in order to calculate the error rate, the route guidance device 1300 may compare in units of pixels a shape of an object (e.g., lane shape) within the actual image corresponding to the AR object with a shape of the AR object corresponding to the object. As a result of the shape comparison, a rate of the number of pixels not matching an actual object with respect to the number of pixels matching the actual object or a rate of the number of pixels not matching the actual object with respect to a total number of pixels of the image may be calculated as the error rate.

The route guidance device 1300 may determine whether the error rate calculated in step S1404 exceeds a preset error rate threshold value (S1406). When the determined error rate does not exceed the error rate threshold value, the route guidance device 1300 may determine an AR mode as a mode suitable for the current situation (S1408).

In this case, when the first mode, that is, the mode that provides the current route guidance information, is the MR mode, switching to the AR mode may be performed. Additionally, a view image displayed on the display 251 may be switched from an MR view image to an AR view image. However, when the first mode is the AR mode, the route guidance device 1300 may provide route guidance information through the AR view image according to the current operation mode without mode switching.

On the other hand, as a result of the determination in step S1408, when the error rate exceeds the error rate threshold value, the route guidance device 1300 may determine the MR mode as a mode appropriate for a current situation.

In this case, when the first mode, that is, the mode that provides the current route guidance information, is the AR mode, switching to the MR mode may be performed. Additionally, a view image displayed on the display 251 may be switched from an AR view image to an MR view image. However, when the first mode is the MR mode, the route guidance device 1300 may provide route guidance information through the MR view image according to the current operation mode without mode switching.

Meanwhile, according to the foregoing description, it has been mentioned that the route guidance device 1300 according to the embodiment of the present disclosure can provide route guidance information based on the second mode through the second view image in step S1112 of FIG. 11. Hereinafter, FIGS. 15A and 15B are flowcharts illustrating an operation process of providing route information through a second view image when a view image displayed on the display 251 is switched from a first view image to the second view image through mode switching.

First, FIG. 15A is a flowchart illustrating an operation process of providing route guidance information through an AR view image according to an AR mode when a mode is switched from an MR mode to the AR mode, namely, when a first mode is the MR mode and a second mode is the AR mode.

Referring to FIG. 15A, the route guidance device 1300 may first update a camera calibration for the AR mode before switching to the AR mode (S1500).

Here, camera calibration may be a process of correcting parameters for the transformation relationship between 3D spatial coordinates obtained through an image and 2D image coordinates. That is, the route guidance device 1300 may perform the AR camera calibration again in step S1500 to correct the coordinates on the 2D image corresponding to the coordinates on a 3D space of an object recognized from an actual image actually acquired through the camera.

Through the camera calibration process, the accurate coordinates of the 2D image corresponding to the object recognized from the actual image may be acquired through the camera calibration process. Additionally, the route guidance device 1300 may display an AR object based on the coordinates corrected through the camera calibration process, to more accurately match the object included in the actual image. In this way, a process of correcting coordinates on a 2D space corresponding to coordinates on a 3D space for displaying an AR object may be called AR camera calibration.

Here, the AR camera calibration process in step S1500 may include a process of detecting a point of attention of FOV from the actual image acquired through the camera, and transforming coordinates on the 3D space to coordinates on the 2D space based on Frustum that is formed based on the detected point of attention of the FOV.

Meanwhile, when the AR camera calibration process in step S1500 is completed, the route guidance device 1300 may convert the MR view image displayed on the display 251 to the AR view image having the same ratio and size through switching from the MR mode to the AR mode (S1502). In this case, the route guidance device 1300 may gradually convert the MR view image into the AR view image for seamless conversion.

Here, the AR view image having the same ratio and size may be a view image having the same FOV as the MR view image. Additionally, the AR view image and the MR view image having the same FOV may be view images having the same point of attention of FOV. To this end, before switching to the AR mode, the route guidance device 1300 may display the MR view image with the point of attention of FOV at the same position as the point of attention of FOV of the image acquired through the camera, in order to achieve more seamless conversion between view images. Accordingly, the route guidance device 1300 may change the view image displayed on the display 251 so that an MR view image for the front of the vehicle is displayed while an MR view image such as a bird's-eye view or a side view is displayed.

In step S1502, when the view image is converted into the AR view image having the same ratio and size as the MR view image displayed on the display 251, the route guidance device 1300 may provide route guidance information based on the AR mode (S1504). That is, the route guidance device 1300 may recognize an object (e.g., lane, building, etc.) included in the actually acquired image, and display a graphic object (AR object) corresponding to the recognized object in at least a portion of a coordinates area where the recognized object is displayed. In other words, route guidance information may be provided through the AR view image provided through the AR mode.

Meanwhile, FIG. 15B is a flowchart illustrating an operation process of providing route guidance information through an MR view image according to an MR mode when a mode is switched from an AR mode to the MR mode, namely, when the first mode is the AR mode and the second mode is the MR mode.

Referring to FIG. 15B, when switching from the AR mode to the MR mode begins, the route guidance device 1300 may change MR camera calibration according to a result of the last-performed AR camera calibration (S1550). In other words, the coordinates transformation process, which is the same as the coordinates transformation process on the 2D image corresponding to the coordinates on the 3D space of the object recognized from the actual image according to the result of the AR camera calibration in the AR mode, may be applied to the MR camera calibration.

Here, MR camera calibration may be a process of displaying an MR view image according to a point of attention of the camera on the display based on the frustum-shaped visual field formed according to the point of attention of the camera when the camera of the vehicle faces the front of the vehicle on a digital-twin 3D map. In other words, it may be a process of transforming the coordinates on the 3D space captured through the camera of the vehicle on the digital-twin 3D map into the coordinates on the 2D space, namely, the coordinates on the MR view image. That is, when changing the MR camera calibration according to the result of the last AR camera calibration performed in step S1550, an image of a digital-twin 3D map facing the same point of attention of FOV as the point of attention of FOV of the AR view image provided in the AR mode may be generated.

Then, the route guidance device 1300 may switch to an MR view image with the same ratio as the AR view image (S1552).

As an example, the route guidance device 1300 may extract an area on the MR view image corresponding to the same size as the FOV of the AR view image 1500. In this case, the route guidance device 1300 may extract an image area having a point of attention of FOV at the same position as the point of attention of FOV of the AR view image. Therefore, an MR view image that has the same size and ratio as the AR view image and the same point of attention of FOV may be extracted. That is, the MR view image 1510 corresponding to the AR view image 1500 may be generated.

In this case, the AR view image and the MR view image have the same FOV, so they may be different types of view images corresponding to the same viewing distance. That is, when the viewing distance displayed through the AR view image is 50 m, an MR view image with the same viewing distance of 50 m may be generated.

Additionally, the route guidance device 1300 may convert the AR view image displayed on the display 251 to the generated MR view image through switching from the AR mode to the MR mode.

Meanwhile, the MR view image is a view image for the digital-twin 3D map, and may have a longer viewing distance than the AR view image. Therefore, the MR view image may be a view image corresponding to a longer viewing distance than a default MR view image. Therefore, the route guidance device 1300 may convert an MR view image with the same short viewing distance as the AR mode into an MR view image with a default viewing distance according to the MR mode (S1554). In this case, the route guidance device 1300 may gradually convert the MR view image for seamless conversion.

The route guidance device 1300 may then provide route guidance information based on the MR mode (S1556). In this case, the route guidance device 1300 may provide various route guidance information through virtual objects (MR objects) displayed on the digital-twin 3D map. As an example, the route guidance device 1300 may provide, as route guidance information, a virtual image looking at the vehicle in a bird's-eye view or side view, or provide, as route guidance information, POIs for a route through which the vehicle has already passed or information on a route on which the vehicle is to travel.

Meanwhile, the foregoing description has been given of the case where the route guidance device 1300 according to the embodiment of the present disclosure controls the display 251 to display one type of AR view image or MR view image.

However, of course, the route guidance device 1300 may control the display 251 to display both the AR view image and the MR view image on one display screen.

In this case, the route guidance device 1300 may split the display screen, that is, a main screen area, and display the AR view image and the MR view image in each split area. Alternatively, the route guidance device 1300 may display both the AR view image and the MR view image on one display screen by overlapping an area where one view image is displayed with a partial area of the main screen area where another view image is displayed.

The route guidance device 1300 may determine whether to display both the AR view image and the MR view image or to display a mixed view image of the AR view image and the MR view image by splitting the display screen based on information collected in relation to the mode switching condition. Alternatively, the route guidance device 1300 may determine whether to output a view image that the MR view image is overlaid on a portion of the AR view image or the AR view image is overlaid on a portion of the MR view image.

In this case, a condition in which both the AR view image and the MR view image are displayed together through splitting of the display area (view image split display), a condition in which a mixed view image of the AR view image and the MR view image is displayed (view image mixed display), and a condition in which one type of view image is displayed to overlap a portion of another type of view image (view image overlap display) may be different.

Figure 16:
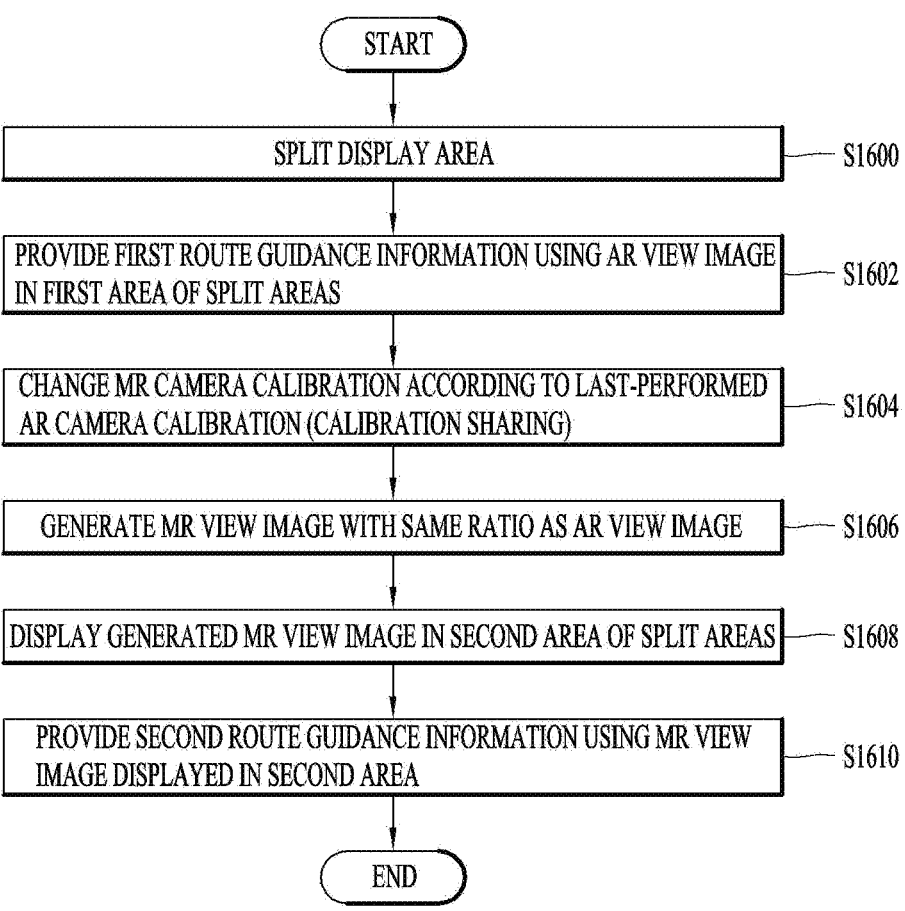
FIG. 16 is a flowchart illustrating an operation process in which the route guidance device according to an embodiment of the present disclosure splits a display area to simultaneously display an AR view image and an MR view image.
Figure 17:
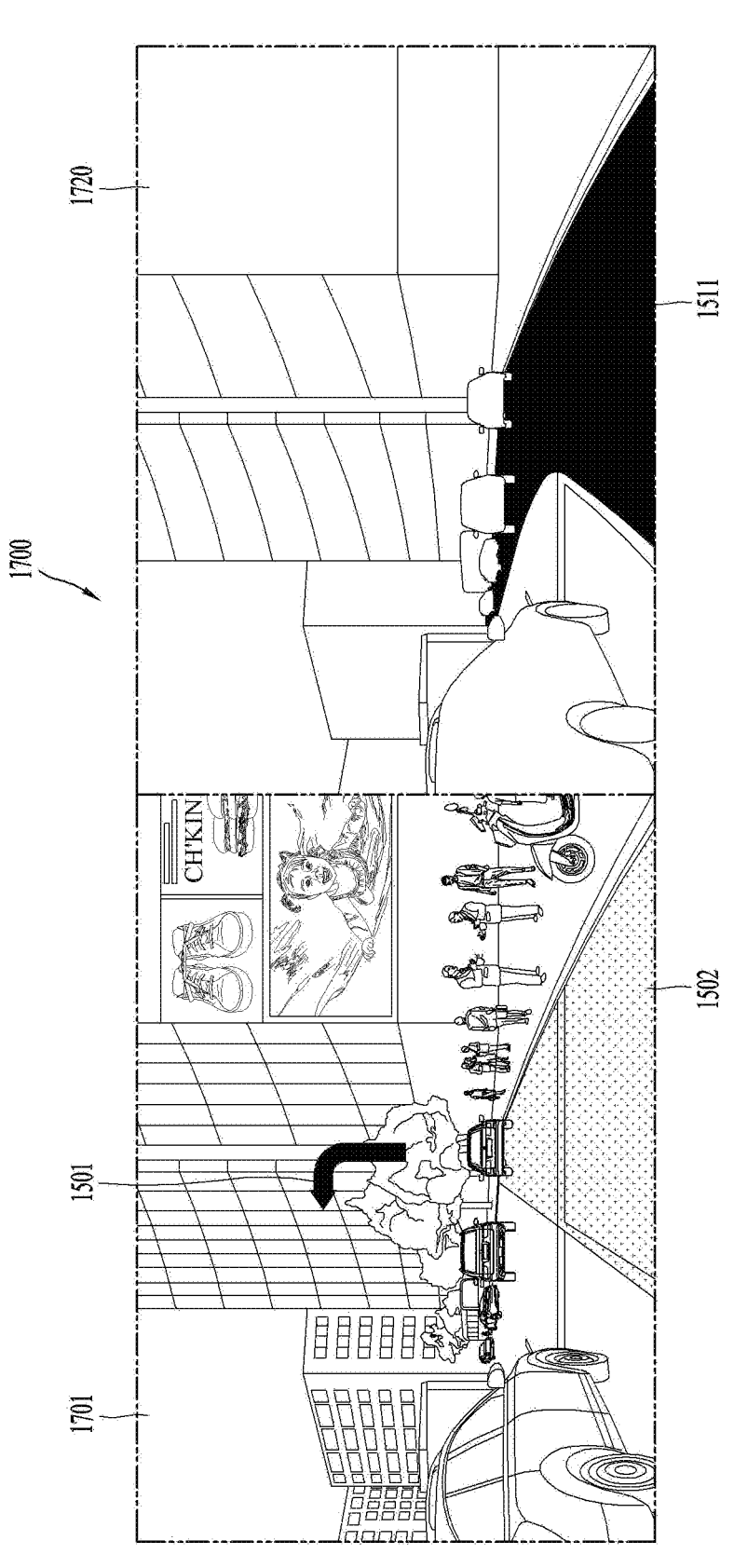
FIG. 17 illustrates an example of a display screen on which the AR view image and the MR view image are respectively displayed through the operation process of FIG. 16.

First, FIG. 16 is a flowchart illustrating an operation process in which the route guidance device 1300 according to an embodiment of the present disclosure splits the display area to simultaneously display an AR view image and an MR view image. FIG. 17 illustrates an example of a display screen on which the AR view image and the MR view image are respectively displayed through the operation process of FIG. 16.

The route guidance device 1300 may detect whether the view image split display condition in which the AR view image and the MR view image are displayed together through the split display areas is met while the vehicle is traveling. In this case, the view image split display condition may be a case where the vehicle departs from a preset route.

When the view image split display condition is met, the route guidance device 1300 may first split the display area to display the view images (S1600). Here, the route guidance device 1300 may split the display area into a first area 1710 and a second area 1720. In this case, the first area 1710 and the second area 1720 may be assigned to the AR view image and the MR view image, respectively.

When the display area is split in step S1600, the route guidance device 1300 may first display the AR view image in the first area 1710. The route guidance device 1300 may then provide route guidance information according to the AR mode (S1602). In this case, as the vehicle departs from a preset route, the route guidance device 1300 may control the display 251 to display, in the first area 1710, the AR view image including an AR object 1501 indicating a direction to switch to a changed route, which is set from the current position of the vehicle to a destination, and an AR object 1502 indicating a recognized lane.

Meanwhile, the route guidance device 1300 may change the MR camera calibration according to the last-performed AR camera calibration (S1604). In this case, an image of a digital-twin 3D map facing the same point of attention of FOV as a point of attention of FOV of the AR view image provided in the AR mode may be generated by sharing the camera calibration result.

Additionally, the route guidance device 1300 may extract an image having the same FOV as the FOV of the AR view image from the image of the digital-twin 3D map generated through the calibration sharing. Accordingly, an MR view image, which has the same size and ratio as the AR view image and has the same point of attention as that of the AR view image, may be generated to correspond to the AR view image (S1606).

Then, the route guidance device 1300 may display the generated MR view image in the second area of the split display areas (S1608). The route guidance device 1300 may then provide route guidance information according to the MR mode (S1610). In this case, as the vehicle departs from a preset route, the route guidance device 1300 may control the display 251 to display, in the second area 1730, an MR view image including an MR object 1511 indicating a proceeding direction of a changed route, which is set from the current position of the vehicle to a destination, on the changed route.

Meanwhile, in FIG. 17, the example of splitting the display area into two identical areas and displaying view images providing different route guidance information in each split area has been described. However, the route guidance device 1300 may, of course, split the display area based on a specific condition and provide different types of view images to the respective split areas.

For example, an image acquired from the vehicle may be clearer when a distance from the vehicle is shorter. Additionally, the size of an object displayed on the image may be relatively large. Therefore, the object included in the image can be recognized more easily, and thus more accurate object recognition can be achieved. That is, when a distance from the vehicle is shorter, an AR view image including an AR object that accurately matches an actual object may be displayed. On the other hand, when the distance from the vehicle increases, the size of the object decreases due to the distance and the number of objects displayed increases, making accurate recognition of the objects difficult. Therefore, the accuracy of the AR object displayed on the AR view image may be deteriorated.

Meanwhile, the MR view image is a virtual screen displayed using a digital-twin 3D map, and may display accurate MR objects regardless of a viewing distance from the vehicle. However, the MR view image displays route guidance information through a virtual screen, and thus is different from the real world, which causes a passenger to feel a sense of disconnection.

Therefore, the route guidance device 1300 according to an embodiment of the present disclosure may switch a display screen to display both the AR view image and the MR view image when it is necessary to secure a clear view in a long viewing distance range and also a view at a short distance. For example, when a preset number or more of objects are located adjacent to the vehicle and it is difficult to clearly display an AR object for route information due to traffic congestion and situations around the vehicle, the route guidance device 1300 may determine that it is necessary to secure a clear view at a short distance through the AR view image for displaying the objects adjacent to the vehicle and a clear view at a remote distance through the MR view image for displaying accurate route information.

In this case, the route guidance device 1300 may exclusively separate a display area where a first view image is displayed and an area where a second view image of a different type from the first view image is displayed, and control the display 251 to output a display screen, on which the AR view image and the MR view image are mixed on the areas separate from each other.

FIG. 18 is a flowchart illustrating an operation process of providing route guidance information through a display screen on which a first view image and a second view image are mixed. And, FIG. 19 is a view illustrating an example of a display screen on which an AR view image and an MR view image are displayed in areas separate from each other, through the operation process of FIG. 18.

Meanwhile, a condition for splitting (separating) a display area may be set in various ways. As an example, the route guidance device 1300 may split the display screen into a first area and a second area based on a distance from the vehicle. In this case, one area of the display screen corresponding to an area (near-distance area) within a predetermined distance (e.g., 50 m) from the vehicle may be classified as a first area, and an area of the display screen corresponding to an area (far-distance area) exceeding the predetermined distance from the vehicle may be classified as a second area.

For convenience of explanation, it will be explained below on the assumption that the route guidance device 1300 splits the display area into a first area and a second area based on a distance from the vehicle. However, it goes without saying that the present disclosure is not limited to this, and accordingly, the route guidance device 1300 may split the display area into the first area and the second area based on other conditions other than the distance.

Referring to FIG. 18, the route guidance device 1300 may first detect an area, which is apart from the vehicle by a preset distance or less, from an image displayed through the display screen (S1800). In this case, the route guidance device 1300 may detect one area on the display screen corresponding to the area where the distance from the vehicle is within the preset distance based on a pixel depth value of an image obtained through the camera.

Then, the route guidance device 1300 may classify the one area detected in step S1800 as a first area where an AR view image is to be displayed (S1802). The route guidance device 1300 may classify one area on the display screen corresponding to an area in which a distance from the vehicle exceeds the preset distance as a second area where an MR view image is to be displayed (S1804).

The route guidance device 1300 may change the MR camera calibration according to the AR camera calibration (S1806). In this case, an image of a digital-twin 3D map facing the same point of attention of FOV as a point of attention of FOV of the AR view image provided in the AR mode may be generated by sharing the camera calibration result.

Additionally, the route guidance device 1300 may extract an image having the same FOV as the FOV of the AR view image from the image of the digital-twin 3D map generated through the calibration sharing. Accordingly, an MR view image, which has the same size and ratio as the AR view image and has the same point of attention as that of the AR view image, may be generated to correspond to the AR view image (S1808).

Then, the route guidance device 1300 may display a portion of the AR view image, which corresponds to the first area, on the display screen, and display a portion of the MR view image, which corresponds to the second area, on the display screen (S1810). Accordingly, an AR view image including an AR object may be displayed in the first area, and an MR view image including an MR object may be displayed in the second area. Additionally, the route guidance device 1300 may provide route guidance information according to modes corresponding to the respect areas (S1812). That is, the route guidance device 1300 may provide different types of route guidance information according to different operation modes for each of the first and second areas that are exclusively separated from each other.

Referring to (a) of FIG. 19, an example in which an AR view image is displayed on the display screen is illustrated. In this case, the displayed view image may be a view image including an AR object 1501 corresponding to a recognized lane and an AR object 1502 corresponding to a direction to switch to a route on which the vehicle is to travel.

Meanwhile, in the situation as illustrated in (a) of FIG. 19, many people and other objects located around the vehicle are detected. Accordingly, the route guidance device 1300 may determine that it is necessary to provide an AR view image for more accurately providing information related to such objects located around the vehicle. On the other hand, since a distance at which a lane is recognized is very short due to a vehicle traveling ahead, the route guidance device 1300 may determine that it is necessary to provide an MR view image for providing route information corresponding to a longer viewing distance.

In this case, the route guidance device 1300 according to an embodiment of the present disclosure may detect an area where a distance from the vehicle is within a preset distance from an image obtained through the camera. In this case, when the preset distance is set to 50 m, the route guidance device 1300 may split the image acquired through the camera into an area (first area) 1950 where the distance from the vehicle is less than 50 m, and an area (second area) 1900 where the distance from the vehicle exceeds 50 m.

The route guidance device 1300 may generate an MR view image corresponding to the AR view image according to the process described in FIG. 18. The route guidance device 1300 may display on the display screen the AR view image including an AR object in the first area, in which the distance from the vehicle is within 50 m, and the MR view image including an MR object in the second area, in which the distance from the vehicle exceeds 50 m. Therefore, as illustrated in FIG. 19, an image actually acquired through the camera and an AR object 1951 corresponding to a front lane around the vehicle, which is recognized from the image, may be displayed in the first area 1950. On the other hand, an image on a digital-twin 3D map and an MR object 1901 indicating a route for a vehicle to travel on the digital-twin 3D map may be displayed in the second area 1900.

That is, the display area may be exclusively split into areas for providing route guidance information in different ways, and a different type of route guidance information may be provided according to an operation mode corresponding to each split area.

Meanwhile, when the display area is split to display view images provided in different operation modes, the view images may be view images sharing camera calibration, as described above. Additionally, the view images may have the same point of attention of the FOV. Therefore, coordinates on a 3D space may be transformed into a 2D image according to a visual field formed based on the same point of attention of FOV. This may result in seamlessly moving objects displayed in the respective view images into the areas where the different view images are displayed, respectively.

In other words, when an object displayed in an area where route guidance information is provided according to an AR mode moves to an area where route guidance information is provided according to an MR mode, an object displayed in the form of a real image may be displayed in the form of a virtual object rendered according to modeling. On the other hand, when the object displayed in the area where the route guidance information is provided according to the MR mode moves to the area where the route guidance information is provided according to the AR mode, the virtual object rendered according to modeling may be displayed in the form of the real image.

Meanwhile, when route information is displayed using an MR object in such a mixed screen, the route guidance device 1300 may display the route information using an MR object having a shape which is bent from the ground surface toward the sky.

The route guidance device 1300 according to an embodiment of the present disclosure may overlay, of course, a second view image on at least a portion of an area where a first view image is displayed. For example, when it is necessary to increase visibility of POI information, the route guidance device 1300 may overlay the second view image on the at least portion of the area where the first view image is displayed depending on a condition of a road on which the vehicle is traveling.

In this case, the route guidance device may determine whether there is a need to improve the visibility of the displayed POI information based on importance of the POI information, which is predetermined according to the user's preference, etc. In addition, when the visibility of the POI information needs to be improved, the visibility of the POI information may be improved by overlapping the MR view image on the at least portion of the AR view image.

Alternatively, when a junction of the route on which the vehicle travels is adjacent, the route guidance device 1300 may overlay the MR view image on at least a portion of the AR view image to display the junction more clearly, so that the driver can more accurately recognize the junction. Alternatively, the route guidance device 1300 may display a display screen in which the AR view image overlaps a portion of the MR view image, in order to provide the passenger with a situation of a blind spot which is beyond a viewing angle obtained through the camera of the vehicle.

Figure 20:
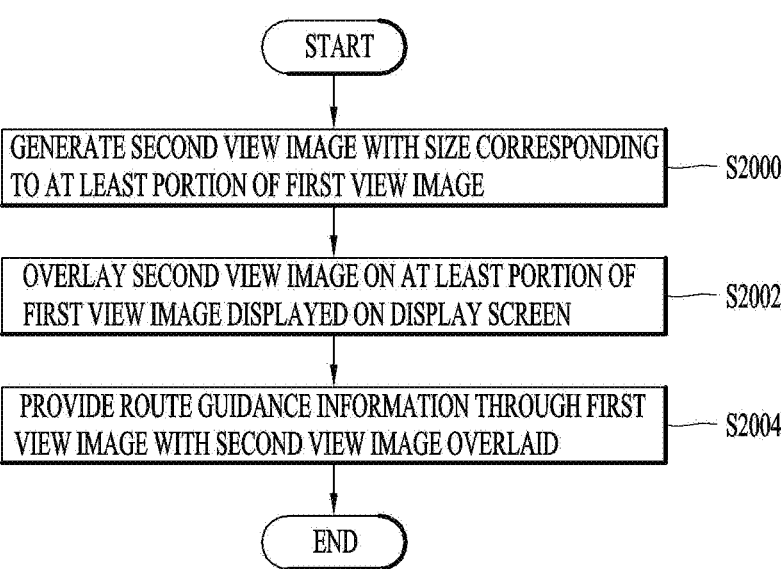
FIG. 20 is a flowchart illustrating an operation process of overlaying a second view image on at least a portion of an area where a first view image is displayed in a route guidance device according to an embodiment of the present disclosure.
Figure 21:
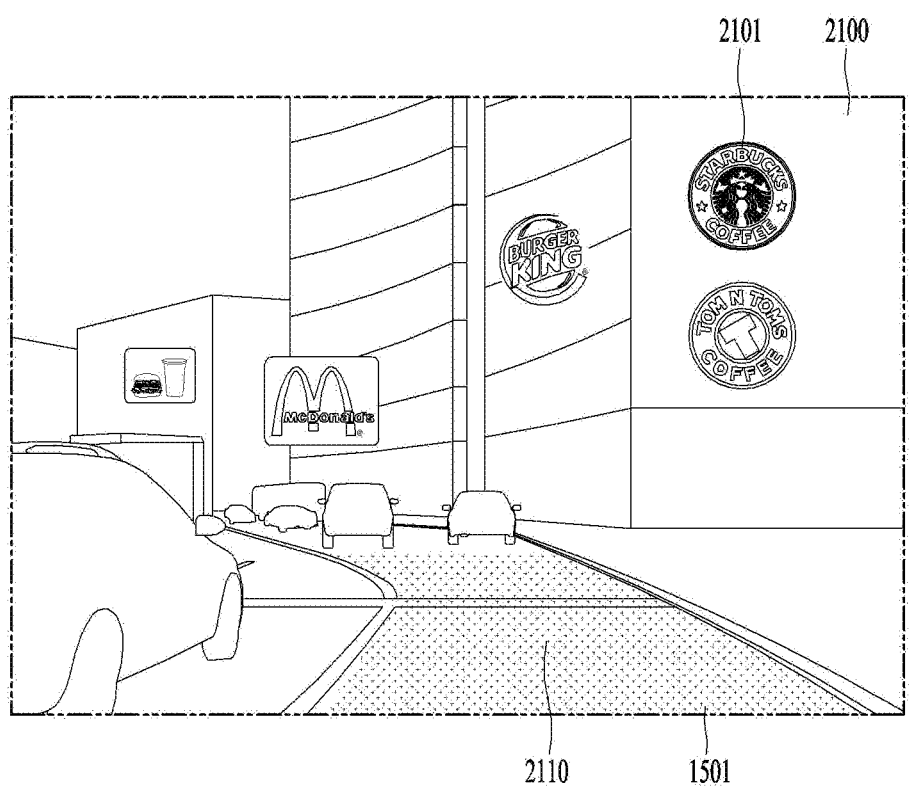
FIGS. 21 and 22 are exemplary views illustrating that the second view image is overlaid on at least a portion of a display area, in which the first view image is displayed, according to the operation process of FIG. 20.
Figure 22:
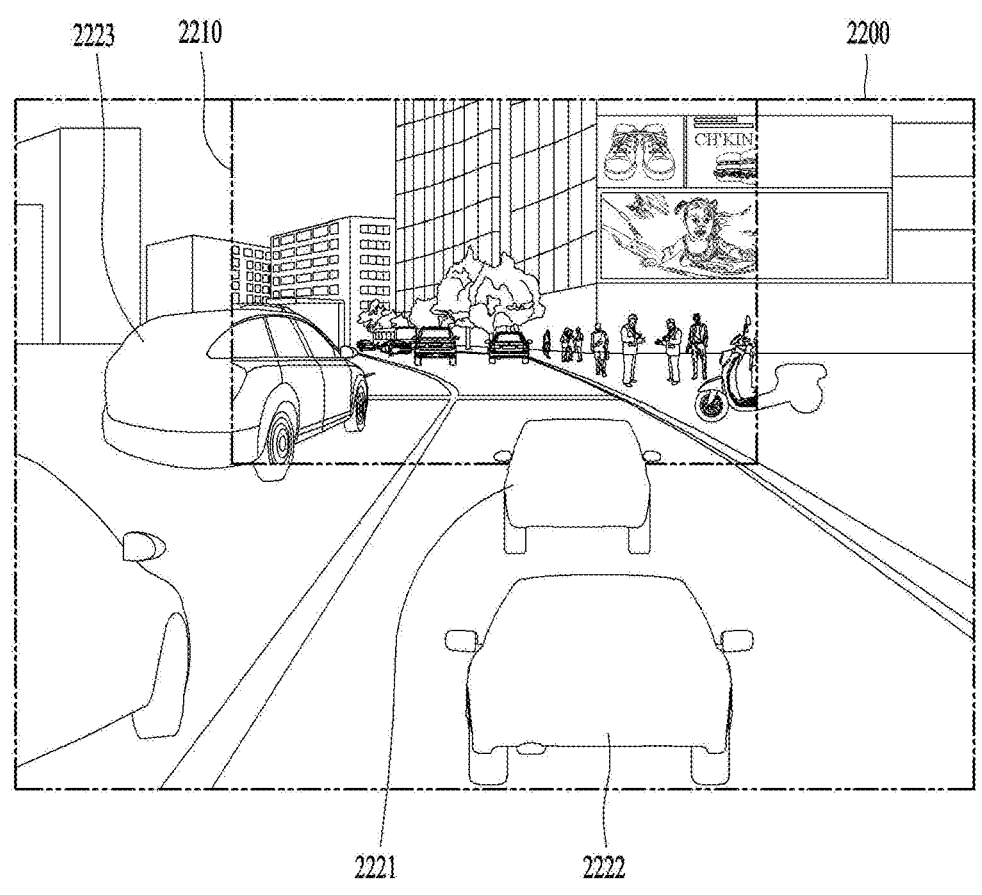

FIG. 20 is a flowchart illustrating an operation process of overlaying a second view image on at least a portion of an area where a first view image is displayed in a route guidance device 1300 according to an embodiment of the present disclosure. And, FIGS. 21 and 22 are exemplary views illustrating that an AR view image is overlaid on at least a portion of a display area, in which an MR view image is displayed, according to the operation process of FIG. 20.

Referring to FIG. 20, the route guidance device 1300 may generate a second view image corresponding to at least a portion of a first view image (S2000). In this case, the route guidance device 1300 may generate view images with the same point of attention of FOV through sharing of the camera calibration. For example, the route guidance device 1300 may generate an MR view image having the same point of attention of FOV as an AR view image. Alternatively, the route guidance device 1300 may generate an AR view image having the same point of attention of FOV as an MR view image.

The route guidance device 1300 may overlay the second view image on at least a portion of the first view image displayed on the display screen (S2002). In addition, the route guidance device 1300 may provide route guidance information based on objects in the first view image and objects in the second view image displayed through the first view image on which the second view image is overlaid (S2004).

As an example, the route guidance device 1300 may generate an MR view image corresponding to a remaining area excluding a road on which the vehicle travels, while an AR view image according to an AR mode is displayed. In this case, the generated MR view image may be a view image with the same point of attention of FOV and the same FOV as the AR view image.

Additionally, the route guidance device 1300 may overlay the MR view image on the remaining area excluding the area of the AR view image where the traveling road is displayed. Therefore, as illustrated in FIG. 21, the display screen may be displayed such that a road area 2110 is displayed in the form of the AR view image, and a remaining area 2100 excluding the road area is displayed in the form of the MR view image. Accordingly, the road area 2110 may be displayed in the form of an actual road image captured by the camera, and the AR object 1501 indicating a lane recognized in the road image may be displayed in the road area 2110. Additionally, the remaining area 2100 excluding the road area may be displayed in the form of a building model image on a digital-twin 3D map due to the overlaid MR view image.

Meanwhile, when the route guidance device 1300 operates in the AR mode, the route guidance device 1300 may display, as AR objects, POI information regarding objects recognized from the actual image captured by the camera. Accordingly, the route guidance device 1300 may detect the POI information according to the objects recognized in the actual image and display the AR objects corresponding to the POI information on the display screen where the MR view image is overlaid. Therefore, as illustrated in FIG. 21, AR objects 2101 corresponding to detected POI information may be displayed on a building model image on a digital-twin 3D map.

In this case, the building model on the digital-twin 3D map may have a shape which is not complex compared to the image of the actual building. Therefore, as illustrated in FIG. 21, since the AR objects 2101 are displayed on a background with lower complexity, the visibility of the AR objects 2101 can be greatly improved. In other words, the visibility of the exposed POI information can be improved.

Meanwhile, according to the description, the display screen as illustrated in FIG. 21 on which the MR view image is overlaid on the AR view image has been described, but conversely, an AR view image corresponding to at least a portion of the display screen may be overlaid, of course, on an MR view image displayed on the display 251. In this case, a portion of the AR view image corresponding to a road on which the vehicle travels may be overlaid on the MR view image.

In this case, the route guidance device 1300 may display AR objects corresponding to POI information regarding objects recognized in an actually captured image to be overlaid on an MR view image displayed on the display 251 at positions on the MR view image corresponding to the recognized objects, thereby displaying the display screen as illustrated in FIG. 21.

Meanwhile, while the display 251 displays an MR view image, the route guidance device 1300 may also display a display screen in which an AR view image is overlaid on one area corresponding to a field of view of the camera.

For example, the route guidance device 1300, as illustrated in FIG. 22, may display an MR view image 2200 corresponding to a surrounding area including the vehicle, on which the route guidance device 1300 is mounted. In this case, since an image on a digital-twin 3D map is displayed, an image of a model corresponding to a vehicle or building, rather than an actual image, may be displayed on the display 251.

In this state, the route guidance device 1300 may generate an AR view image 2210 according to an image acquired through the camera. In this case, the AR view image is limited to a viewing angle range that can be acquired through the camera, that is, FOV, and therefore may be an image corresponding to one area of an MR view image with a wider FOV. Here, the AR view image 2210 and the MR view image 2200 may be images with the same position of a point of attention of FOV.

Then, the route guidance device 1300 may overlay the AR view image 2210 on the MR view image 2200 based on the point of attention of the FOV. Therefore, as illustrated in FIG. 22, route guidance information may be provided in the form of the AR view image 2210 in the range in which the passenger can visually identify, namely, in the area within the viewing angle of the camera. Therefore, the route guidance information based on an actual image can be displayed.

On the other hand, route guidance information may be provided in the form of the MR view image 2200 in the range in which the passenger does not visually identify, namely, in a rear area of the vehicle 2221 on which the route guidance device 1300 is mounted, and a blind spot area corresponding to another vehicle 2222 approaching from the rear of the vehicle 2221 and both side directions outside the viewing angle range. Therefore, route information can be displayed in the form of an image of a digital-twin 3D map and a virtual object.

Meanwhile, in the case of FIG. 22, as described above, the AR view image 2210 may be configured such that coordinates on a 3D space are transformed into coordinates of a 2D image according to a visual field formed based on the same point of attention of FOV through sharing of camera calibration. In this case, the AR view image 2210 may be an area corresponding to a near limit of a frustum-shaped visual field formed according to the same point of attention of FOV, and the MR view image 2200 may be an area corresponding to a far limit of the frustum-shaped visual field.

In this case, objects adjacent to the AR view image 2210 may be objects whose distance from the point of attention of FOV is the same as that of the AR view image 2210. Accordingly, the AR view image 2210 and the MR view image 2200 may be view images connected to each other through a boundary surface of a view image (e.g., a boundary surface of the AR view image 2210). Therefore, the object displayed on the AR view image 2210 moves seamlessly to the area where the MR view image 2200 is displayed through the boundary surface of the view image, or the object displayed on the MR view image 2200 may move to the area where the AR view image 2210 is displayed. In this case, such object may be displayed as a virtual object or an object on a real image depending on whether it is outside the FOV of the camera.

Therefore, in the case of the vehicle object 2223 shown in FIG. 22, a partial area included within the FOV of the camera may be displayed in the form of a real image, and the remaining area outside the FOV of the camera may be displayed in the form of a virtual object. In this case, when the vehicle object 2223 is fully included in the FOV of the camera as the speed of the vehicle corresponding to the vehicle object 2223 increases, the entire vehicle object 2223 may be displayed in the form of a real image. However, when the entire vehicle object 2223 deviates out of the FOV of the camera as the speed of the vehicle corresponding to the vehicle object 2223 becomes lower, the entire vehicle object 2223 may be displayed in the form of a virtual object.

The foregoing description has been given of the examples of changing the state of displaying the AR view image (AR mode) into the state of displaying the MR view image (MR mode) or the MR mode into the AR mode. The foregoing description has also been given in detail of the examples of splitting the display screen to display the AR view image and the MR view image separately or displaying a display screen in which the AR view image and the MR view image are mixedly displayed, and the examples of overlaying the MR view image or the AR view image on at least a portion of the display screen where the AR view image or the MR view image is displayed.

In this way, the route guidance device 1300 according to an embodiment of the present disclosure may display different view images, which are displayed in different operation modes, on one screen. Additionally, the route guidance device 1300 may configure a display area including a plurality of AR view images and a plurality of MR view images in a similar manner.

Figure 23:
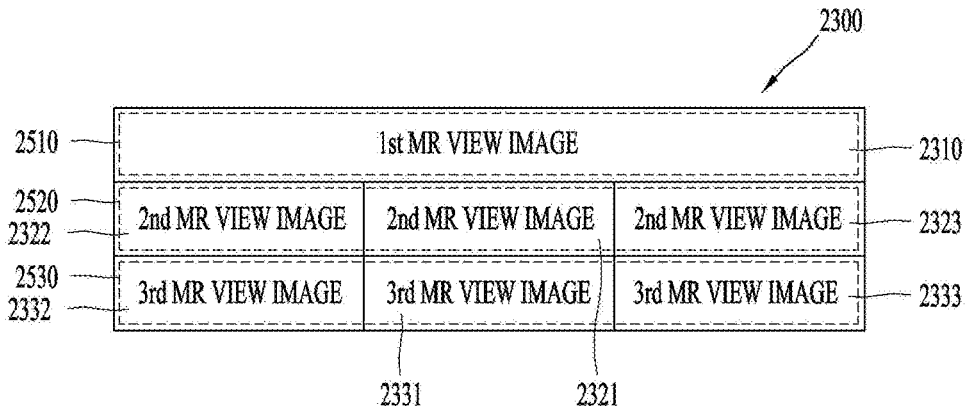
FIG. 23 is an exemplary view illustrating an example in which a route guidance device according to an embodiment of the present disclosure constitutes a display screen including a plurality of AR view images and a plurality of MR view images.

FIG. 23 is an exemplary view illustrating an example in which a route guidance device 1300 according to an embodiment of the present disclosure constitutes a display area 2300 including a plurality of AR view images and a plurality of MR view images.

In this case, the route guidance device 1300 may implement one display screen that includes route guidance information (first view image) 2510 related to a road on which the vehicle is to travel, namely, a predicted travel route, route guidance information (second view image) 2520 related to a travel route on which the vehicle is currently traveling, and route guidance information (third view image) 2530 related to a travel route on which the vehicle has already traveled.

In this case, since the first view image 2510 is a route that the vehicle has not yet travel, the AR view image may not be displayed. Accordingly, the route guidance device 1300 may display information related to a predicted travel route, on which the vehicle is to travel according to a method of displaying an MR view image, such as a drone view or a bird's-eye view (first MR view image 2310).

On the other hand, a travel route on which the vehicle is currently traveling may be displayed according to the AR view image and the MR view image. The route guidance device 1300 may display an AR view image (second AR view image) 2321 corresponding to a front traveling image of the vehicle, which is currently traveling, in a portion of the second view image area 2520, and display at least one MR view image (second MR view image) 2322, 2323 for the travel route, on which the vehicle is currently traveling, in a remaining area except for the second view image area 2520.

Here, the second MR view images 2322 and 2323 and the second AR view image 2321 may be images that share camera calibration. Therefore, they may be images in which coordinates on a 3D space are transformed into coordinates of a 2D image according to a visual field formed based on the same point of attention of FOV.

As an example, the second MR view images 2322 and 2323 may be displayed on the left and right of the second AR view image 2321. And the second MR view images 2322 and 2323 may be MR view images including the AR view image and objects to be moved in real time. In this case, the second MR view images 2322 and 2323 may be MR view images on which objects currently located in blind spots on both left and right sides of the vehicle are displayed.

Meanwhile, the third view image area 2530 may be an area where route guidance information related to the travel route on which the vehicle has already traveled is displayed. In this case, the route guidance device 1300 may display an AR view image (third AR view image) 2331 including past movement paths and objects according to the route taken by the vehicle in a portion of the third view image area 2530, and display at least one MR view image (third MR view image) 2332, 2333 associated with the past movement paths and objects according to the route taken by the vehicle in a remaining area of the third view image area 2530.

Likewise, the third MR view images 2332 and 2333 and the third AR view image 2331 may be images that share camera calibration. Therefore, they may be images in which coordinates on a 3D space are transformed into coordinates of a 2D image according to a visual field formed based on the same point of attention of FOV.

As an example, the third MR view images 2332 and 2333 may be displayed on the left and right of the third AR view image 2331. In this case, the third MR view images 2332 and 2333 may be MR view images on which objects currently located in blind spots on both left and right sides of the vehicle are displayed.

Meanwhile, the objects displayed within the second view image area 2520 may be displayed in the form of the AR view image or the MR view image according to the movement of the corresponding objects. Likewise, the objects displayed within the third view image area 2530 may be displayed in the form of the AR view image or the MR view image according to the movement of the corresponding objects.

However, since the traveling of the vehicle in each of the second view image area 2520, the third view image area 2530, and the first view image area 2510 is made at different time, the movement of objects does not occur, of course, among the first view image area 2510 to the first view image area 2510. Accordingly, an object displayed in the second view image area 2520 cannot move to the third view image area 2530 or, conversely, an object displayed in the third view image area 2530 cannot move to the second view image area 2520.

Meanwhile, FIG. 24 is an exemplary view illustrating displaying of a combined screen of an AR view image and an MR view image through a route guidance device 1300 according to an embodiment of the present disclosure.

As an example, when the traveling state of the vehicle is a preset state, the route guidance device 1300, as illustrated in (a) of FIG. 24, may provide route information related to a route on which the vehicle is to travel by using an MR object. In this case, the route guidance device 1300 may display an object (hereinafter, referred to as a vehicle object) 2411 corresponding to the vehicle, on which the route guidance device 1300 is mounted, on a digital-twin 3D map. The route guidance device 1300 may additionally display a sub virtual object 2412 corresponding to the vehicle object, which moves along a route for the vehicle to travel.

In the route guidance device 1300, the sub virtual object 2412 may be an object similar to the vehicle and may be displayed translucently. Therefore, the sub virtual object 2412 can be distinguished from the vehicle object 2411 depending on whether it is displayed translucently. The sub virtual object 2412 may be named 'ghost car' based on the fact that it is a virtual object displayed translucently.

The route guidance device 1300 may allow the ghost car object 2412 to travel in advance on a route, on which the vehicle is to travel, from the position of the vehicle object 2411. Additionally, an MR view image such as a bird's-eye view may be further displayed along the route on which the ghost car object moves. In this way, the route guidance device 1300 may provide in advance route information related to the route, on which the vehicle is to travel, using the MR view image, and a function of providing the route information on the route on which the vehicle is to travel is referred to as 'preview.'

When the preview is provided in this way, as illustrated in (a) of FIG. 24, a first MR view image 2410 in which the vehicle object corresponding to the vehicle is currently displayed, and a second MR view image 2420 displaying route information related to the route, on which the vehicle is traveling along the movement route of the ghost car object, may be displayed in different areas of the display screen.

The route guidance device 1300 may also display an AR view image using an actual image obtained from the camera of the vehicle, instead of the first MR view image 2410. In this case, as illustrated in (b) of FIG. 24, an AR view image 2450 displaying a front image of the vehicle, which is currently traveling, may be displayed in a first area of the display area, and an MR view image 2451 displaying the vehicle object corresponding to the vehicle may be displayed in a second area. In this case, the MR view image 2451 may be an MR view image (first MR view image) corresponding to the current location of the vehicle or an MR view image (second MR view image-preview) that displays a travel route up to a destination in advance.

Meanwhile, the route guidance device 1300 may, of course, display not only the MR view image but also an image 2461 in a 2D map mode that displays 2D map information corresponding to the current location of the vehicle. In this case, as illustrated in (c) of FIG. 24, an AR view image 2460 or an MR view image may be displayed in one area on the display 251, and the 2D map image 2461 including the current location of the vehicle may be displayed in another area.

Figure 25:
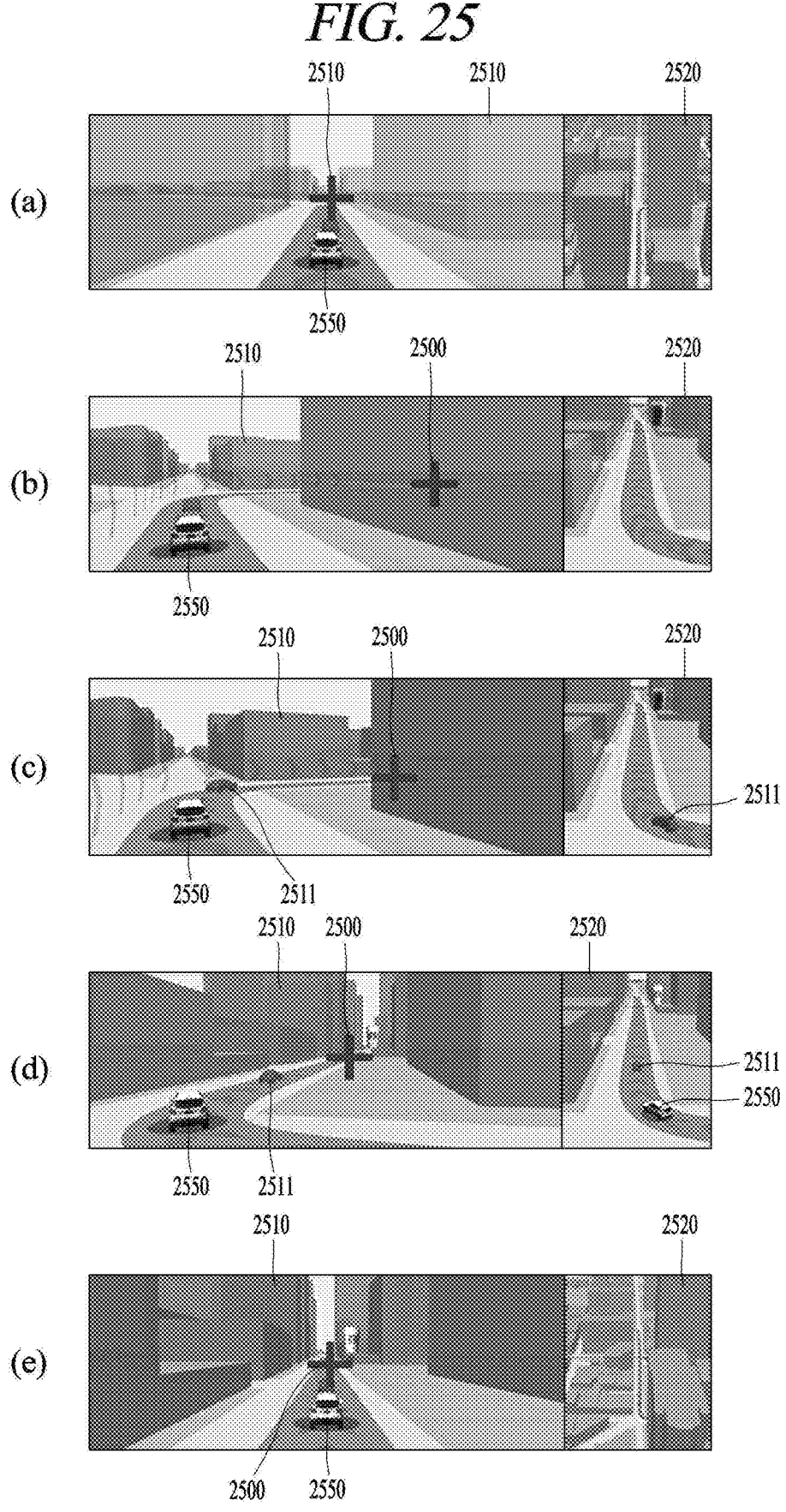
FIG. 25 is an exemplary view illustrating an example of providing a preview image of a route, along which a vehicle is to travel, as route guidance information provided through MR in a route guidance device according to an embodiment of the present disclosure.

FIG. 25 is an exemplary view illustrating an example of providing a preview image of a route, along which a vehicle is to travel, as route guidance information provided through MR in a route guidance device according to an embodiment of the present disclosure.

For example, when the vehicle is adjacent to a point at which a traveling direction is to change, that is, a turn point, the route guidance device 1300 may provide a preview using the ghost car to provide route guidance information for the turn point. In this case, the route guidance device 1300 may display a travel route, on which the ghost car object moves, along the ghost car object using the MR view image.

In this case, as illustrated in (a) of FIG. 24, the route guidance device 1300 may display a first MR view image providing a view image that the vehicle is watched at a relatively low altitude, and a second MR view image providing a view image, which shows at a high altitude a travel route responsive to the movement of the ghost car object, through different areas of the display screen.

FIG. 25 illustrates an example of a display screen that displays a travel route according to the movement of the ghost car object.

Referring to (a) of FIG. 25, (a) FIG. 25 illustrates an example of a vehicle object 2550 traveling on a road. In this case, a point of attention 2500 of a first MR view image 2510 may face the center of the first MR view image. That is, the first MR view image 2510 may be an image acquired through an MR camera (first MR camera) focusing on the center. Additionally, a second MR view image 2520 may be an image (e.g., a bird's-eye view) acquired through a second MR camera that a travel route, on which the vehicle object 2550 travels, is watched at a high altitude.

In this state, when the vehicle object 2550 is adjacent to a turn point, the route guidance device 1300 may display as the first MR view image an image acquired through the first MR camera focusing on a travel route on which the travel has to travel over the turn point. Therefore, as illustrated in (b) of FIG. 25, the route guidance device 1300 may display the first MR view image 2510 oriented toward a travel route which is obscured by a building.

On the other hand, the route guidance device 1300 may dispose the second MR camera at a tangential point of a turning radius of the turn point to face a direction, in which the vehicle has to travel, at the tangential point. The route guidance device 1300 may provide an image acquired through the second MR camera as a second MR view image 2520.

Therefore, the MR view image acquired through the second MR camera, as illustrated in (b) of FIG. 25, may be an image showing an exit direction of the turn point, that is, a route on which the vehicle is to travel after passing the turn point.

When the vehicle is adjacent to the turn point, the route guidance device 1300 may further display a ghost car object 2511 corresponding to the vehicle object 2550, as illustrated in (c) of FIG. 25. In this case, the ghost car object 2511 may move along the turn point ahead of the vehicle object 2550. Then, the ghost car object 2511 may be displayed on the second MR view image 2520 oriented toward the exit direction of the turn point.

Meanwhile, when the vehicle changes the direction at the turn point along the travel route, as illustrated in (d) of FIG. 25, the point of attention 2500 of the first MR camera may gradually move toward the center of the first MR view image 2510 along the changed traveling direction of the vehicle. And, the image of the vehicle object 2550 that enters the exit direction after passing the turn point may be displayed on the second MR view image 2550. In this case, since the vehicle has not yet passed the turn point, the state in which the ghost car object 2511 is displayed in each of the first MR view image 2510 and the second MR view image 2520 may be maintained.

When the vehicle completely passes the turn point, the point of attention 2500 of the first MR camera may be directed toward the center of the first MR view image 2510 again. Additionally, the bird's-eye view looking at the travel route, on which the vehicle object 2550 travels, at a high altitude may be displayed as the second MR camera 2520.

Meanwhile, as described above, the preview provided through the MR view image may be activated automatically (automatic activation) or according to a passenger's selection (manual activation) according to the traveling state of the vehicle (e.g., whether the vehicle is stopped state or is traveling) or a travel route (e.g., whether or not the vehicle has entered a designated route such as a turn point).

Figure 26:
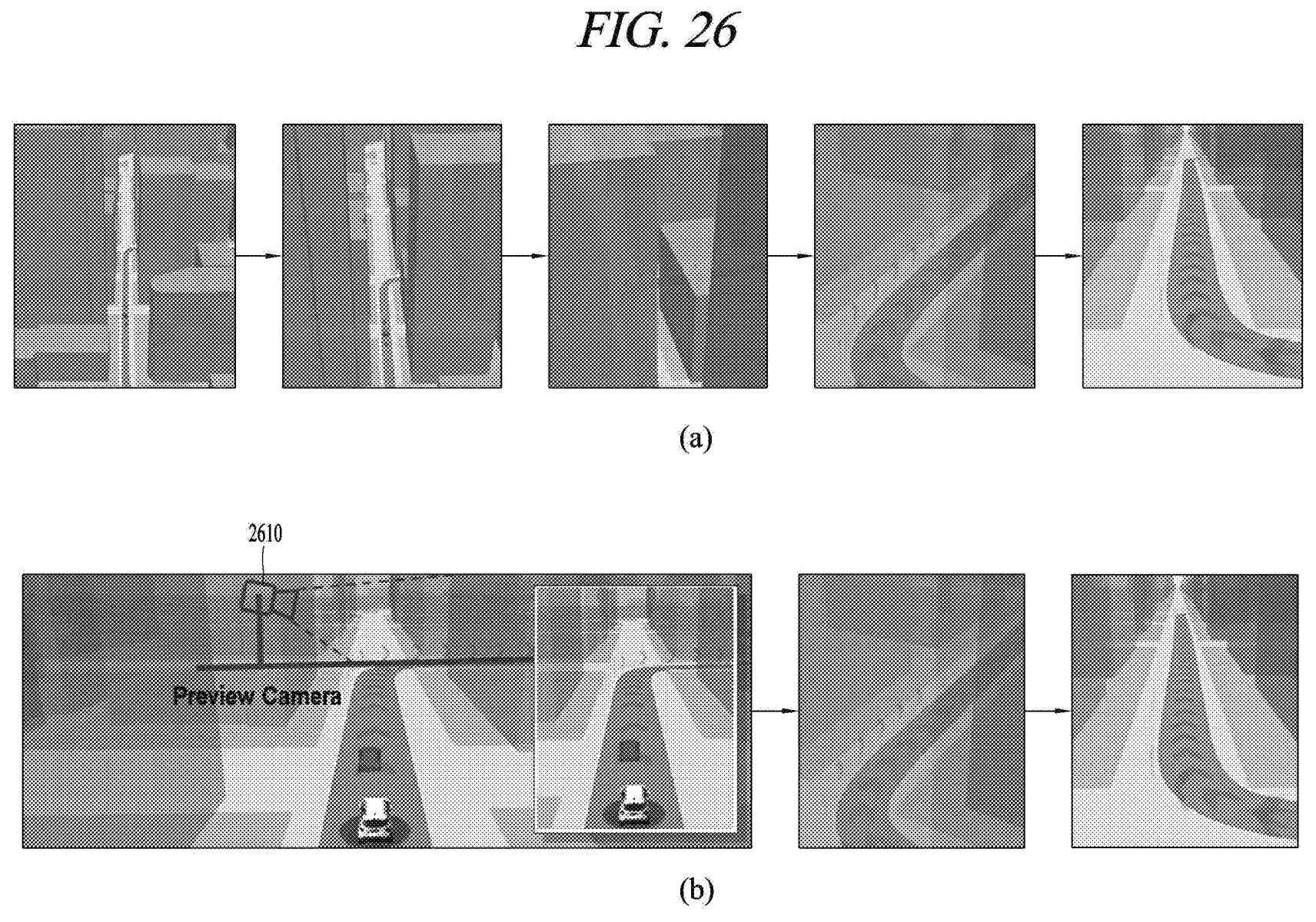

When the preview is automatically activated, the route guidance device 1300, as described in FIG. 25, may gradually change the MR view image displayed in one area of the display screen into an MR view image showing the route along which the vehicle travels. That is, as described in FIG. 25, when the second MR view image is a bird's-eye view acquired through the second MR camera oriented toward the vehicle object at the high altitude, the route guidance device 1300 may gradually move the second MR camera to a location facing the exit direction of the turn point. In other words, an effect (drone view) may be provided as if the second MR camera providing the second MR view image is moved by a drone. (a) of FIG. 26 illustrates an example in which, as the second MR camera moves, the second MR view image gradually changes from the bird's-eye view to the image oriented toward the exit direction of the turn point.

On the other hand, when the preview is manually activated according to the passenger's selection, the route guidance device 1300 may display the second MR view image in a PIP format on a portion of the display screen according to the user's selection while the first MR view image is displayed on the entire display screen.

In this case, the second MR view image may gradually change from the MR view image indicating the current traveling direction of the vehicle to an image acquired through the second MR camera 2610 located at the tangential point of the turning radius of the turn point. Therefore, as illustrated in (b) of FIG. 26, while displaying an MR view image with the same point of attention as the first MR view image, the image may gradually change to an MR image indicating a travel route for a direction, in which the vehicle should travel, namely, the exit direction of the turn point, from the tangential point of the turn point.

Figure 27:
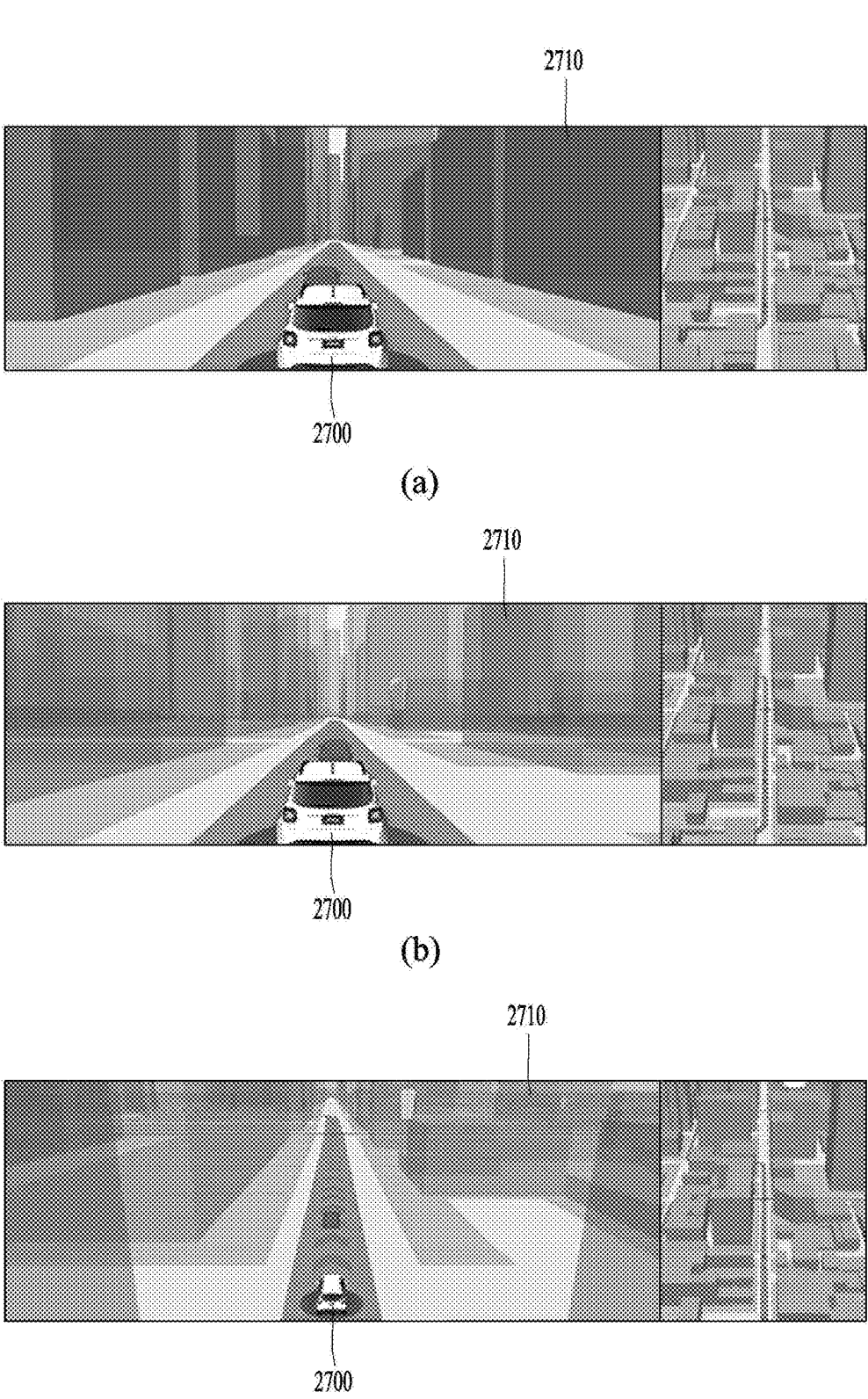
FIG. 27 is an exemplary view illustrating an example of an MR view image, in which a route guidance device according to an embodiment of the present disclosure displays images of surrounding buildings differently depending on speed of a vehicle.

Meanwhile, the route guidance device 1300 according to an embodiment of the present disclosure may differently display images of surrounding buildings to enhance visibility of the travel route. FIG. 27 is an exemplary view illustrating an example of an MR view image, in which a route guidance device according to an embodiment of the present disclosure displays images of surrounding buildings differently depending on speed of a vehicle.

When the traveling speed of the vehicle is low, the route guidance device 1300 may display buildings around the travel route as opaque images of 3D objects, as illustrated in (a) of FIG. 27.

In this state, when the traveling speed of the vehicle increases, as illustrated in (b) of FIG. 27, the route guidance device 1300 may increase transparency of the 3D objects corresponding to the buildings around the travel route in proportion to the increasing speed of the vehicle. Therefore, as the speed of the vehicle increases, the buildings around the vehicle may be displayed as translucent 3D objects, as illustrated in (b) of FIG. 27.

Meanwhile, the speed of the vehicle may further increase in the state where the buildings around the vehicle are displayed as the translucent 3D objects. However, the 3D objects corresponding to the buildings around the vehicle may no longer become transparent when the transparency reaches a predetermined level. This results from that it is difficult to recognize the buildings around the vehicle when the transparency becomes too high.

In this case, the route guidance device 1300 may further increase a capturing angle at which the MR view image is provided. In other words, an image of the travel route of the vehicle acquired at a higher altitude may be provided as an MR view image. Therefore, as illustrated in (c) of FIG. 27, an MR view image acquired at a higher angle may be provided, and accordingly, a longer viewing distance may be provided when the speed of the vehicle is high.

Figure 28:
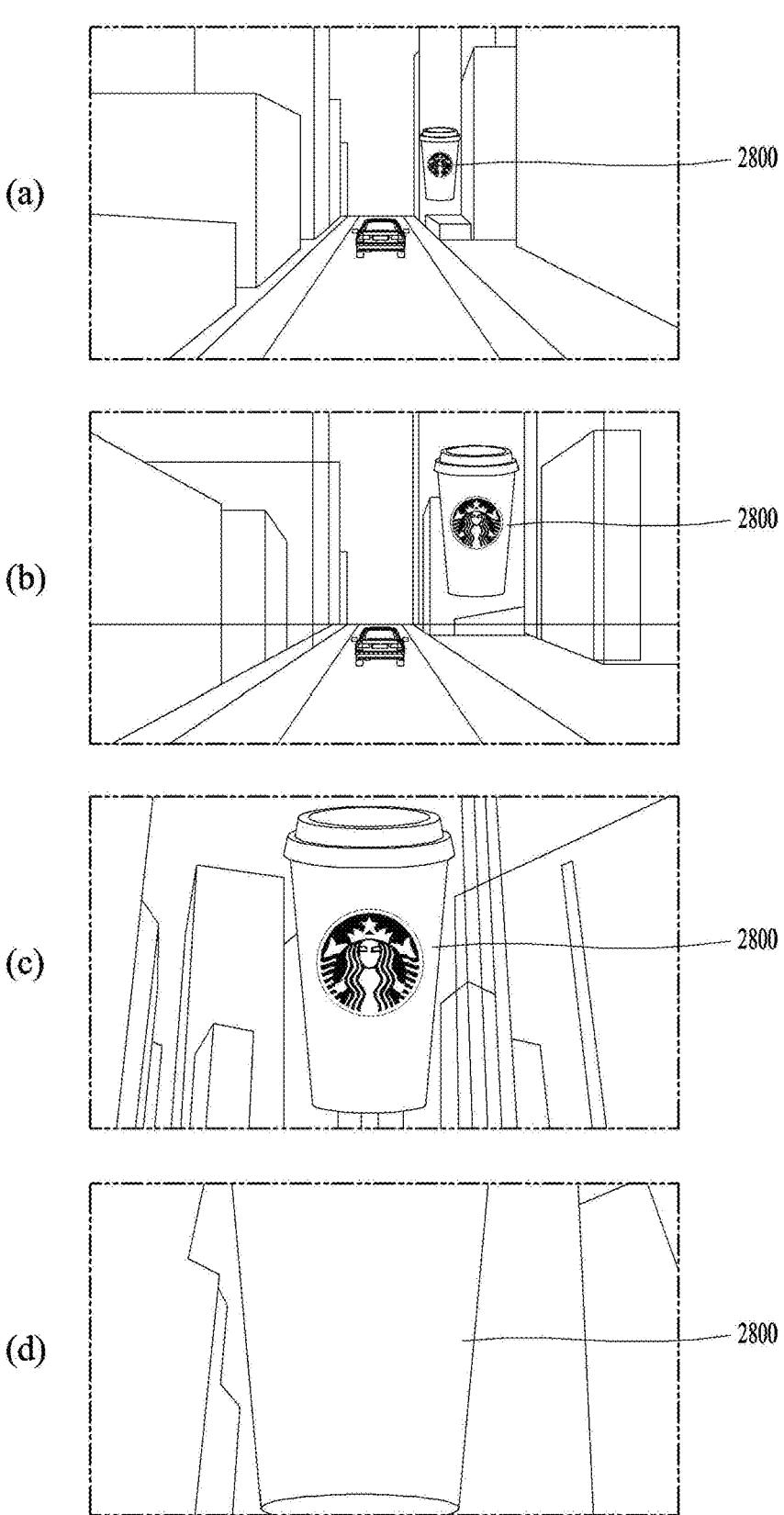
FIG. 28 is an exemplary view illustrating an example in which a route guidance device according to an embodiment of the present disclosure provides POI information through an MR view image.

Meanwhile, FIG. 28 is an exemplary view illustrating an example in which a route guidance device 1300 according to an embodiment of the present disclosure provides POI information through an MR view image.

The route guidance device 1300 according to an embodiment of the present disclosure may display POI information through a digital-twin 3D map image provided using an MR view image. Therefore, as illustrated in (a) of FIG. 28, when a building corresponding to POI information is exposed on the MR view image, the POI information may be displayed on a virtual object corresponding to the building.

Additionally, as the vehicle travels, the size of the POI object may change in response to a change in distance between the vehicle and the building corresponding to the POI information. That is, as illustrated in (b) and (c) of FIG. 28, when the vehicle gradually approaches the building corresponding to the POI information, the POI object displayed may be gradually enlarged. As illustrated in (c) of FIG. 28, when the POI object displayed is enlarged to a predetermined size or more as the vehicle enters the building corresponding to the POI information within a predetermined distance, the route guidance device 1300 may capture the image of the POI object and store the captured image in the form of thumbnail image. In this case, the captured image of the POI object may be used to provide a service using the POI information in the future.

Meanwhile, when the vehicle passes the building corresponding to the POI information as the vehicle moves, the POI object may deviate from the viewing angle of the vehicle, that is, the front area of the vehicle. Then, the route guidance device 1300 may display the POI object as a default object.

In this case, the default object, as illustrated in (c) of FIG. 28, may be a virtual object in a polygonal shape in which no texture is reflected. In other words, when an MR view image (e.g., a bird's-eye view) that displays not only the front of the vehicle but also the surroundings of the vehicle is provided, POI objects around a travel route, on which the vehicle has already traveled, may be displayed as objects, which are only shaded without a color, image, or texture, depending on the location where the vehicle is traveling, and POI objects around a travel route, on which the vehicle has not traveled yet, may be displayed as objects including a color, image, or texture.

Figure 29:
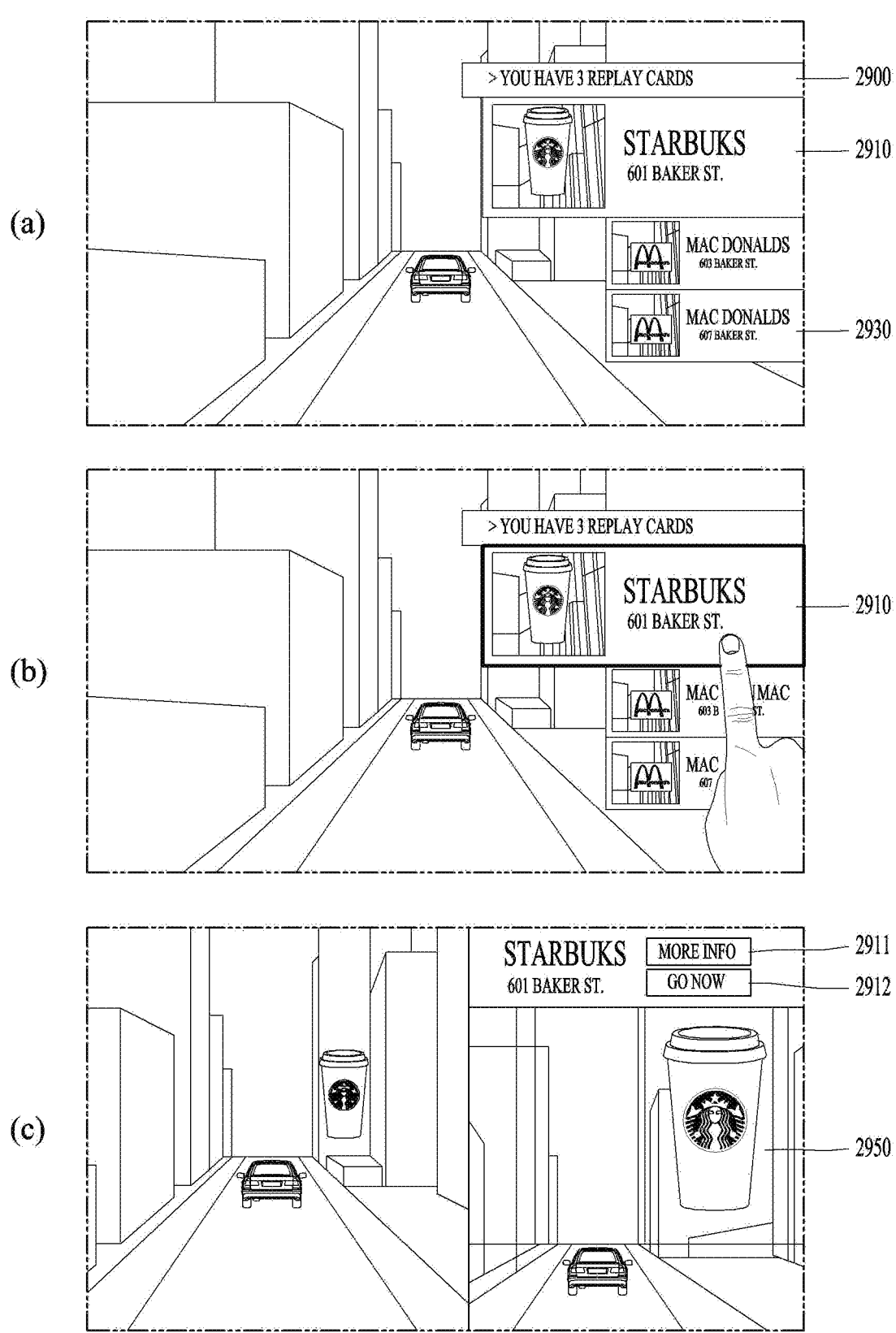
FIG. 29 is an exemplary diagram illustrating an example in which a route guidance device according to an embodiment of the present disclosure displays detailed information on one of POIs, which are collected as a vehicle travels, according to a passenger's selection.

Meanwhile, FIG. 29 is an exemplary diagram illustrating an example in which a route guidance device 1300 according to an embodiment of the present disclosure displays detailed information regarding one of POIs collected as a vehicle travels according to a passenger's selection.

As described in FIG. 28, the route guidance device 1300 may capture and store POI objects exposed around the vehicle while the vehicle is traveling. And as illustrated in (a) of FIG. 29, thumbnail images of the stored POI objects may be displayed on the display 251 according to the passenger's request.

In this case, the thumbnail images of the POI objects may be provided in the form of cards (replay cards) 2900 which include POI information regarding the corresponding POI objects. The thumbnail images of the POI objects may be provided in a sorted state in the order of time that those images (cards) are collected. As an example, a card 2910 corresponding to the most recently collected POI object may be displayed at the top, and a card 2930 corresponding to the earliest collected POI object may be displayed at the bottom.

In this state, as illustrated in (b) of FIG. 29, the passenger may select any one replay card 2910 through an input such as touch or voice. Then, the route guidance device 1300 may display information related to the POI object corresponding to the currently selected replay card 2910 on the display 251.

In this case, as illustrated in (c) of FIG. 29, the route guidance device 1300 may display a second MR view image including information related to the POI object to be overlaid on one area of the display 251 by splitting the area of the display 251 or according to the PIP way. In this case, the information related to the POI object may include the name of a service or company corresponding to the POI, the POI object, and a captured image with one location on the travel route where the POI object is exposed. The route guidance device 1300 may set an address corresponding to the POI object as a new destination or provide a POI function, such as a service reservation or the like, through network connection to the passenger based on the passenger's selection of the information regarding the POI object displayed through the second MR view image.

Hereinafter, effects of a route guidance device and a route guidance system according to the present disclosure will be described.

First, the present disclosure can provide a view image according to mixed reality (MR) that matches a view image according to augmented reality (AR) when the AR view image is difficult to display accurate route guidance information, such that a driver can be provided with such accurate route guidance information regardless of a situation or complexity around a vehicle in the real world or an acquired image state of the real world.

Second, the present disclosure can display a portion of a view image according to MR, which matches a view image according to AR, on a portion of the AR view image, or display at least a portion of the MR view image to be overlaid on at least a portion of the AR view image, thereby improving visibility of information displayed through objects around a vehicle.

Third, the present disclosure may display an MR view image according to MR together with an AR view image provided according to AR, thereby simultaneously displaying on one screen both information related to objects, which are located in an area within a viewing angle displayed through the AR, and information related to objects, which are located in an area out of the viewing angle.

The present disclosure can be implemented as computer-readable codes (applications or software) in a program-recorded medium. The control method of the route guidance device described above can be implemented using codes stored in memory, etc.

The computer-readable medium may include all types of recording devices each storing data readable by a computer system. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). Also, the computer may include a processor or a controller. Therefore, the detailed description should not be limitedly construed in all of the aspects, and should be understood to be illustrative. The scope of the present disclosure should be determined by reasonable interpretation of the appended claims, and all changes within the equivalent scope of the present disclosure are embraced by the appended claims.

The invention claimed is:

1. A route guidance device comprising:

a communication unit that communicates with a cloud server;

an interface unit that receives, from at least one sensor disposed in a vehicle, an environment image around the vehicle including an image of a road on which the vehicle is traveling, and sensing information obtained by sensing a traveling state of the vehicle;

an Augmented Reality (AR) module that renders AR information including at least one of the sensing information and Point Of Interest (POI) information received from the cloud server;

a Mixed Reality (MR) module that renders MR information including at least one virtual object, based on the sensing information and map information received from the cloud server; and a processor that controls the interface unit so that an AR view image including the AR information or an MR view image including the MR information is displayed on a display of the vehicle, and controls the interface unit so that a second view image of the AR view image and the MR view image is displayed on a portion of an area of the display where a first view image of the AR view image and the MR view image is displayed based on whether the vehicle enters a specific situation, wherein the cloud server comprises:

a Digital Twin as a Service (DTaaS) server providing digital-twin 3D map information including virtual objects corresponding to respective buildings included in a map area;

an MR server that performs communication connection with the route guidance device, provides location information related to the vehicle, collected from the route guidance device, to the DTaaS server, and provides the digital-twin 3D map information provided by the DTaaS server to the route guidance device; and an AR server that receives the location information related to the vehicle, provided from the route guidance device and the sensing information, and provides Point of Interest (POI) information corresponding to the received information to the route guidance device.

2. The route guidance device of claim 1, wherein the processor determines whether the vehicle has entered the specific situation according to at least one of the traveling state of the vehicle, a state of the road on which the vehicle travels, a weather condition around the vehicle, and time at which the vehicle travels.

3. The route guidance device of claim 2, wherein the traveling state of the vehicle includes whether the vehicle is in a stopped state or is traveling, and the state of the road on which the vehicle travels includes a curvature variation of the road and a slope variation of the road.

4. The route guidance device of claim 3, wherein the processor calculates the curvature variation of the road according to a sensing value of a gyro sensor, which senses an inclination of the vehicle, and a detection result of a lane detector, which detects a lane of the road on which the vehicle travels, calculates the slope variation of the road according to a road shape detected through a vertical profile and a high-definition map (HD MAP) detected based on map information related to the road on which the vehicle is currently traveling, and determines whether the vehicle has entered the specific situation based on an AR fitting rate between a real image ahead of the vehicle acquired through a camera of the vehicle and an AR object displayed on the real image according to the calculated curvature variation and slope variation.

5. The route guidance device of claim 1, wherein the processor determines a location of the vehicle on a travel route based on the sensing information, and determines whether the vehicle has entered the specific situation by determining whether the vehicle has departed from a route on which the vehicle is capable of traveling or whether the vehicle is located at a junction on the route or adjacent to an exit or destination within a predetermined distance.

6. The route guidance device of claim 1, wherein the processor controls the interface unit to display warning information for warning a dangerous area located around the vehicle or a possibility of a collision detected from around the vehicle, based on the sensing information, and determines whether the vehicle has entered the specific situation depending on whether the displayed warning information is exposed ahead of the vehicle.

7. The route guidance device of claim 1, wherein the processor determines objects detected from around the vehicle based on the sensing information, and determines whether the vehicle has entered the specific situation based on at least one of a number of the determined objects and sizes of the objects.

8. The route guidance device of claim 1, wherein the processor controls the interface unit to split the display into a first display area and a second display area when the vehicle enters the specific situation, and controls the interface unit to display a first view image and a second view image on the first display area and the second display area, respectively.

9. The route guidance device of claim 8, wherein the first display area is a display area where an image of an area, in which a distance from the vehicle is within a preset distance, is displayed, and the second display area is a display area where an image of an area, in which the distance from the vehicle exceeds the preset distance, is displayed.

10. The route guidance device of claim 9, wherein the processor controls the interface unit to display the AR view image and the MR view image on the first display area and the second display area, respectively.

11. The route guidance device of claim 8, wherein the processor, when the vehicle enters the specific situation, generates a second view image having the same point of attention as that of the first view image by changing a camera calibration of the second view image according to a camera calibration of the first view image.

12. The route guidance device of claim 11, wherein the second view image is an image with a same size and ratio as the first view image, based on a Field of View (FOV) of the first view image.

13. The route guidance device of claim 11, wherein the first view image and the second view image are connected to each other through a boundary surface of a view image to enable movement of an object between one view image and another view image.

14. The route guidance device of claim 1, wherein the processor controls the interface unit so that the second view image is overlaid on at least a portion of a display area where the first view image is displayed, and controls the interface unit such that objects included in the first view image are displayed in the display area on which the second view image is overlaid.

15. The route guidance device of claim 8, wherein the first display area is an area where a first view image providing route information related to a travel route on which the vehicle is currently traveling is displayed, and the second display area is an area where a second view image providing route information related to a route on which the vehicle has not traveled yet or has already traveled is displayed.

16. A route guidance system comprising:

a route guidance device that is mounted on a vehicle and displays on a display of the vehicle an Augmented Reality (AR) view image including AR information rendered based on Point Of Interest (POI) information received or a Mixed Reality (MR) view image including MR information rendered based on Three-Dimensional (3D) map information; and a cloud server that provides the route guidance device with POI information or 3D map information corresponding to a current, past, or predicted future location of the vehicle, in response to a request of the route guidance device, wherein the route guidance device comprises a processor that controls the display to display a second view image on a portion of an area of the display where a first view image of the AR view image and the MR view image is displayed, based on whether the vehicle enters a specific situation, wherein the cloud server comprises:

a Digital Twin as a Service (DTaaS) server providing digital-twin 3D map information including virtual objects corresponding to respective buildings included in a map area;

an MR server that performs communication connection with the route guidance device, provides location information related to the vehicle, collected from the route guidance device, to the DTaaS server, and provides the digital-twin 3D map information provided by the DTaaS server to the route guidance device; and an AR server that receives the location information related to the vehicle, provided from the route guidance device and sensing information, and provides POI information corresponding to the received information to the route guidance device.

17. The route guidance system of claim 16, wherein the route guidance device controls the display to display both first route guidance information included in the first view image and second route guidance information included in the second view image, through the second view image displayed on a portion of the first view image.

* * * * *